(12) United States Patent
Takehara et al.

(10) Patent No.: US 9,877,021 B2
(45) Date of Patent: *Jan. 23, 2018

(54) MOVING PICTURE CODING DEVICE, MOVING PICTURE CODING METHOD AND MOVING PICTURE CODING PROGRAM, AND MOVING PICTURE DECODING DEVICE, MOVING PICTURE DECODING METHOD AND MOVING PICTURE DECODING PROGRAM

(71) Applicant: JVC KENWOOD Corporation, Yokohama-shi (JP)

(72) Inventors: Hideki Takehara, Yokosuka (JP); Shigeru Fukushima, Yokosuka (JP); Hiroya Nakamura, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,457

(22) Filed: May 25, 2017

(65) Prior Publication Data
US 2017/0264897 A1  Sep. 14, 2017

Related U.S. Application Data

(63) Continuation of application No. 14/326,105, filed on Jul. 8, 2014, which is a continuation of application No. PCT/JP2013/000224, filed on Jan. 18, 2013.

(30) Foreign Application Priority Data

Jan. 18, 2012 (JP) .................................. 2012-008433
Jan. 18, 2012 (JP) .................................. 2012-008434
(Continued)

(51) Int. Cl.
*H04N 7/12* (2006.01)
*H04N 19/105* (2014.01)
(Continued)

(52) U.S. Cl.
CPC ......... *H04N 19/105* (2014.11); *H04N 19/157* (2014.11); *H04N 19/159* (2014.11);
(Continued)

(58) Field of Classification Search
None
See application file for complete search history.

(56) References Cited

U.S. PATENT DOCUMENTS

2012/0320984 A1*  12/2012  Zhou ...................... H04N 19/50
375/240.16

FOREIGN PATENT DOCUMENTS

JP     10-276439 A    10/1998

OTHER PUBLICATIONS

Sugio et al. (Document: JCTVC-F470, Title: Parsing Robustness for Merge/AMVP, Joint Collaborative Team on Video Coding (JCT-VC) of ITU-T SG16 WP3 and ISO/IEC JTC1/SC29/WG11 6th Meeting: Torino, IT, Jul. 14-22, 2011) (hereinafter JCTVC-F470).*
(Continued)

*Primary Examiner* — Dakshesh Parikh
(74) *Attorney, Agent, or Firm* — Venable LLP; Michael A. Sartori; Miguel A. Lopez

(57) ABSTRACT

A merging motion information candidate list construction unit generates a merging motion information candidate list, which is a list of merging motion information candidates, using a spatial merging motion information candidate and a temporal merging motion information candidate. A second merging motion information candidate supplying unit generates a new merging motion information candidate including, if a reference index indicates an available reference
(Continued)

picture, the reference index and, if the reference index does not indicate an available reference picture, a predetermined reference index along with a motion vector having a size and a direction that are preset and adds the new merging motion information candidate to the merging motion information candidate list. A merging motion information selection unit selects one merging motion information candidate from the merging motion information candidate list to which the new merging motion information candidate has been added.

3 Claims, 40 Drawing Sheets

(30) Foreign Application Priority Data

Jan. 18, 2013 (JP) .................................. 2013-006968
Jan. 18, 2013 (JP) .................................. 2013-006969

(51) Int. Cl.
*H04N 19/52* (2014.01)
*H04N 19/176* (2014.01)
*H04N 19/157* (2014.01)
*H04N 19/573* (2014.01)
*H04N 19/159* (2014.01)

(52) U.S. Cl.
CPC .......... *H04N 19/176* (2014.11); *H04N 19/52* (2014.11); *H04N 19/573* (2014.11)

(56) References Cited

OTHER PUBLICATIONS

Chen et al. (Document: JCTVC-F402, "MVP index parsing with fixed number of candidates", Joint Collaborative Team on Video Coding (JCT-VC) of ITU-T SG16 WP3 and ISO/IEC JTC1/SC29/WG11, 6th Meeting: Torino, IT, Jul. 14-22, 2011) (hereinafter JCTVC-F402).*
Toshiyasu Sugio et al., "Parsing Robustness for Merge/AMVP," Joint Collaborative Team on Video Coding (JCT-VC) of ITU-T SG16 WP3 and ISO/IEC JTC1/SC29/WG11, JCTVC-F470, 6th Meeting: Torino, IT, Jul. 2011, pp. 1-33.
Toshiyasu Sugio et al., "On MVP candidate list for AMVP/Merge," Joint Collaborative Team on Video Coding (JCT-VC) of ITU-T SG16 WP3 and ISO/IEC JTC1/SC29/WG11, JCTVC-I0134, 9th Meeting: Geneva, CH, Apr. 2012, pp. 1-6.
International Search Report in PCT International Application No. PCT/JP2013/000224, dated Mar. 19, 2013.
International Preliminary Report on Patentability and Written Opinion in PCT International Application No. PCT/JP2013/000224, dated Jul. 22, 2014.
Lin, et al., "Motion Vector Coding Techniques for HEVC," Multimedia Signal Processing (MMSP), 2011 IEEE 13th International Workshop, Oct. 2011.
Lee, et al., "Non-CE13: Additional merge candidates with MV dependent offsets," Joint Collaborative Team on Video coding (JCT-VC) of ITU-T SG16 WP3 and ISO/IEC SC291WG11 7th Meeting: Geneva, CH, Nov. 2011.
Chen et al., "MVP index parshing with fixed numbers of candidates," Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-17.

* cited by examiner

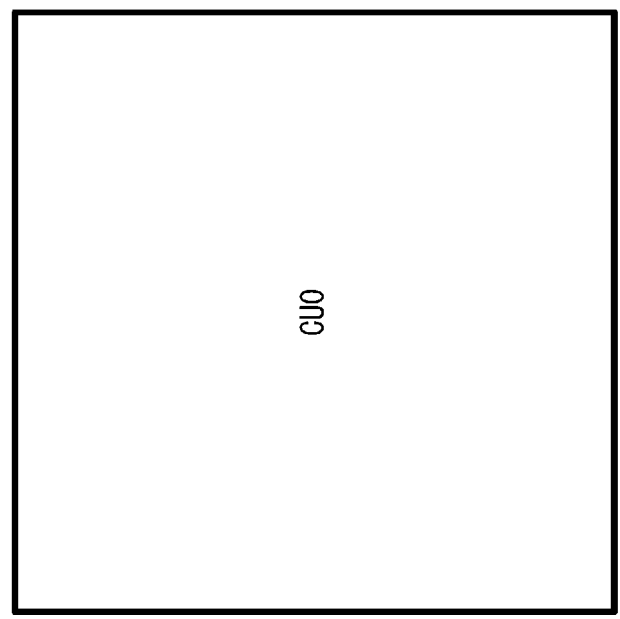
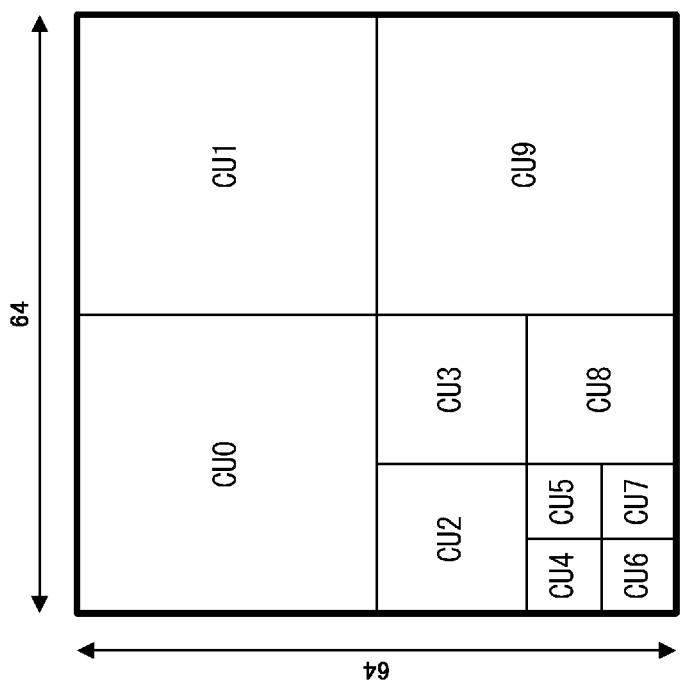

FIG.3

| NUMBER OF CU PARTITION OCCURRENCES | PREDICTION BLOCK SIZE TYPE | | | |
|---|---|---|---|---|
| | 2Nx2N | 2NxN | Nx2N | NxN |
| 0 | 64x64 | 64x32 | 32x64 | – |
| 1 | 32x32 | 32x16 | 16x32 | – |
| 2 | 16x16 | 16x8 | 8x16 | – |
| 3 | 8x8 | 8x4 | 4x8 | 4x4 |

FIG.4

| PREDICTION CODING MODE | PREDICTION DIRECTION OF MOTION COMPENSATION PREDICTION | NUMBER OF CODING VECTORS | NUMBER OF REFERENCE PICTURE INDICES | NUMBER OF VECTOR PREDICTOR INDICES | NUMBER OF MERGE INDICES |
|---|---|---|---|---|---|
| PredL0 | UNI-PREDICTION (L0 PREDICTION) | 1 | 1 | 1 | 0 |
| PredL1 | UNI-PREDICTION (L1 PREDICTION) | 1 | 1 | 1 | 0 |
| PredBI | BI-PREDICTION (BI PREDICTION) | 2 | 2 | 2 | 0 |
| MERGE | UNI-PREDICTION/ BI-PREDICTION | 0 | 0 | 0 | 1 |
| Intra | — | 0 | 0 | 0 | 0 |

FIG.5

| MERGE INDEX | BITSTREAM |
|---|---|
| 0 | 0 |
| 1 | 10 |
| 2 | 110 |
| 3 | 1110 |
| 4 | 1111 |

FIG.6

```
PictureParameterSet()
{
    ...
    num_ref_idx_l0_default_active_minus1
    num_ref_idx_l1_default_active_minus1
    enable_temporal_mvp_flag
    ...
}
```

```
SliceHeader()
{
    ...
    POC
    if (slice_type == P || slice_type == B) {
        num_ref_idx_active_override_flag
        if (num_ref_idx_active_override_flag) {
            num_ref_idx_l0_active_minus1
            if (slice_type == B)
                num_ref_idx_l1_active_minus1
        }
        5_minus_max_num_merge_cands
    }
    ...
}
```

```
Coding Unit()
{
    skip_flag
    if (skip_flag) {
        Prediction Unit();
    }
    else {
        ...
        pred_mode
        part_mode
        ...
        for( noPU=0; noPU<PartNum; noPU++ )
            Prediction Unit();
    }
}
```

```
CodingTree()
{
    ...
    split_coding_unit_flag
    ...
    if( split_coding_unit_flag ) {
        for( noCT=0; noCT<4; noCT++ )
            CodingTree();
    }
    else
        Coding Unit();
}
```

```
Prediction Unit()
{
    if (skip_flag) {
        if (MaxNumMergeCands>1)
            merge_idx
    }
    else if (pred_mode == INTER) {
        merge_flag
        if (merge_flag) {
            if (MaxNumMergeCands>1)
                merge_idx
        } else {
            if (slice_type == B)
                inter_pred_type
            if (inter_pred_type != Pred_L1) {
                ref_idx_l0
                mvd_l0[0]
                mvd_l0[1]
                mvp_idx_l0
            }
            if (inter_pred_type != Pred_L0) {
                ref_idx_l1
                mvd_l1[0]
                mvd_l1[1]
                mvp_idx_l1
            }
        }
    }
}
```

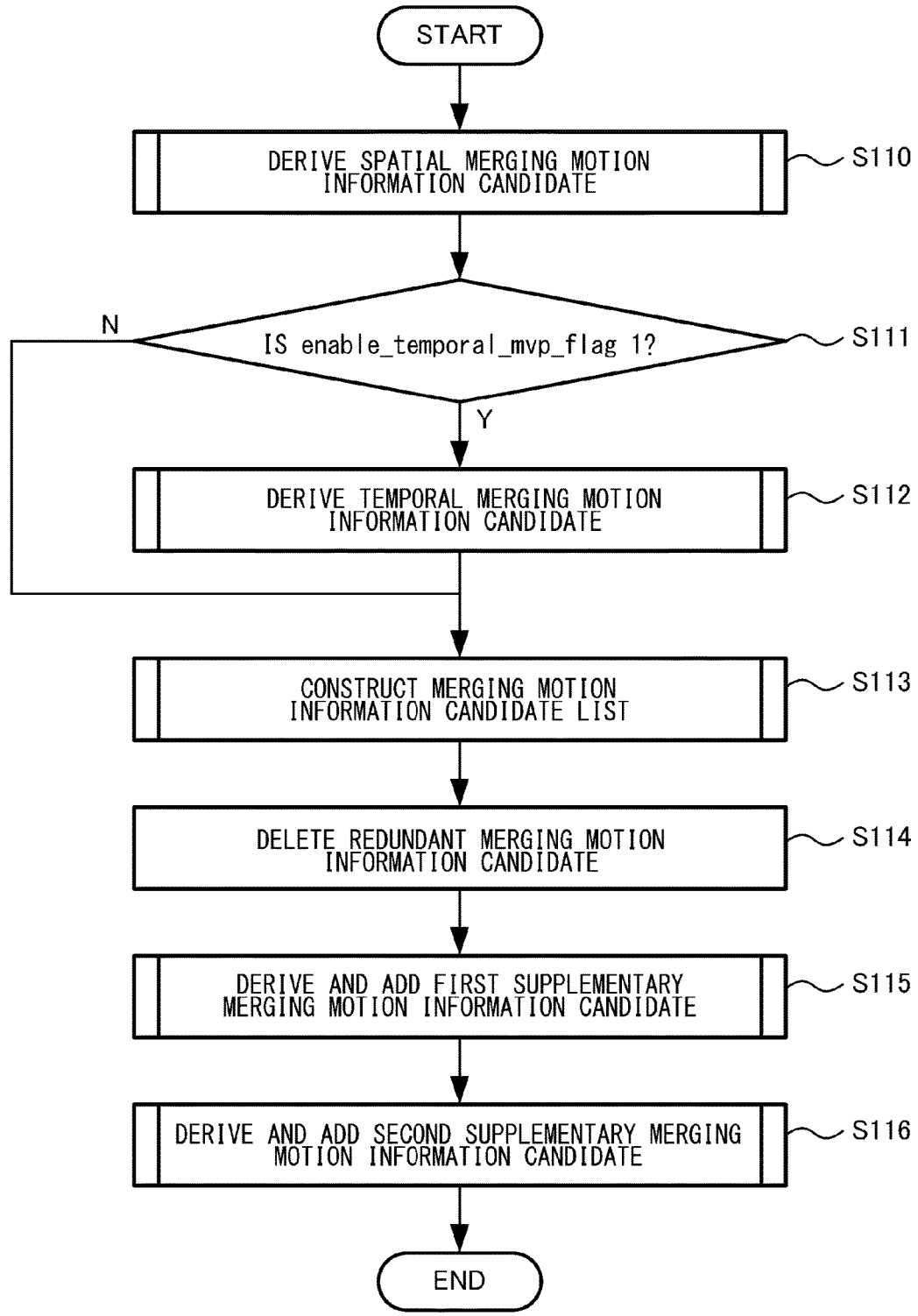

FIG.19

| loopTimes | M | N |
|---|---|---|
| 0 | 0 | 1 |
| 1 | 1 | 0 |
| 2 | 0 | 2 |
| 3 | 2 | 0 |
| 4 | 1 | 2 |
| 5 | 2 | 1 |
| 6 | 0 | 3 |
| 7 | 3 | 0 |

WITH NO REARRANGEMENT

WITH REARRANGEMENT

FIG.22A

| i | RefPicL0[i] | RefPicL1[i] |
|---|---|---|
| 0 | n+7 | n+7 |
| 1 | n+6 | n+6 |
| 2 | n+5 | n+5 |
| 3 | n+4 | n+4 |

WITH NO REARRANGEMENT

FIG.22B

| i | RefPicL0[i] | RefPicL1[i] |
|---|---|---|
| 0 | n+4 | n+6 |
| 1 | n+2 | n+8 |
| 2 | n+6 | n+4 |
| 3 | n+8 | n+2 |

WITH REARRANGEMENT

FIG.23A

| SECOND SUPPLEMENTARY MERGING MOTION INFORMATION CANDIDATE | ref_idx_l0 | | ref_idx_l1 | |
|---|---|---|---|---|
| | | POC | | POC |
| 0 | 0 | n+7 | 0 | n+7 |
| 1 | 1 | n+6 | 0 | n+7 |
| 2 | 2 | n+5 | 0 | n+7 |
| 3 | 3 | n+4 | 0 | n+7 |

WITH NO REARRANGEMENT

FIG.23B

| SECOND SUPPLEMENTARY MERGING MOTION INFORMATION CANDIDATE | ref_idx_l0 | | ref_idx_l1 | |
|---|---|---|---|---|
| | | POC | | POC |
| 0 | 0 | n+4 | 0 | n+6 |
| 1 | 1 | n+2 | 0 | n+6 |
| 2 | 2 | n+6 | 0 | n+6 |
| 3 | 3 | n+8 | 0 | n+6 |

WITH REARRANGEMENT

FIG.38A

| SECOND SUPPLEMENTARY MERGING MOTION INFORMATION CANDIDATE | ref_idx_l0 | | ref_idx_l1 | |
|---|---|---|---|---|
| | | POC | | POC |
| 0 | 0 | n+7 | 0 | n+7 |
| 1 | 1 | n+6 | 1 | n+6 |
| 2 | 2 | n+5 | 0 | n+7 |
| 3 | 3 | n+4 | 0 | n+7 |

WITH NO REARRANGEMENT

FIG.38B

| SECOND SUPPLEMENTARY MERGING MOTION INFORMATION CANDIDATE | ref_idx_l0 | | ref_idx_l1 | |
|---|---|---|---|---|
| | | POC | | POC |
| 0 | 0 | n+4 | 0 | n+6 |
| 1 | 1 | n+2 | 1 | n+8 |
| 2 | 2 | n+6 | 0 | n+6 |
| 3 | 3 | n+8 | 0 | n+6 |

WITH REARRANGEMENT

FIG.40A

| SECOND SUPPLEMENTARY MERGING MOTION INFORMATION CANDIDATE | ref_idx_l0 | | ref_idx_l1 | |
|---|---|---|---|---|
| | | POC | | POC |
| 0 | 0 | n+7 | 0 | n+7 |
| 1 | 1 | n+6 | 1 | n+6 |
| 2 | 2 | n+5 | 2 | n+5 |
| 3 | 3 | n+4 | 3 | n+4 |

WITH NO REARRANGEMENT

FIG.40B

| SECOND SUPPLEMENTARY MERGING MOTION INFORMATION CANDIDATE | ref_idx_l0 | | ref_idx_l1 | |
|---|---|---|---|---|
| | | POC | | POC |
| 0 | 0 | n+4 | 2 | n+4 |
| 1 | 1 | n+2 | 3 | n+2 |
| 2 | 2 | n+6 | 0 | n+6 |
| 3 | 3 | n+8 | 1 | n+8 |

WITH REARRANGEMENT

MOVING PICTURE CODING DEVICE, MOVING PICTURE CODING METHOD AND MOVING PICTURE CODING PROGRAM, AND MOVING PICTURE DECODING DEVICE, MOVING PICTURE DECODING METHOD AND MOVING PICTURE DECODING PROGRAM

CROSS-REFERENCE TO RELATED APPLICATIONS

This application is a Continuation of U.S. patent application Ser. No. 14/326,105, filed Jul. 8, 2014, which is a Continuation of International Application No. PCT/JP2013/000224, filed Jan. 18, 2013, which claims the benefit of Japanese Patent Application Nos. 2012-008433 and 2012-008434, filed Jan. 18, 2012, and 2013-006968 and 2013-006969, filed Jan. 18, 2013.

BACKGROUND

1. Field of the Invention

The present invention relates to a technology of coding moving pictures by using motion compensation prediction and, more particularly, to a moving picture coding device, a moving picture coding method and a moving picture coding program, and a moving picture decoding device, a moving picture decoding method and a moving picture decoding program that code motion information used in motion compensation prediction.

2. Description of the Related Art

Motion compensation prediction is used in commonly-used moving-picture compression coding. Motion compensation prediction is a technology of partitioning a target picture into small blocks and generating, as a prediction signal, a signal located at a position moved from a target block of the target picture to a reference block of a reference picture based on the amount of motion indicated by a motion vector, the reference picture being a decoded picture. Motion compensation prediction includes uni-prediction performed using a single motion vector and bi-prediction performed using two motion vectors.

Regarding motion vectors, a motion vector of a coded block neighboring a target block is set to be a motion vector predictor (also simply referred to as "vector predictor"), and a difference between a motion vector of the target block and the vector predictor is obtained and transmitted as a coding vector so as to improve compression efficiency.

Moving-picture compression coding such as MPEG-4AVC/H.264 (hereinafter, AVC) allows for highly-accurate motion compensation prediction by making the size of a block used for motion compensation to be small with variations. On the other hand, there is a problem that the code size of a coding vector becomes large when reducing the size of the block.

Thus, in AVC, the continuity of motion in a temporal direction is focused, and temporal direct motion compensation prediction is used where motion compensation is achieved, without transmitting coding vectors, by scaling a motion vector of a block of a reference picture that is located at the same position as a target block and using the scaled motion vector as a motion vector of the target block.

Also, focusing on the continuity of motion in a spatial direction, Patent document 1 discloses a method of achieving motion compensation prediction, without transmitting coding vectors, by using a motion vector of a processed block neighboring a target block as a motion vector of the processed block.

RELATED ART LIST

Patent Document

[Patent document 1] JP 10-276439

According to the method described in AVC or non-patent document 1, only one prediction block and one direct mode can be obtained. Depending on the type of a picture, this may cause poor prediction precision provided by a motion vector predictor, resulting in poor coding efficiency.

In this background, the inventors of the present invention have come to be aware of a need to provide a moving picture coding scheme based on motion compensation prediction in which the coding information is further compressed and the overall code size is reduced.

SUMMARY

Accordingly, a purpose of the present invention is to provide a moving picture coding and decoding technology capable of reducing, by providing a plurality of motion information candidates when motion information is not transmitted, the code size of the motion information and improving the coding efficiency accordingly.

A moving picture coding device according to one embodiment of the present invention is a moving picture coding device adapted to derive motion information including a reference index and a motion vector in units of prediction blocks and includes: a spatial merging motion information candidate derivation unit (160) configured to derive a spatial merging motion information candidate from motion information of a plurality of coded prediction blocks neighboring a prediction block subject to coding; a temporal merging motion information candidate derivation unit (161) configured to derive a temporal merging motion information candidate from motion information of a prediction block in a coded picture different from a picture in which the prediction block subject to coding is located; a merging motion information candidate list construction unit (162) configured to generate a merging motion information candidate list, which is a list of merging motion information candidates, using the spatial merging motion information candidate and the temporal merging motion information candidate; a merging motion information candidate supplying unit (165) configured to generate a new merging motion information candidate including, if the reference index indicates an available reference picture, the reference index and, if the reference index does not indicate an available reference picture, a predetermined reference index along with a motion vector having a size and a direction that are preset and to add the new merging motion information candidate to the merging motion information candidate list; a merging motion information selection unit (141) configured to select one merging motion information candidate from the merging motion information candidate list to which the new merging motion information candidate has been added and to derive the selected merging motion information candidate as the motion information of the prediction block subject to coding; and a coding unit configured to code a specification index for specifying the selected merging motion information candidate.

Another embodiment of the present invention also relates to a moving picture coding device. This device is a moving picture coding device adapted to derive motion information including a reference index and a motion vector in units of prediction blocks and includes: a spatial merging motion information candidate derivation unit (160) configured to derive a spatial merging motion information candidate from motion information of a plurality of coded prediction blocks neighboring a prediction block subject to coding; a temporal merging motion information candidate derivation unit (161) configured to derive a temporal merging motion information candidate from motion information of a prediction block in a coded picture different from a picture in which the prediction block subject to coding is located; a merging motion information candidate list construction unit (162) configured to generate a merging motion information candidate list, which is a list of motion information candidates, using the spatial merging motion information candidate and the temporal merging motion information candidate; a first merging motion information candidate supplying unit (164) configured to combine a motion vector and a reference index of a merging motion information candidate for first prediction and a motion vector and a reference index of a merging motion information candidate for second prediction from the merging motion information candidate list, to derive a first supplementary merging motion information candidate in which a prediction signal of the first prediction and a prediction signal of the second prediction are not identical with each other, and to add the first supplementary merging motion information candidate to the merging motion information candidate list; a second merging motion information candidate supplying unit (165) configured to derive a second supplementary merging motion information candidate having a motion vector and a reference index that allow the prediction signal of the first prediction and the prediction signal of the second prediction to be identical with each other and to add the second supplementary merging motion information candidate to the merging motion information candidate list; a merging motion information selection unit (141) configured to select one merging motion information candidate from the merging motion information candidate list to which the first supplementary merging motion information candidate and the second supplementary merging motion information candidate have been added and to derive the selected merging motion information candidate as the motion information of the prediction block subject to coding; and a coding unit configured to code a specification index for specifying the selected merging motion information candidate.

Yet another embodiment of the present invention also relates to a moving picture coding device. This device is a moving picture coding device adapted to partition a picture into a plurality of prediction blocks and perform motion compensation and includes: a spatial merging motion information candidate derivation unit (160) configured to derive a spatial merging motion information candidate from motion information of a plurality of coded neighboring blocks neighboring a prediction block subject to coding; a temporal merging motion information candidate derivation unit (161) configured to derive a temporal merging motion information candidate from motion information of a block in a coded picture different from a picture subject to coding in which the prediction block subject to coding is located; a merging motion information candidate list construction unit (162) configured to generate a merging motion information candidate list using the spatial merging motion information candidate and the temporal merging motion information candidate; a merging motion information candidate supplying unit (165) configured to generate a merging motion information candidate for bi-prediction where a motion vector value is the same for first prediction and second prediction and where a reference index of the first prediction or the second prediction is set to be a fixed value and to add the merging motion information candidate to the merging motion information candidate list; a merging motion information selection unit (141) configured to select one merging motion information candidate from the merging motion information candidate list and to set the selected merging motion information candidate to be motion information of the prediction block subject to coding; and a coding unit configured to code information for specifying the selected merging motion information candidate in the merging motion information candidate list.

Yet another embodiment of the present invention relates to a moving picture coding method. This method is a moving picture coding method adapted to derive motion information including a reference index and a motion vector in units of prediction blocks and includes: deriving a spatial merging motion information candidate from motion information of a plurality of coded prediction blocks neighboring a prediction block subject to coding; deriving a temporal merging motion information candidate from motion information of a prediction block in a coded picture different from a picture in which the prediction block subject to coding is located; generating a merging motion information candidate list, which is a list of merging motion information candidates, using the spatial merging motion information candidate and the temporal merging motion information candidate; generating a new merging motion information candidate including, if the reference index indicates an available reference picture, the reference index and, if the reference index does not indicate an available reference picture, a predetermined reference index along with a motion vector having a size and a direction that are preset and adding the new merging motion information candidate to the merging motion information candidate list; selecting one merging motion information candidate from the merging motion information candidate list to which the new merging motion information candidate has been added and deriving the selected merging motion information candidate as the motion information of the prediction block subject to coding; and coding a specification index for specifying the selected merging motion information candidate.

Yet another embodiment of the present invention also relates to a moving picture coding method. This method is a moving picture coding method adapted to derive motion information including a reference index and a motion vector in units of prediction blocks and includes: deriving a spatial merging motion information candidate from motion information of a plurality of coded prediction blocks neighboring a prediction block subject to coding; deriving a temporal merging motion information candidate from motion information of a prediction block in a coded picture different from a picture in which the prediction block subject to coding is located; generating a merging motion information candidate list, which is a list of motion information candidates, using the spatial merging motion information candidate and the temporal merging motion information candidate; combining a motion vector and a reference index of a merging motion information candidate for first prediction and a motion vector and a reference index of a merging motion information candidate for second prediction from the merging motion information candidate list, deriving a first supplementary merging motion information candidate in which a prediction signal of the first prediction and a prediction signal of the second prediction are not identical with each other, and adding the first supplementary merging motion information candidate to the merging motion information candidate list; deriving a second supplementary merging motion information candidate having a motion vector and a reference index that allow the prediction signal of the first prediction and the prediction signal of the second prediction to be identical with each other and adding the second supplementary merging motion information candidate to the merging motion information candidate list; selecting one merging motion information candidate from the merging motion information candidate list to which the first supplementary merging motion information candidate and the second supplementary merging motion information candidate have been added and deriving the selected merging motion information candidate as the motion information of the prediction block subject to coding; and coding a specification index for specifying the selected merging motion information candidate.

A moving picture decoding device according to one embodiment of the present invention is a moving picture decoding device adapted to derive motion information including a reference index and a motion vector in units of prediction blocks and includes: a decoding unit configured to decode, from a bitstream, a specification index for specifying a merging motion information candidate used for a prediction block subject to decoding; a spatial merging motion information candidate derivation unit (160) configured to derive a spatial merging motion information candidate from motion information of a plurality of decoded prediction blocks neighboring the prediction block subject to decoding; a temporal merging motion information candidate derivation unit (161) configured to derive a temporal merging motion information candidate from motion information of a prediction block in a decoded picture different from a picture in which the prediction block subject to decoding is located; a merging motion information candidate list construction unit (162) configured to generate a merging motion information candidate list, which is a list of merging motion information candidates, using the spatial merging motion information candidate and the temporal merging motion information candidate; a merging motion information candidate supplying unit (165) configured to generate a new merging motion information candidate including, if the reference index indicates an available reference picture, the reference index and, if the reference index does not indicate an available reference picture, a predetermined reference index along with a motion vector having a size and a direction that are preset and to add the new merging motion information candidate to the merging motion information candidate list; and a merging motion information selection unit (231) configured to select one merging motion information candidate from the merging motion information candidate list to which the new merging motion information candidate has been added and to derive the selected merging motion information candidate as the motion information of the prediction block subject to decoding, based on the specification index that has been decoded.

Another embodiment of the present invention also relates to a moving picture decoding device. This device is a moving picture decoding device adapted to derive motion information including a reference index and a motion vector in units of prediction blocks and includes: a decoding unit configured to decode, from a bitstream, a specification index for specifying a merging motion information candidate used for a prediction block subject to decoding; a spatial merging motion information candidate derivation unit (160) configured to derive a spatial merging motion information candidate from motion information of a plurality of decoded prediction blocks neighboring the prediction block subject to decoding; a temporal merging motion information candidate derivation unit (161) configured to derive a temporal merging motion information candidate from motion information of a prediction block in a decoded picture different from a picture in which the prediction block subject to decoding is located; a merging motion information candidate list construction unit (162) configured to generate a merging motion information candidate list, which is a list of motion information candidates, using the spatial merging motion information candidate and the temporal merging motion information candidate; a first merging motion information candidate supplying unit (164) configured to combine a motion vector and a reference index of a merging motion information candidate for first prediction and a motion vector and a reference index of a merging motion information candidate for second prediction from the merging motion information candidate list, to derive a first supplementary merging motion information candidate in which a prediction signal of the first prediction and a prediction signal of the second prediction are not identical with each other, and to add the first supplementary merging motion information candidate to the merging motion information candidate list; a second merging motion information candidate supplying unit (165) configured to derive a second supplementary merging motion information candidate having a motion vector and a reference index that allow the prediction signal of the first prediction and the prediction signal of the second prediction to be identical with each other and to add the second supplementary merging motion information candidate to the merging motion information candidate list; and a merging motion information selection unit (231) configured to select one merging motion information candidate from the merging motion information candidate list to which the first supplementary merging motion information candidate and the second supplementary merging motion information candidate have been added and to derive the selected merging motion information candidate as the motion information of the prediction block subject to decoding, based on the specification index that has been decoded.

Yet another embodiment of the present invention relates to a moving image decoding device. This device is a moving picture decoding device adapted to partition a picture into a plurality of prediction blocks and perform motion compensation and includes: a decoding unit configured to decode, from a bitstream in which an index for specifying a merging motion information candidate used in a prediction block subject to decoding is coded, the index; a spatial merging motion information candidate derivation unit (160) configured to derive a spatial merging motion information candidate from motion information of a plurality of decoded neighboring blocks neighboring the prediction block subject to decoding; a temporal merging motion information candidate derivation unit (161) configured to derive a temporal merging motion information candidate from motion information of a block in a decoded picture different from a picture subject to decoding in which the prediction block subject to decoding is located; a merging motion information candidate list construction unit (162) configured to generate a merging motion information candidate list using the spatial merging motion information candidate and the temporal merging motion information candidate; a merging motion information candidate supplying unit (165) configured to generate a merging motion information candidate for bi-prediction where a motion vector value is the same for first prediction and second prediction and where a reference index of the first prediction or the second prediction is set to be a fixed value and to add the merging motion information candidate to the merging motion information candidate list; and a merging motion information selection unit (231) configured to select one merging motion information candidate from the merging motion information candidate list based on the index that has been decoded and to set the selected merging motion information candidate to be motion information of the prediction block subject to decoding.

Yet another embodiment of the present invention relates to a moving image decoding method. This method is a moving picture decoding method adapted to derive motion information including a reference index and a motion vector in units of prediction blocks and includes: decoding, from a bitstream, a specification index for specifying a merging motion information candidate used for a prediction block subject to decoding; deriving a spatial merging motion information candidate from motion information of a plurality of decoded prediction blocks neighboring the prediction block subject to decoding; deriving a temporal merging motion information candidate from motion information of a prediction block in a decoded picture different from a picture in which the prediction block subject to decoding is located; generating a merging motion information candidate list, which is a list of merging motion information candidates, using the spatial merging motion information candidate and the temporal merging motion information candidate; generating a new merging motion information candidate including, if the reference index indicates an available reference picture, the reference index and, if the reference index does not indicate an available reference picture, a predetermined reference index along with a motion vector having a size and a direction that are preset and adding the new merging motion information candidate to the merging motion information candidate list; and selecting one merging motion information candidate from the merging motion information candidate list to which the new merging motion information candidate has been added and deriving the selected merging motion information candidate as the motion information of the prediction block subject to decoding, based on the specification index that has been decoded.

Yet another embodiment of the present invention also relates to a moving picture decoding method. This method is a moving picture decoding method adapted to derive motion information including a reference index and a motion vector in units of prediction blocks and includes: decoding, from a bitstream, a specification index for specifying a merging motion information candidate used for a prediction block subject to decoding; deriving a spatial merging motion information candidate from motion information of a plurality of decoded prediction blocks neighboring the prediction block subject to decoding; deriving a temporal merging motion information candidate from motion information of a prediction block in a decoded picture different from a picture in which the prediction block subject to decoding is located; generating a merging motion information candidate list, which is a list of motion information candidates, using the spatial merging motion information candidate and the temporal merging motion information candidate; combining a motion vector and a reference index of a merging motion information candidate for first prediction and a motion vector and a reference index of a merging motion information candidate for second prediction from the merging motion information candidate list, deriving a first supplementary merging motion information candidate in which a prediction signal of the first prediction and a prediction signal of the second prediction are not identical with each other, and adding the first supplementary merging motion information candidate to the merging motion information candidate list; deriving a second supplementary merging motion information candidate having a motion vector and a reference index that allow the prediction signal of the first prediction and the prediction signal of the second prediction to be identical with each other and adding the second supplementary merging motion information candidate to the merging motion information candidate list; and selecting one merging motion information candidate from the merging motion information candidate list to which the first supplementary merging motion information candidate and the second supplementary merging motion information candidate have been added and deriving the selected merging motion information candidate as the motion information of the prediction block subject to decoding, based on the specification index that has been decoded.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 1A and 1B are diagrams explaining coding blocks;

FIG. 3 is a diagram explaining prediction block size types;

FIG. 4 is a diagram explaining prediction coding modes;

FIG. 5 is a diagram explaining relationships between merge indices and bitstreams;

FIG. 6 is a diagram explaining an example of syntax of a prediction block;

FIG. 14 is a flowchart explaining the operation of the merging motion information candidate list construction unit shown in FIG. 11;

FIG. 19 is a diagram explaining relationships among the number of combination checks, a merging motion information candidate M, and a merging motion information candidate N;

FIGS. 22A and 22B are diagrams explaining an example of a reference picture list;

FIGS. 23A and 23B are diagrams explaining an example of a relationship between a reference index of a second supplementary merging motion information candidate and a POC according to the first embodiment;

FIGS. 38A and 38B are diagrams explaining an example of a relationship between a reference index of a second supplementary merging motion information candidate and a POC according to the second embodiment;

FIGS. 40A and 40B are diagrams explaining an example of a relationship between a reference index of a second supplementary merging motion information candidate and a POC according to the third embodiment.

DETAILED DESCRIPTION

Figure 2D:
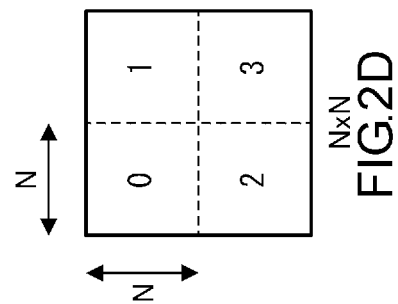
FIGS. 2A through 2D are diagrams explaining prediction block size types.

The invention will now be described by reference to the preferred embodiments. This does not intend to limit the scope of the present invention, but to exemplify the invention.

First, an explanation is first given of a technology on which embodiments of the present invention are based.

Currently, devices and systems complying with a coding system such as MPEG (Moving Picture Experts Group) or the like have become widely used. In such a coding system, a plurality of pictures that are continuous on a time axis are treated as digital signal information. In that case, for the purpose of highly efficient broadcasting, transmission, accumulation, and the like of information, compression coding is performed using motion compensation prediction where a picture is partitioned into a plurality of blocks and redundancy in a temporal direction is used and using orthogonal transformation such as discrete cosine transform where redundancy in a spatial direction is used.

In 2003, by cooperative work of Joint Technical Committee (ISO/IEC) of the International Organization for Standardization (ISO) and the International Electrotechnical Commission (IEC) and the International Telecommunication Union Telecommunication Standardization Sector (ITU-T), a coding system called AVC (a standard number of 14496-10 is assigned in ISO/IEC and a standard number of H.264 is assigned in ITU-I) was established as a global standard. In AVC, a median value of respective motion vectors of a plurality of neighboring blocks of a target block is basically set to be a vector predictor. If the size of a prediction block is not square and a reference index of a specific neighboring block of a target block is the same as a reference index of the target block, a motion vector of the specific neighboring block is set to be a vector predictor.

Currently, by cooperative work of Joint Technical Committee (ISO/IEC) of the International Organization for Standardization (ISO) and the International Electrotechnical Commission (IEC) and the International Telecommunication Union Telecommunication Standardization Sector (ITU-T), the standardization of a coding system called HEVC is under consideration.

In the standardization of HEVC, a merge mode is under consideration where a single candidate block is selected from a candidate block group composed of candidate blocks, which are a plurality of neighboring blocks of a target block and blocks of another picture that is decoded, so that information of the selected candidate block is coded and decoded and so that motion information of the selected candidate block is used as motion information of the target block. A vector predictor mode is under consideration where a single candidate block is selected from a candidate block group composed of candidate blocks, which are a plurality of neighboring blocks of the target block and blocks of another picture that is decoded, so that information of the selected candidate block is coded and decoded and so that a motion vector of the selected candidate block is used as a vector predictor of the target block.

First Embodiment (Coding Block)

In the present embodiment, a picture signal that has been input is partitioned in units of maximum coding blocks, and maximum coding blocks that have been partitioned are processed in raster scan order. A coding block has a hierarchical structure, and smaller coding blocks can be obtained by quartering the coding block sequentially in consideration of coding efficiency and the like. Quartered coding blocks are coded in zigzag scanning order. Minimum coding blocks that cannot be made any smaller are referred to as minimum coding blocks. Coding blocks represent coding units. If the number of partition occurrences is zero in a maximum coding block, the maximum coding block also represents a coding block. In the present embodiment, a maximum coding block represents 64 pixels×64 pixels, and a minimum coding block represents 8 pixels×8 pixels.

FIGS. 1A and 1B are diagrams for explaining coding blocks. In an example shown in FIG. 1A, a coding block is partitioned into ten pieces. CU0, CU1, and CU9 represent coding blocks of 32 pixels×32 pixels, CU2, CU3, and CU8 represent coding blocks of 16 pixels×16 pixels, and CU4, CU5, CU6, and CU7 represent coding blocks of 8 pixels×8 pixels. In an example shown in FIG. 1B, a coding block is partitioned into one piece.

(Prediction Block)

Figure 2C:
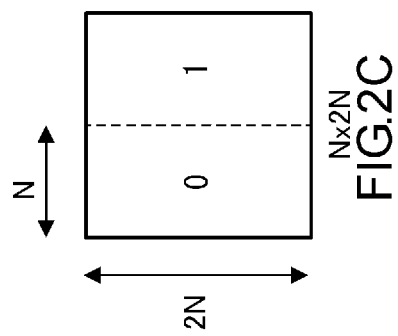
Figure 2B:
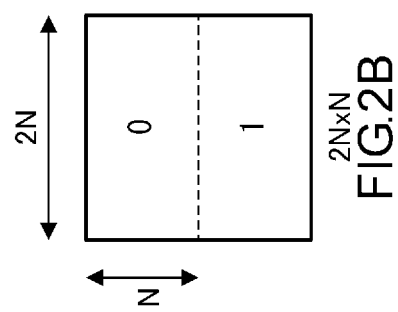
Figure 2A:
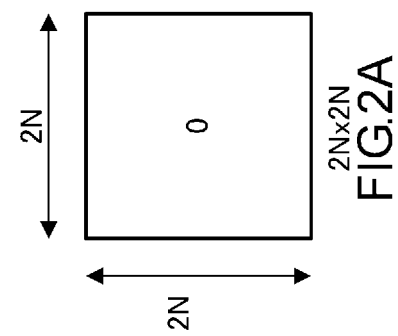

In the present embodiment, a coding block is further partitioned into prediction blocks (also referred to as partitions). A coding block is partitioned into greater than or equal to one prediction block according to a prediction block size type (also referred to as partitioning type or partition type). FIGS. 2A through 2D are diagrams for explaining prediction block size types. FIG. 2A shows 2N×2N where a coding block is not partitioned. FIG. 2B shows 2N×N where a coding block is halved in a horizontal direction. FIG. 2C shows N×2N where a coding block is halved in a vertical direction. FIG. 2D shows N×N where a coding block is quartered in a horizontal and in a vertical direction. 2N×2N consists of a single prediction block 0. Both 2N×N and N×2N each consist of two prediction blocks: a prediction block 0 and a prediction block 1. N×N consists of four prediction blocks: a prediction block 0, a prediction block 1, a prediction block 2, and a prediction block 3. Coding is performed in order of a prediction block 0, a prediction block 1, a prediction block 2, and a prediction block 3.

FIG. 3 is a diagram for explaining prediction block sizes according to the number of partition occurrences of a coding block and prediction block size types. For prediction block sizes in the present embodiment, there are 13 prediction block sizes from 64 pixels×64 pixels, where the number of CU partition occurrences is 0 and a prediction block size type is 2N×2N, to 4 pixels×4 pixels, where the number of CU partition occurrences is 3 and a prediction block size type is N×N. For example, a coding block can be halved in a horizontal or a vertical direction in an asymmetric manner.

In the present embodiment, a maximum coding block represents 64 pixels×64 pixels, and a minimum coding block represents 8 pixels×8 pixels. However, the maximum coding block and the minimum coding block are not limited to this combination. Partition patterns of a prediction block are shown to be those of FIGS. 2A through 2D. However, the partition patterns are not limited to this as long as the partition patterns are a combination of patterns where a prediction block is partitioned into greater than or equal to one piece.

(Pictures and Slices)

Pictures and slices are general concepts that are used in AVC, and the like. Thus, explanations thereof are omitted. Also, since I pictures, P pictures, B pictures, I slices, P slices, and B slices are also general concepts, explanations thereof are omitted. Hereinafter, an image may be referred to as a picture.

(Prediction Coding Mode)

In the present embodiment, motion compensation prediction and the number of coding vectors can be changed for each prediction block. An explanation is now given using FIG. 4 regarding an example of a prediction coding mode with which motion compensation prediction and the number of coding vectors are associated. FIG. 4 is a diagram for explaining prediction coding modes.

Prediction coding modes shown in FIG. 4 include PredL0 where a prediction direction of motion compensation prediction is uni-prediction (L0 prediction) and the number of coding vectors is 1, PredL1 where a prediction direction of motion compensation prediction is uni-prediction (L1 prediction) and the number of coding vectors is 1, PredB1 where a prediction direction of motion compensation prediction is bi-prediction (BI prediction) and the number of coding vectors is 2, and a merge mode (MERGE) where a prediction direction of motion compensation prediction is uni-prediction (L0 prediction/L1 prediction) or bi-prediction (BI prediction) and the number of coding vectors is 0. There is also an intra mode (Intra), which is a prediction coding mode where motion compensation prediction is not performed. In these modes, PredL0, PredL1, and PredB1 are vector predictor modes.

In the merge mode, a prediction direction can be any one of L0 prediction, L1 prediction, and BI prediction. This is because the prediction direction of a candidate block selected from a candidate block group is passed on without any change as the prediction direction of the merge mode, or the prediction direction of the merge mode is derived from decoded information. Also, a coding vector is not coded in the merge mode. This is because a motion vector of a candidate block selected from a candidate block group is passed on without any change as a coding vector of the merge mode, or the coding vector of the merge mode is derived by a predetermined rule.

(Reference Index)

The present embodiment allows an optimum reference picture to be selected from a plurality of reference pictures in motion compensation prediction for the improvement of the accuracy of the motion compensation prediction. Therefore, a reference picture used in the motion compensation prediction is coded along with a coding vector as a reference picture index. A reference picture index used in the motion compensation prediction has a numerical value of larger than or equal to 0. The types of reference indices include a reference index L0 (also referred to as a reference index of L0 prediction) and a reference index L1 (also referred to as a reference index of L1 prediction). If the motion compensation prediction is uni-prediction, any one of the reference index L0 and the reference index L1 is used as a reference index. If the motion compensation prediction is bi-prediction, two reference indices, the reference index L0 and the reference index L1, are used (FIG. 4). As a bitstream of the reference index, a Truncated Unary bitstream described later is used.

A reference index is not coded in the merge mode. This is because a reference index of a candidate block selected from a candidate block group is passed on without any change as a reference index of the merge mode, or the reference index of the merge mode is derived by a predetermined rule.

(Reference Picture List)

In the present embodiment, greater than or equal to one reference picture that can be used in motion compensation prediction is added in a reference picture list in advance, and, by indicating a reference picture added in the reference picture list by a reference index, the reference picture is determined and used in the motion compensation prediction. The types of reference picture lists include a reference picture list L0 (also referred to as a reference picture list of L0 prediction) and a reference picture list L1 (also referred to as a reference picture list of L1 prediction). If the motion compensation prediction is uni-prediction, either L0 prediction, where a reference picture in the reference picture list L0 is used, or L1 prediction, where a reference picture in the reference picture list L1 is used, is used. If the motion compensation prediction is bi-prediction, BI prediction, where both the reference picture list L0 and the reference picture list L1 are used, is used. Note that a reference index L0 indicates a reference picture in the reference picture list L0 and that a reference index L1 indicates a reference picture in the reference picture list L1.

(Merge Index)

In the case of a merge mode in the present embodiment, by using, as a candidate block group, a plurality of neighboring blocks in a target picture and blocks in and around a same-position prediction block located at the same position as a target prediction block in another picture that is coded, a candidate block having an optimum prediction coding mode, motion vector, and reference index is selected from the candidate block group so as to code and decode a merge index for indicating the selected candidate block. One merge index is used only during the merge mode (FIG. 4). In this case, the maximum number of merge indices (also referred to as the maximum number of merge candidates) is specified by a slice header. The maximum number of merge candidates will be described later. If the maximum number of merge candidates is 5, the merge index is an integer of 0 to 4.

Hereinafter, motion information of a candidate block subject to a merge index is referred to as a merging motion information candidate, and a collection of merging motion information candidates is referred to as a merging motion information candidate list. Hereinafter, motion information includes a prediction direction, a motion vector, and a reference index.

An explanation is now given regarding relationships between merge indices and bitstreams. FIG. 5 is a diagram for explaining relationships between merge indices and bitstreams when the maximum number of merge candidates is 5. As a bitstream of a merge index, a Truncated Unary bitstream is used. If a merge index is 0, a bitstream is "0". If a merge index is 1, a bitstream is "10". If a merge index is 2, a bitstream is "110". If a merge index is 3, a bitstream is "1110". If a merge index is 4, a bitstream is "1111". Thus, the merge indices and the bitstreams are set such that the respective bitstreams become shorter as the merge indices become smaller. Therefore, by assigning a small merge index to a candidate block with high selectivity, the coding efficiency can be improved.

If the maximum number of merge candidates is 4, a bitstream is "0" if a merge index is 0, a bitstream is "10" if a merge index is 1, a bitstream is "110" if a merge index is 2, and a bitstream is "111" if a merge index is 3. If the maximum number of merge candidates is 3, a bitstream is "0" if a merge index is 0, a bitstream is "10" if a merge index is 1, and a bitstream is "11" if a merge index is 2. If the maximum number of merge candidates is 2, a bitstream is "0" if a merge index is 0, and a bitstream is "1" if a merge index is 1. If the maximum number of merge candidates is 1, a merge index of 0 is not coded in a bitstream, and the merge index is implicitly processed as 0 at the time of decoding.

An explanation is now given regarding relationships between a merging motion information candidate list and merge indices. A merge index 0 represents a first (0-th) merging motion information candidate in a merging motion information candidate list. Hereinafter, a merge index m represents an m-th merging motion information candidate in the merging motion information candidate list, where m is an integer of 0 to [(maximum number of merge candidates)−1].

(Vector Predictor Index)

In order to improve the accuracy of a vector predictor in the present embodiment, by using, as a candidate block group, a plurality of neighboring blocks in a target picture and blocks in and around a same-position prediction block located at the same position as a target prediction block in another picture that is coded, a candidate block having an optimum motion vector as a vector predictor is selected from the candidate block group so as to code and decode a vector predictor index for indicating the selected candidate block. If the motion compensation prediction is uni-prediction, one vector predictor index is used. If the motion compensation prediction is bi-prediction, two vector predictor indices are used (FIG. 4). The maximum number of vector predictor indices (also referred to as the maximum number of vector predictor candidates) is 2, and a vector predictor index is an integer of 0 or 1. The maximum number of vector predictor indices is set to be 2 in this case. However, the maximum number of vector predictor indices is not limited to this as long as the maximum number of vector predictor indices is greater than or equal to 2. An explanation is now given regarding relationships between vector predictor indices and bitstreams. As a bitstream of a vector predictor index, a Truncated Unary bitstream is used. A bitstream of a vector predictor index is "0" when the vector predictor index is 0, and a bitstream of a vector predictor index is "1" when the vector predictor index is 1.

Hereinafter, a motion vector of a candidate block subject to a vector predictor index is referred to as a vector predictor candidate, and a collection of vector predictor candidates is referred to as a vector predictor candidate list. A vector predictor index 0 represents a first (0-th) vector predictor candidate in the vector predictor candidate list. Hereinafter, a vector predictor index m represents an m-th vector predictor candidate in the vector predictor candidate list, where m is an integer of 0 to [(maximum number of vector predictor candidates)−1].

(POC)

In an embodiments of the present invention, POC (Picture Order Count) is used as temporal information (distance information) of a picture. POC is a counter that indicates the display order of a picture and is the same as the one defined in AVC. In this case, it is assumed that a POC increases by one when the display order of a picture increases by one. Therefore, a temporal difference (distance) between pictures can be acquired based on a POC difference between the pictures.

(Syntax)

An explanation is given regarding an example of syntax of a prediction block according to the present embodiment. FIG. 6 is a diagram explaining syntax according to the present embodiment. FIG. 6 shows an example of a syntax structure of a PPS (Picture Parameter Set), a slice header (Slice Header), a coding tree (Coding Tree), a coding block (Coding Unit), and a prediction block (Prediction Unit).

A PPS is a parameter set that defines a parameter group for determining the properties of a picture. For a PPS, a predetermined maximum value of a reference index of L0 prediction (num_ref_idx_l0_default_active_minus1), a predetermined maximum value of a reference index of L1 prediction (num_ref_idx_l1_default_active_minus1), and a temporal candidate utilization permission flag (enable_temporal_mvp_flag) that can be used in the picture are set.

A temporal candidate utilization permission flag is a code of one bit that takes the value of 0 or 1 and is a flag for restricting the use of a motion vector and a reference index on a ColPic. If the temporal candidate utilization permission flag is 1, the motion vector and the reference index on the ColPic becomes available. If the temporal candidate utilization permission flag is 0, the motion vector and the reference index on the ColPic becomes unavailable. In the embodiment, an explanation is made on the assumption that the temporal candidate utilization permission flag is 1.

A slice header is a header that defines a parameter group for determining the properties of a slice. In the slice header, a flag (num_ref_idx_active_override_flag) for changing the maximum value of a reference index that can be used in the slice when the slice is a P slice or a B slice, the maximum value of a reference index of L0 prediction (num_ref_idx_l0_active_minus1), and the maximum value of a reference index of L1 prediction (num_ref_idx_l1_active_minus1) are set.

If the flag for changing the maximum value of the reference index is 1, the maximum value of the reference index of L0 prediction (num_ref_idx_l0_active_minus1) that can be used in the slice is set in the slice header, and if the slice is a B slice, the maximum value of the reference index of L1 prediction (num_ref_idx_l1_active_minus1) that can be used in the slice is further set in the slice header and used.

If the flag for changing the maximum value of the reference index is 0, the predetermined maximum value of the reference index of L0 prediction that is set in the PPS is used as the maximum value of the reference index of L0 prediction that can be used in the slice, and the predetermined maximum value of the reference index of L1 prediction that is set in the PPS is applied as the maximum value of the reference index of L1 prediction that can be used in the slice.

If the slice is a P slice or a B slice, 5_minus_max_num_merge_cands, which is a parameter for determining the maximum number of merge candidates, is set. 5_minus_max_num_merge_cands is a parameter for determining the maximum number of the merge candidates and is an integer of 0 to 4. The maximum number of the merge candidates (MaxNumMergeCand) is calculated by subtracting 5_minus_max_num_merge_cands from 5. It is assumed that a Truncated Unary bitstream is used for a bitstream of 5_minus_max_num_merge_cands. In the present embodiment, an explanation is given on the assumption that 5_minus_max_num_merge_cands is 0 and that the maximum number of the merge candidates is 5. In the coding tree, partition information of the coding block is managed. In the coding tree, split_coding_unit_flag is set. If the split_coding_unit_flag is 1, the coding tree is partitioned into four coding trees. If the split_coding_unit_flag is 0, the coding tree represents a coding block.

In the coding block, a skip mode flag (skip_flag), a prediction mode (pred_mode), and a prediction block size type (part_mode) are set. The coding block is partitioned into one, two, or four prediction blocks according to the skip mode flag and the prediction block size type.

The prediction mode shows whether the coding block is a coding block on which intra prediction is performed or a coding block on which inter prediction (motion compensation prediction) is performed. If the skip mode flag is 1, a skip mode is implemented, having one prediction block in the skip mode. The number of partition occurrences of a coding block is also referred to as a depth of the coding block (coding tree).

Set in the prediction block are a merge flag (merge_flag), a merge index (merge_idx), an inter prediction type (inter_pred_type), a reference index of the L0 prediction (ref_idx_l0), a vector difference of the L0 prediction (mvd_l0 [0], mvd_l0[1]), a vector predictor index of the L0 prediction (mvp_idx_l0), a reference index of the L1 prediction (ref_idx_l1), a vector difference of the L1 prediction (mvd_l1[0], mvd_l1[1]), and a vector predictor index of the L1 prediction (mvp_idx_l1). In the vector difference, [0] represents the horizontal component, and [1] represents the vertical component.

In this case, inter_pred_type shows a prediction direction of motion compensation prediction (also referred to as an inter prediction type) and includes three types: Pred_L0 (uni-prediction of L0 prediction); Pred_L1 (uni-prediction of L1 prediction); and Pred_BI (bi-prediction of BI prediction). If inter_pred_type is Pred_L0 or Pred_BI, information related to the L0 prediction is set. If inter_pred_type is Pred_L1 or Pred_BI, information related to the L1 prediction is set. In a P slice, inter_pred_type uniquely represents Pred_L0. Thus, inter_pred_type is omitted.

In the case of the skip mode, a prediction block is a coding block on which inter prediction is performed, and a merge mode is used as a prediction coding mode. Therefore, a merge index is set in the case of the skip mode.

Syntax according to the present embodiment is set as shown in FIG. 6. However, the syntax is not limited to this as long as coding blocks and prediction blocks have a plurality of block sizes, a reference picture is used, and the merge mode and the vector predictor mode can be used.

An explanation is given hereinafter, along with figures, regarding the details of a moving picture coding device, a moving picture coding method, and a moving picture coding program, and moving picture decoding device, a moving picture decoding method, and a moving picture decoding program according to a preferred embodiment of the present invention. In the explanations of the figures, the same elements shall be denoted by the same reference numerals, and duplicative explanations will be omitted.

(Configuration of Moving Picture Coding Device 100)

Figure 7:
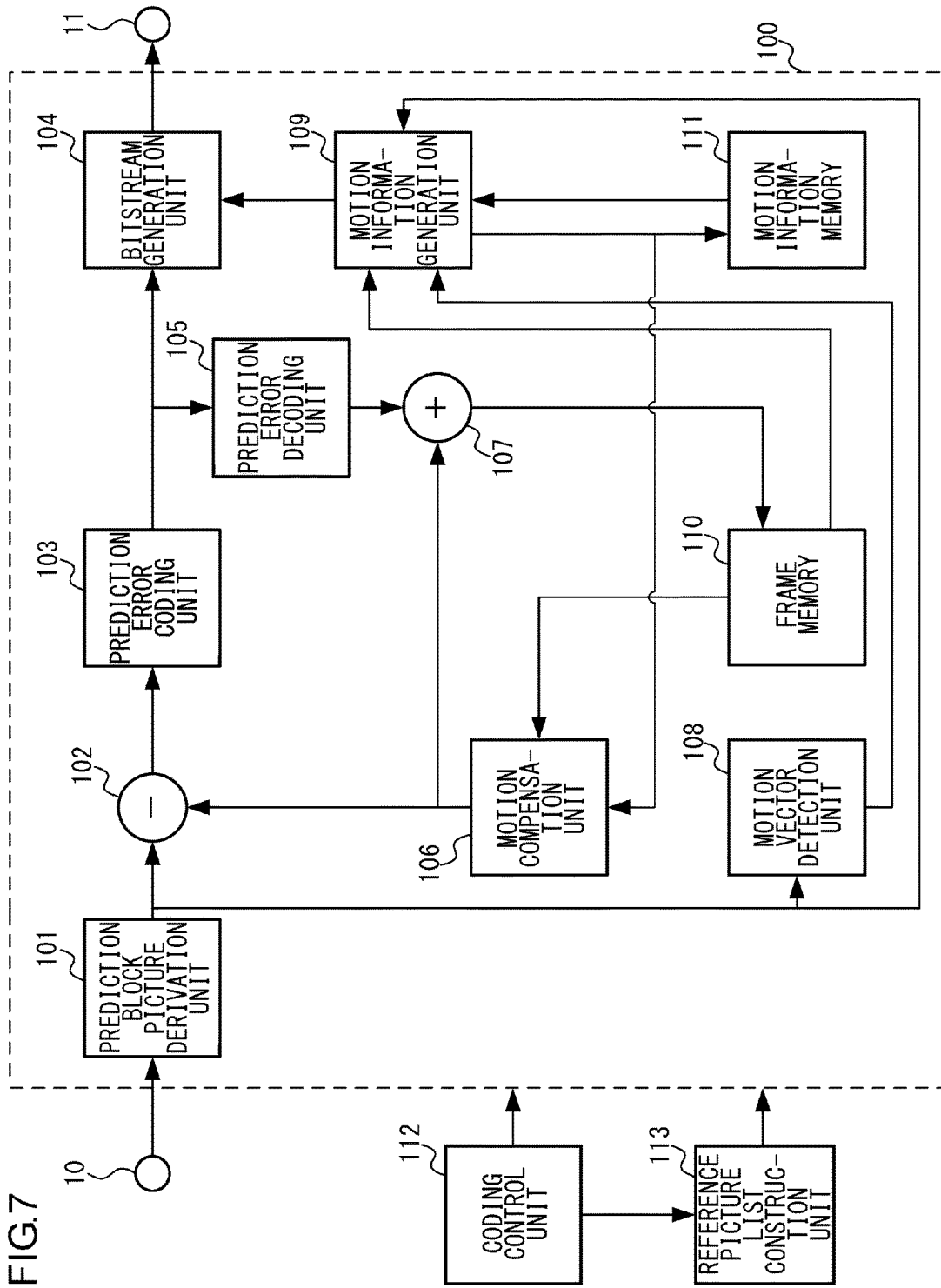
FIG. 7 is a diagram showing the configuration of a moving picture coding device according to a first embodiment.

FIG. 7 shows the configuration of a moving picture coding device 100 according to a first embodiment. The moving picture coding device 100 is a device that codes a moving picture signal in units of prediction blocks for performing motion compensation prediction. The determination of a slice type, the maximum value of a reference index that can be used in a slice, the partition of a coding block, the determination of a skip mode, the determination of a prediction block size type, the determination of a prediction block size and a position in a coding block of a prediction block (also referred to as position information or a prediction block number of a prediction block), and the determination of whether a prediction coding mode is intra are determined by a coding control unit 112 outside the moving picture coding device 100 and supplied to the moving picture coding device 100. A reference picture list is constructed by a reference picture list construction unit 113 outside the moving picture coding device 100 and supplied to the moving picture coding device 100. An explanation is given regarding a case where a prediction coding mode is not intra. An explanation is given regarding a B picture (B slice), which corresponds to bi-prediction, in the first embodiment unless otherwise noted. For a P picture (P slice), which does not correspond to bi-prediction, L1 prediction needs to be omitted.

The moving picture coding device 100 is achieved by hardware such as an information processing device or the like provided with a CPU (Central Processing Unit), a frame memory, a hard disk, and the like. By the operation of the above constituting elements, the moving picture coding device 100 achieves functional constituting elements explained in the following. The slice type, the reference picture list, the maximum value of the reference index that can be used in the slice, and the position information, the prediction block size, and the prediction direction of motion compensation prediction of a target prediction block are assumed to be shared in the moving picture coding device 100 and are thus not shown.

The moving picture coding device 100 according to the first embodiment includes a prediction block picture derivation unit 101, a subtraction unit 102, a prediction error coding unit 103, a bitstream generation unit 104, a prediction error decoding unit 105, a motion compensation unit 106, an addition unit 107, a motion vector detection unit 108, a motion information generation unit 109, a frame memory 110, and a motion information memory 111.

(Function and Operation of Moving Picture Coding Device 100)

An explanation is given in the following regarding the function and operation of each component. The prediction block picture derivation unit 101 derives a picture signal of a target prediction block from a picture signal supplied from a terminal 10 based on the position information and prediction block size of the prediction block and supplies the picture signal of the prediction block to the subtraction unit 102, the motion vector detection unit 108, and the motion information generation unit 109.

The motion vector detection unit 108 detects respective motion vectors and respective reference indices showing reference pictures for L0 prediction and L1 prediction in the picture signal supplied by the prediction block picture derivation unit 101 and respective picture signals corresponding to a plurality of reference pictures stored therein. The motion vector detection unit 108 supplies the respective motion vectors of the L0 prediction and the L1 prediction and the respective reference indices of the L0 prediction and the L1 prediction to the motion information generation unit 109. Although it is described that the motion vector detection unit 108 uses respective picture signals corresponding to the plurality of reference pictures stored therein as reference pictures, the motion vector detection unit 108 can also use reference pictures stored in the frame memory 110.

In a commonly-practiced method of detecting a motion vector, an evaluation value of an error between a picture signal of a target picture and a prediction signal of a reference picture moved from the same position by a predetermined amount of displacement is calculated, and an amount of displacement that results in the smallest evaluation value of the error is set to represent a motion vector. If there a plurality of reference pictures, a motion vector is detected for each of the reference pictures, and a reference picture with the smallest evaluation value of the error is selected. As the evaluation value of the error, a SAD (Sum of Absolute Difference) showing the sum of an absolute difference, an MSE (Mean Square Error) showing a mean square error, or the like can be used. It is also possible to add a motion vector coding amount to the evaluation value of the error so as to make evaluation.

The motion information generation unit 109 determines a prediction coding mode based on the respective motion vectors of the L0 prediction and the L1 prediction and the respective reference indices of the L0 prediction and the L1 prediction supplied by the motion vector detection unit 108, a candidate block group supplied by the motion information memory 111, the reference pictures stored in the frame memory 110 that are indicated by the respective reference indices, and the picture signal supplied by the prediction block picture derivation unit 101.

Based on the prediction coding mode that has been determined, the motion information generation unit 109 supplies, to the bitstream generation unit 104, a merge flag, a merge index, a prediction direction of motion compensation prediction, respective reference indices of the L0 prediction and the L1 prediction, respective vector differences of the L0 prediction and the L1 prediction, and respective vector predictor indices of the L0 prediction and the L1 prediction, as necessary. The motion information generation unit 109 supplies, to the motion compensation unit 106 and the motion information memory 111, the prediction direction of motion compensation prediction, the respective reference indices of the L0 prediction and the L1 prediction, and respective motion vectors of the L0 prediction and the L1 prediction. Details of the motion information generation unit 109 will be described later.

If the prediction direction of motion compensation prediction supplied by the motion information generation unit 109 is LN prediction, the motion compensation unit 106 performs motion compensation on a reference picture in the frame memory 110 that is indicated by a reference index of LN prediction supplied by the motion information generation unit 109 based on a motion vector of LN prediction supplied by the motion information generation unit 109 so as to generate a prediction signal for LN prediction. N is 0 or 1. If the prediction direction of motion compensation prediction is bi-prediction, an average value of respective prediction signals for the L0 prediction and the L1 prediction is set to represent the prediction signal. The respective prediction signals for the L0 prediction and the L1 prediction may be weighted. The motion compensation unit 106 supplies the prediction signals to the subtraction unit 102.

The subtraction unit 102 subtracts the picture signal supplied by the prediction block picture derivation unit 101 and the prediction signals supplied by the motion compensation unit 106 so as to calculate a prediction error signal and supplies the prediction error signal to the prediction error coding unit 103.

The prediction error coding unit 103 generates prediction error coding data by performing a process such as orthogonal transformation, quantization, or the like on the prediction error signal provided from the subtraction unit 102 and supplies the prediction error coding data to the bitstream generation unit 104 and the prediction error decoding unit 105.

The bitstream generation unit 104 subjects the prediction error coding data supplied by the prediction error coding unit 103 and the merge flag, the merge index, the prediction direction (inter prediction type) of motion compensation prediction, the respective reference indices of the L0 prediction and the L1 prediction, the respective vector differences of the L0 prediction and the L1 prediction, and the respective vector predictor indices of the L0 prediction and the L1 prediction supplied by the motion information generation unit 109 to entropy coding according to the order of the syntax shown in FIG. 6 so as to generate a bitstream and supplies the bitstream to the terminal 11 as a bitstream. The entropy coding is performed by a method including variable-length coding such as arithmetic coding, Huffman coding, or the like.

The bitstream generation unit 104 multiplexes the partition information for the coding block, the prediction block size type, the position in the coding block of the prediction block, and the prediction coding mode used in the moving picture coding device 100 in the bitstream along with an SPS (Sequence Parameter Set) defining a parameter group for determining the properties of the bitstream, a PPS (Picture Parameter Set) defining a parameter group for determining the properties of the picture, a slice header defining a parameter group for determining the properties of the slice, and the like.

The prediction error decoding unit 105 generates a prediction error signal by performing a process such as inverse quantization, inverse orthogonal transformation, or the like on the prediction error coding data supplied by the prediction error coding unit 103 and supplies the prediction error signal to the addition unit 107. The addition unit 107 adds the prediction error signal supplied by the prediction error decoding unit 105 and the prediction signals supplied by the motion compensation unit 106 so as to generate a decoding picture signal and supplies the decoding picture signal to the frame memory 110.

The frame memory 110 stores the decoding picture signal supplied by the addition unit 107. For a decoded picture in which the decoding of the entire picture has been completed, the frame memory 110 stores, along with the POC of the reference picture, a predetermined number of greater than or equal to one picture thereof as a reference picture. The frame memory 110 supplies a stored reference picture signal to the motion compensation unit 106 and the motion information generation unit 109. A storage area that stores the reference images is controlled by a FIFO (First In First Out) method. In this case, the POC of the reference picture is stored in the frame memory 110. However, as long as the reference picture and the POC can be uniquely identified, the storage of the POC of the reference picture is not limited to this. Also, the POC is not shown in the figure as being shared in the moving picture coding device 100, the coding control unit 112, and the reference picture list construction unit 113.

The motion information memory 111 stores motion information supplied by the motion information generation unit 109 for a predetermined number of pictures in units of the minimum prediction block sizes. The motion information memory 111 sets the motion information of a neighboring block of the target prediction block to represent a spatial candidate block group.

Also, the motion information memory 111 sets motion information in a same-position prediction block, which is located at the same position as the target prediction block, on a ColPic and a block around the same-position prediction block to represent a temporal candidate block group. The motion information memory 111 supplies the spatial candidate block group and the temporal candidate block group to the motion information generation unit 109 as candidate block groups. The motion information memory 111 is synchronized with the frame memory 110 and is controlled by the FIFO (First In First Out) method.

A ColPic is a picture that has been decoded and that is different from a picture with a target prediction block and is stored in the frame memory 110 as a reference picture. In the first embodiment, a ColPic is a reference picture that is decoded immediately before a target picture. In the first embodiment, the ColPic is a reference picture that is decoded immediately before a target picture. However, as long as the ColPic is a decoded picture, the ColPic may be, for example, a reference picture immediately before or immediately after the target picture in the order of display or a 0-th reference picture of the reference picture list of L0 prediction or L1 prediction and can be specified in a bitstream.

An explanation is now given regarding a method of managing the motion information in the motion information memory 111. The motion information is stored in units of the minimum prediction blocks in each memory area. Each memory area stores at least a prediction direction, a motion vector of L0 prediction, a reference index of L0 prediction, a motion vector of L1 prediction, and a reference index of L1 prediction.

If the prediction coding mode is the intra mode, (0,0) is stored as the respective motion vectors of the L0 prediction and the L1 prediction, and "−1" is stored as the respective reference indices of the L0 prediction and L1 prediction. Hereinafter, in (H,V) of a motion vector, H represents a horizontal component, and V represents a vertical component. As long as it can be determined that a mode where motion compensation prediction is not performed is used, the value "−1" of the reference indices may be any value. Hereinafter, what is simply expressed as "block" represents the minimum prediction block unit unless otherwise noted. The same holds for a block outside the area. As in the case of the intra mode, (0,0) is stored as respective motion vectors of L0 prediction and L1 prediction, and "−1" is stored as respective reference indices of L0 prediction and L1 prediction. An LX direction (X is 0 or 1) being valid means that a reference index in the LX direction is larger than or equal to 0. The LX direction being invalid (not valid) means that the reference index in the LX direction is "−1".

(Operation of Reference Picture List Construction Unit 113)

Next, an explanation is given regarding the operation of the reference picture list construction unit 113. The reference picture list construction unit 113 constructs a reference picture list according to the slice type supplied from the coding control unit 112. If the slice type is a P slice or a B slice, the reference picture list construction unit 113 constructs a reference picture list L0. If the slice type is a B slice, the reference picture list construction unit 113 constructs a reference picture list L1.

Figure 8:
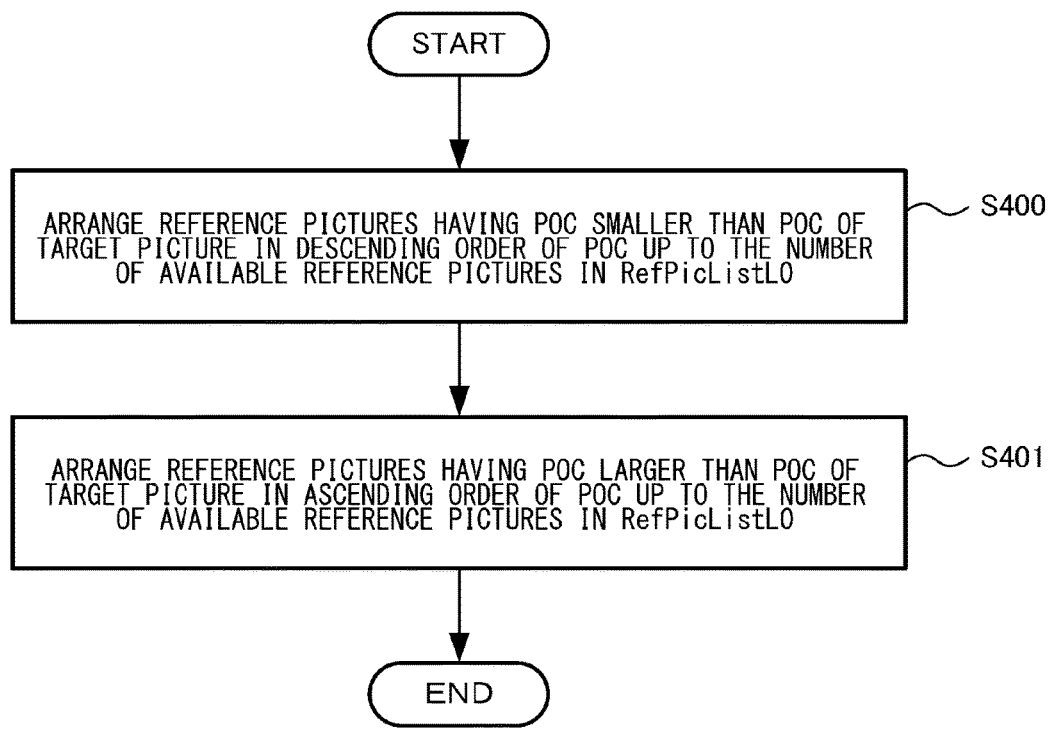
FIG. 8 is a flowchart explaining the operation of constructing a reference picture list L0.

FIG. 8 is a flowchart explaining the operation of constructing a reference picture list L0. Using FIG. 8, an explanation is given regarding the operation of constructing the reference picture list L0. First, the reference picture list construction unit 113 arranges reference pictures having a POC smaller than the POC of the target picture in the descending order of POC up to the number of available reference pictures in the reference picture list L0 (RefPicListL0) (S400). Subsequently, the reference picture list construction unit 113 arranges reference pictures having a POC larger than the POC of the target picture in the ascending order of POC up to the number of the available reference pictures in the reference picture list L0 (RefPicListL0) (S401). In this case, the number of available reference pictures in the reference picture list L0 (RefPicListL0) is a value obtained by adding 1 to the maximum value of the reference index of L0 prediction (num_ref_idx_l0_active_minus1).

Figure 9:
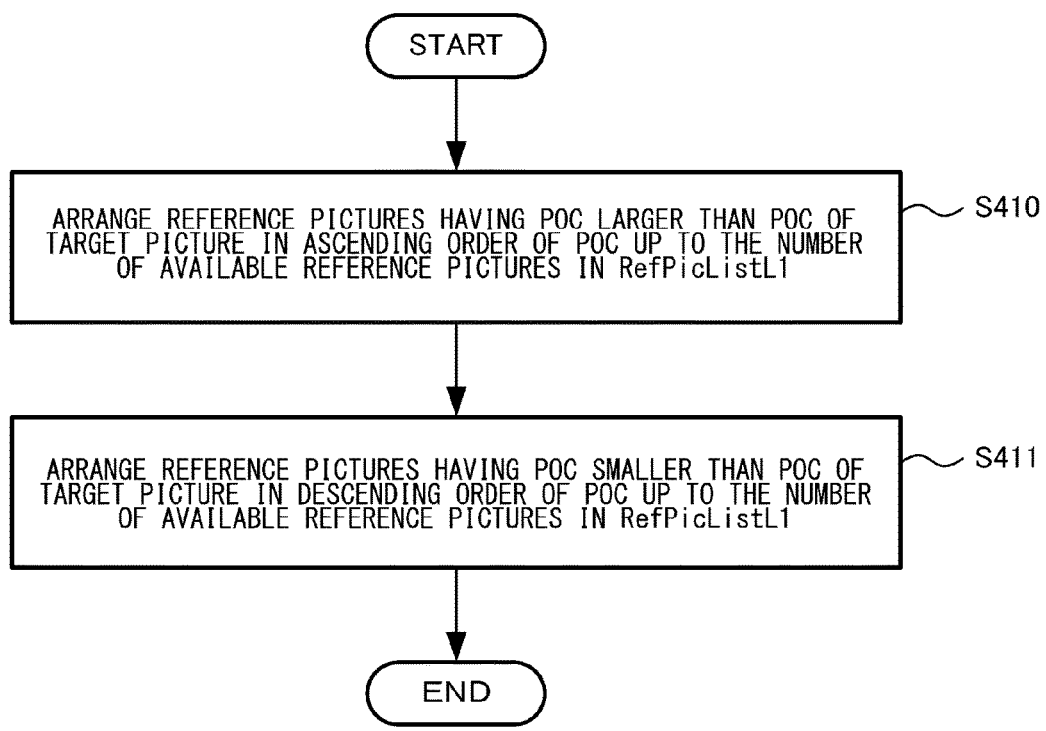
FIG. 9 is a flowchart explaining the operation of constructing a reference picture list L1.

FIG. 9 is a flowchart explaining the operation of constructing a reference picture list L1. Using FIG. 9, an explanation is given regarding the operation of constructing the reference picture list L1. First, the reference picture list construction unit 113 arranges reference pictures having a POC larger than the POC of the target picture in the ascending order of POC up to the number of available reference pictures in the reference picture list L1 (RefPicListL1) (S410). Subsequently, the reference picture list construction unit 113 arranges reference pictures having a POC smaller than the POC of the target picture in the descending order of POC up to the number of the available reference pictures in the reference picture list L1 (RefPicListL1) (S411). In this case, the number of the available reference pictures in the reference picture list L1 (RefPicListL1) is a value obtained by adding 1 to the maximum value of the reference index of L1 prediction (num_ref_idx_l1_active_minus1).

As described above, the reference pictures are arranged in the reference picture list L0 starting from a reference picture that is displayed earlier than the target picture and that is close to the target picture. The reference pictures are arranged in the reference picture list L1 starting from a reference picture that is displayed after the target picture and that is close to the target picture.

Also, if the number of the available reference pictures in the reference picture list L0 (Ref PicListL0) is larger than the number of reference pictures displayed earlier than the target picture, the reference picture list L0 has the same reference pictures as those in the reference picture list L1. If the number of the available reference pictures in the reference picture list L1 (Ref PicListL1) is larger than the number of reference pictures displayed after the target picture, the reference picture list L1 has the same reference pictures as those in the reference picture list L0. This allows for bi-prediction using the same reference pictures.

(Configuration of Motion Information Generation Unit 109)

Figure 10:
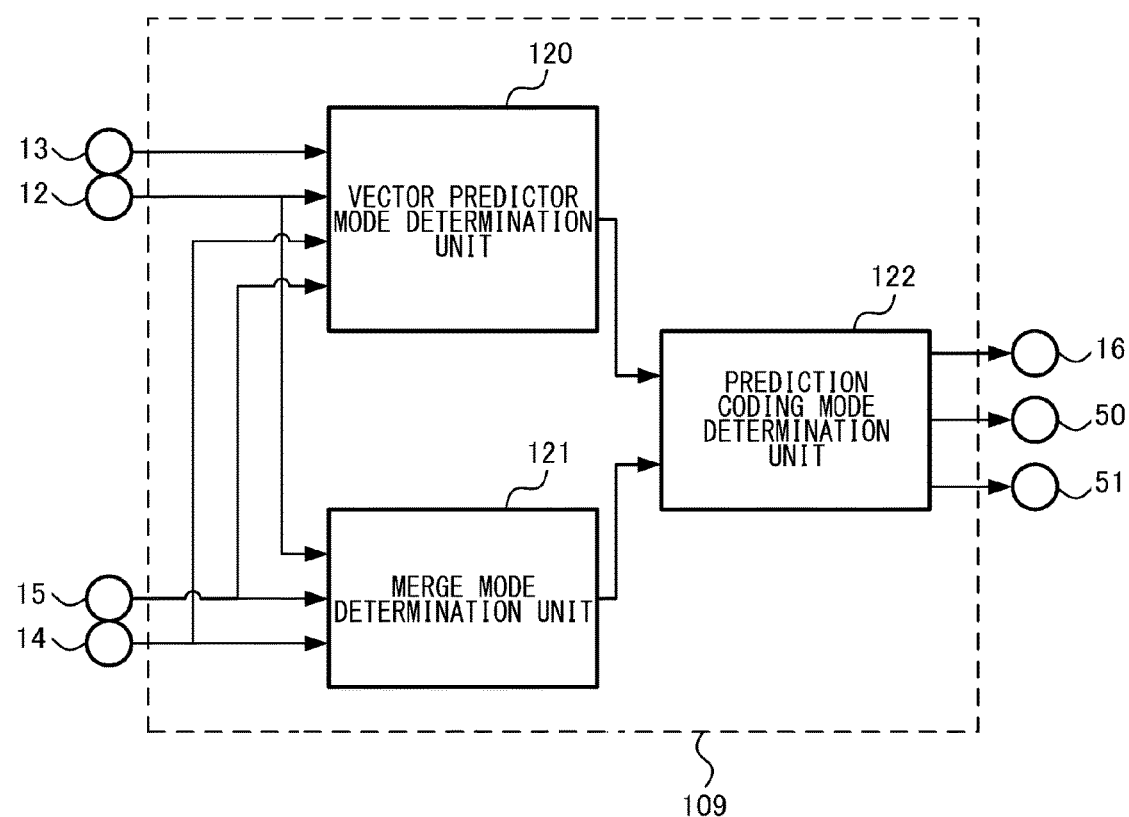
FIG. 10 is a diagram showing the configuration of a motion information generation unit shown in FIG. 7.

An explanation is now given regarding the detailed configuration of the motion information generation unit 109. FIG. 10 shows the configuration of the motion information generation unit 109. The motion information generation unit 109 includes a vector predictor mode determination unit 120, a merge mode determination unit 121, and a prediction coding mode determination unit 122. A terminal 12, a terminal 13, a terminal 14, a terminal 15, a terminal 16, a terminal 50, and a terminal 51 are connected to the motion information memory 111, the motion vector detection unit 108, the frame memory 110, the prediction block picture derivation unit 101, the bitstream generation unit 104, the motion compensation unit 106, and the motion information memory 111, respectively.

(Function and Operation of Motion Information Generation Unit 109)

An explanation is given in the following regarding the function and operation of each component. The vector predictor mode determination unit 120 determines an inter prediction type based on a candidate block group supplied by the terminal 12, respective motion vectors of L0 prediction and L1 prediction and respective reference indices of the L0 prediction and the L1 prediction supplied by the terminal 13, a reference picture indicated by a reference index supplied by the terminal 14, and a picture signal supplied by the terminal 15. Based on the inter prediction type, the vector predictor mode determination unit 120 selects respective vector predictor indices of the L0 prediction and the L1 prediction so as to calculate respective vector differences of the L0 prediction and the L1 prediction and calculate a prediction error and also calculates a rate distortion evaluation value. The vector predictor mode determination unit 120 then supplies motion information, the vector differences, the vector predictor indices, and the rate distortion evaluation value based on the inter prediction type to the prediction coding mode determination unit 122. Details of the vector predictor mode determination unit 120 will be described later.

The merge mode determination unit 121 constructs a merging motion information candidate list from the candidate block group supplied by the terminal 12, the reference picture supplied by the terminal 14, and the picture signal supplied by the terminal 15, selects one merging motion information candidate from the merging motion information candidate list so as to determine a merge index, and calculates a rate distortion evaluation value. The merge mode determination unit 121 then supplies motion information of the merging motion information candidate, the merge index, and the rate distortion evaluation value to the prediction coding mode determination unit 122. Details of the merge mode determination unit 121 will be described later.

The prediction coding mode determination unit 122 determines a merge flag by comparing the rate distortion evaluation value supplied by the vector predictor mode determination unit 120 and the rate distortion evaluation value supplied by the merge mode determination unit 121.

If the rate distortion evaluation value for the vector predictor mode is less than the rate distortion evaluation value for the merge mode, the prediction coding mode determination unit 122 sets the merge flag to "0". The prediction coding mode determination unit 122 supplies, to the terminal 16, the merge flag and the inter prediction type, the reference indices, the vector differences, and the vector predictor index supplied by the vector predictor mode determination unit 120 and supplies the motion information supplied by the vector predictor mode determination unit 120 to the terminals 50 and 51.

If the rate distortion evaluation value for the merge mode is the rate distortion evaluation value for the vector predictor mode or less, the prediction coding mode determination unit 122 sets the merge flag to "1". The prediction coding mode determination unit 122 supplies, to the terminal 16, the merge flag and the merge index supplied by the merge mode determination unit 121 and supplies the motion information supplied by the merge mode determination unit 121 to the terminals 50 and 51. A specific method of calculating a rate distortion evaluation value is not the main point of the present invention, and a detailed explanation thereof is thus omitted. From a prediction error and a coding amount, a prediction error amount per a coding amount is calculated. The rate distortion evaluation value is an evaluation value that has a property where the coding efficiency becomes higher as the rate distortion evaluation value becomes smaller. Therefore, by selecting a prediction coding mode with a small rate distortion evaluation value, the coding efficiency can be improved.

(Configuration of Merge Mode Determination Unit 121)

Figure 11:
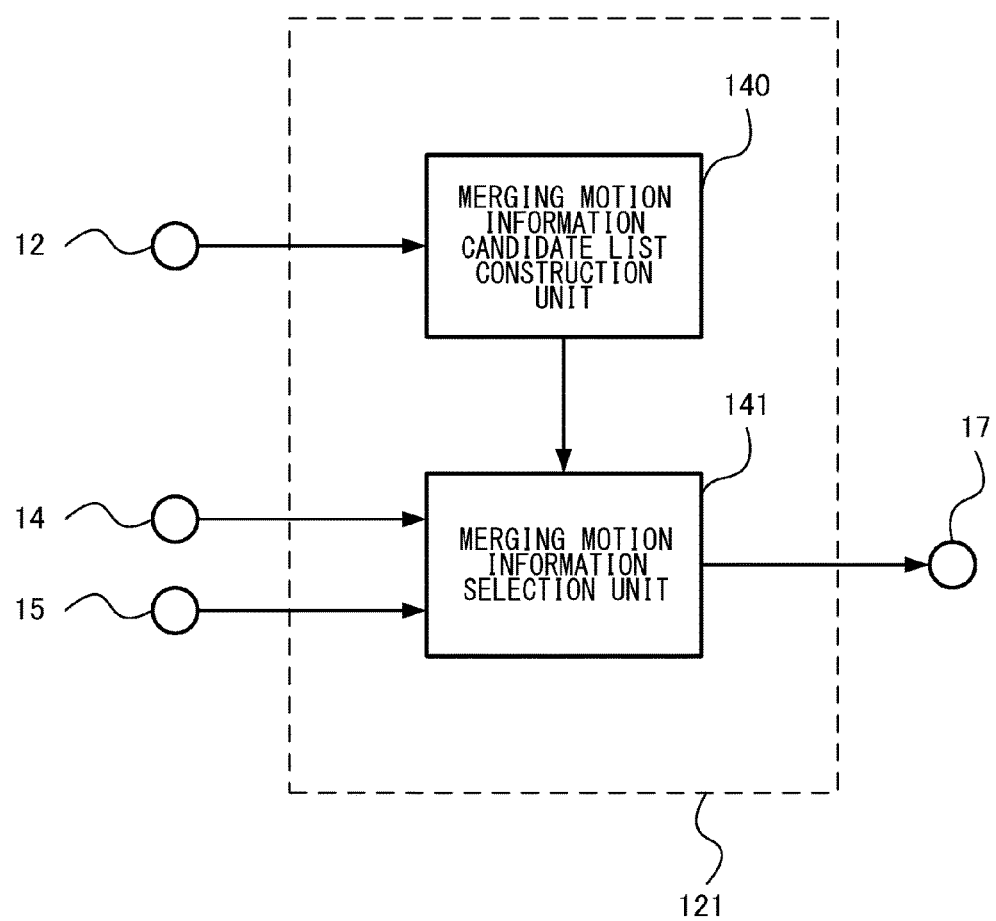
FIG. 11 is a diagram explaining the configuration of a merge mode determination unit shown in FIG. 10.

An explanation is now given regarding the detailed configuration of the merge mode determination unit 121. FIG. 11 is a diagram explaining the configuration of the merge mode determination unit 121. The merge mode determination unit 121 includes a merging motion information candidate list construction unit 140 and a merging motion information selection unit 141. A merging motion information candidate list construction unit 140 is also provided in the same way in a moving picture decoding device 200 that decodes a bitstream generated by the moving picture coding device 100 according to the first embodiment, and an identical merging motion information list is constructed each in the moving picture coding device 100 and the moving picture decoding device 200.

(Function and Operation of Merge Mode Determination Unit 121)

Figure 12:
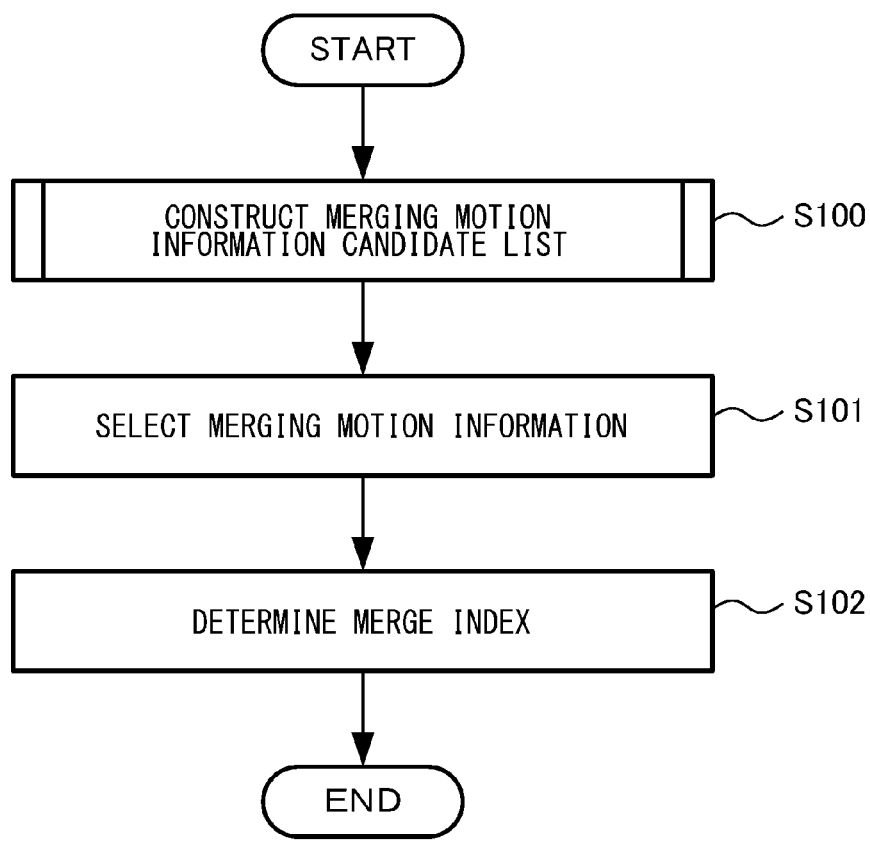
FIG. 12 is a flowchart explaining the operation of the merge mode determination unit.

An explanation is given in the following regarding the function and operation of each component. FIG. 12 is a flowchart explaining the operation of the merge mode determination unit 121. The merging motion information candidate list construction unit 140 constructs a merging motion information list including merging motion information candidates of the maximum number of merge candidates from the candidate block group supplied by the terminal 12 (S100) and supplies the merging motion information candidate list to the merging motion information selection unit 141. The detailed configuration of the merging motion information candidate list construction unit 140 will be described later.

The merging motion information selection unit 141 selects an optimum merging motion information candidate from the merging motion information candidate list supplied from the merging motion information candidate list construction unit 140 (S101), determines a merge index serving as information indicating the selected merging motion information candidate (S102), and supplies the merge index to the terminal 17.

An explanation is now given regarding a method of selecting the optimum merging motion information candidate. A prediction error amount is calculated from the reference picture obtained by performing motion compensation prediction based on the prediction direction, motion vector, and reference index of the merging motion information candidate and supplied by the terminal 14 and from the picture signal supplied by the terminal 15. A rate distortion evaluation value is calculated from the coding amount of the merge index and the prediction error amount, and a merging motion information candidate with the smallest rate distortion evaluation value is selected as the optimum merging motion information candidate.

(Configuration of Merging Motion Information Candidate List Construction Unit 140)

Figure 13:
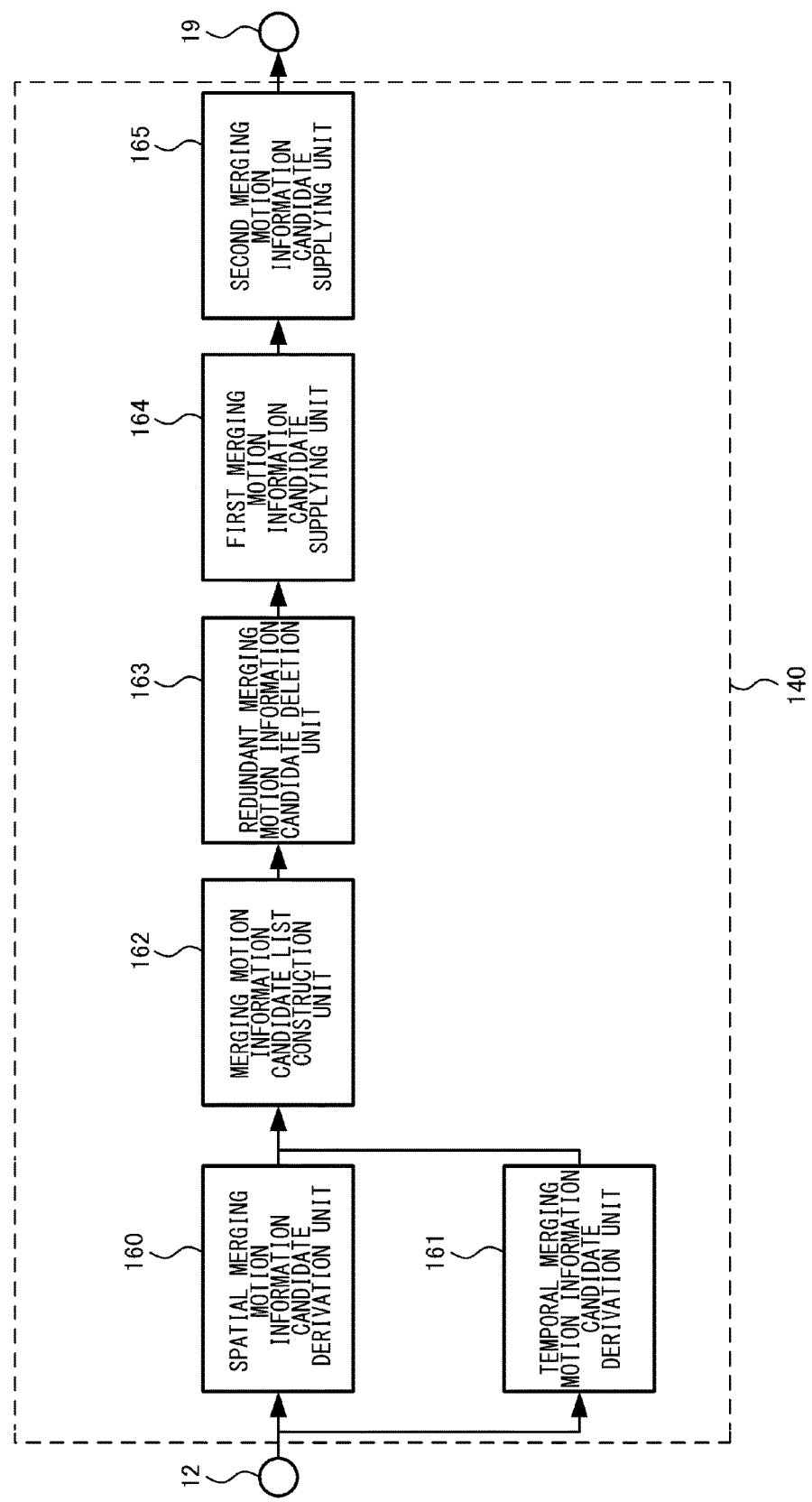
FIG. 13 is a diagram explaining the configuration of a merging motion information candidate list construction unit shown in FIG. 11.

An explanation is now given of the detailed configuration of the merging motion information candidate list construction unit 140. FIG. 13 is a diagram for explaining the configuration of the merging motion information candidate list construction unit 140. A terminal 19 is connected to the merging motion information selection unit 141. The merging motion information candidate list construction unit 140 includes a spatial merging motion information candidate derivation unit 160, a temporal merging motion information candidate derivation unit 161, a merging motion information candidate list construction unit 162, a redundant merging motion information candidate deletion unit 163, a first merging motion information candidate supplying unit 164, and a second merging motion information candidate supplying unit 165.

(Function and Operation of Merging Motion Information Candidate List Construction Unit 140)

An explanation is given in the following regarding the function and operation of each component. FIG. 14 is a flowchart for explaining the operation of the merging motion information candidate list construction unit 140.

First, the spatial merging motion information candidate derivation unit 160 derives spatial merging motion information candidates, as many as zero to the maximum number of spatial merging motion information candidates, from the spatial candidate block group supplied by the terminal 12 (S110) and supplies the spatial merging motion information candidates to the merging motion information candidate list construction unit 162. The detailed operation of the spatial merging motion information candidate derivation unit 160 will be described later. Descriptions will be also made later regarding the maximum number of spatial merging motion information candidates.

Next, the merging motion information candidate list construction unit 140 checks whether the temporal candidate utilization permission flag (enable_temporal_mvp_flag) is 1 (S111).

If the temporal candidate utilization permission flag is 1 (Y in S111), the temporal merging motion information candidate derivation unit 161 derives temporal merging motion information candidates, as many as zero to the maximum number of temporal merging motion information candidates, from the temporal candidate block group supplied by the terminal 12 (S112) and supplies the temporal merging motion information candidates to the merging motion information candidate list construction unit 162. The detailed operation of the temporal merging motion information candidate derivation unit 161 will be described later.

If the temporal candidate utilization permission flag is 0 (N in S111), S112 is skipped.

Then, the merging motion information candidate list construction unit 162 constructs a merging motion information candidate list from the spatial merging motion information candidates, as many as zero to the maximum number of spatial merging motion information candidates, and from the temporal merging motion information candidates, as many as zero to the maximum number of temporal merging motion information candidates (S113). In this case, it is assumed that the spatial merging motion information candidates and the temporal merging motion information candidates are sequentially added to the merging motion information candidate list in the order of the derivation.

The redundant merging motion information candidate deletion unit 163 then examines the merging motion information candidates added to the merging motion information candidate list supplied by the merging motion information candidate list construction unit 162, leaves, if there are a plurality of merging motion information candidates having the same motion information, one of the plurality of merging motion information candidates while deleting the rest of the merging motion information candidates (S114), and supplies the merging motion information candidate list to the first merging motion information candidate supplying unit 164. Merging motion information candidates added to the merging motion information candidate list are all different merging motion information candidates at this time.

In this case, the redundant merging motion information candidate deletion unit 163 completely deletes merging motion information candidates having the same motion information from the merging motion information candidate list. However, as long as the addition of a first supplementary merging motion information candidate or a second supplementary merging motion information candidate can be facilitated, the deletion is not limited to this.

The first merging motion information candidate supplying unit 164 then derives zero to two first supplementary merging motion information candidates from the merging motion information candidates added to the merging motion information candidate list supplied by the redundant merging motion information candidate deletion unit 163 so as to add the first supplementary merging motion information candidates to the merging motion information candidate list in such a manner that the maximum number of merge candidates is not exceeded (S115) and supplies the merging motion information candidate list to the second merging motion information candidate supplying unit 165. If the number of the merging motion information candidates added to the merging motion information candidate list supplied by the redundant merging motion information candidate deletion unit 163 is the maximum number of merge candidates, the merging motion information candidate list supplied by the redundant merging motion information candidate deletion unit 163 is directly supplied to the second merging motion information candidate supplying unit 165. The detailed operation of the first merging motion information candidate supplying unit 164 will be described later.

The second merging motion information candidate supplying unit 165 then derives second supplementary merging motion information candidates in such a manner the number of merging motion information candidates added to the merging motion information candidate list supplied by the first merging motion information candidate supplying unit 164 does not exceed the maximum number of merge candidates so as to add the second supplementary merging motion information candidates to the merging motion information candidate list (S116) and supplies the merging motion information candidate list to the terminal 19. If the number of the merging motion information candidates added to the merging motion information candidate list supplied by the first merging motion information candidate supplying unit 164 is the maximum number of merge candidates, the merging motion information candidate list supplied by the first merging motion information candidate supplying unit 164 is supplied to the terminal 19. The detailed operation of the second merging motion information candidate supplying unit 165 will be described later.

As described above, the merging motion information candidate list construction unit 140 constructs a merging motion information candidate list.

(Block Group)

Figures 15A, 15B:
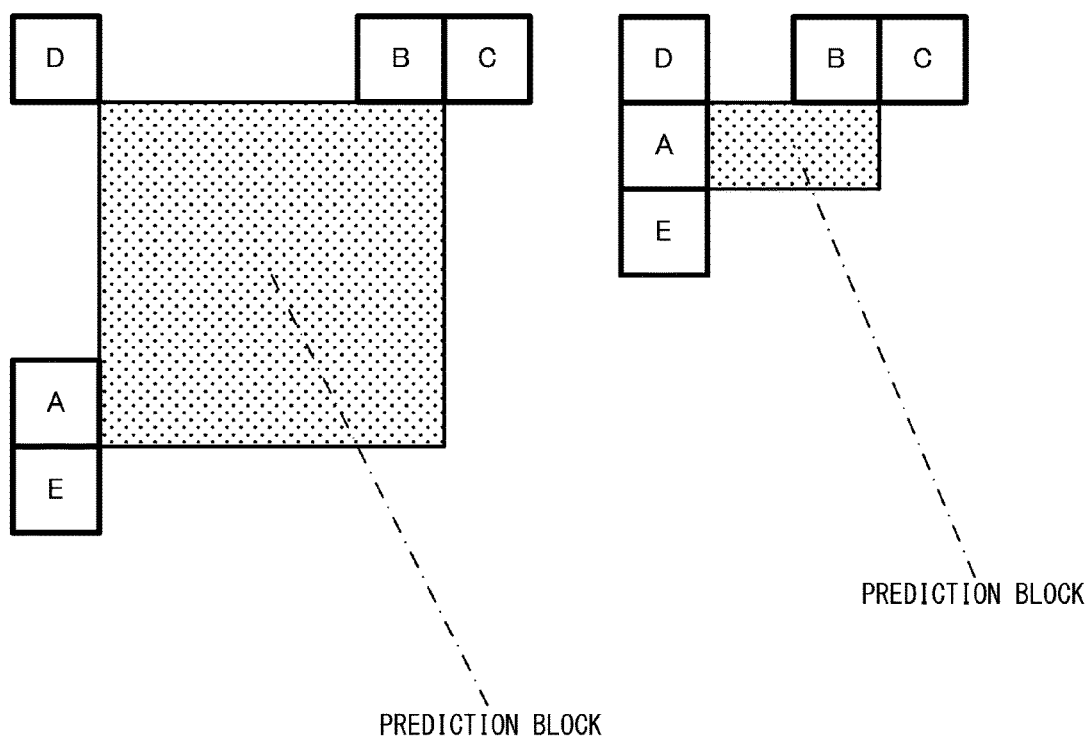
FIGS. 15A and 15B are diagrams explaining a spatial candidate block group of a prediction block.

Hereinafter, an explanation is given regarding a candidate block group of a prediction block. FIGS. 15A and 15B are diagrams explaining a spatial candidate block group of a prediction block. FIG. 15A shows a spatial candidate block group of a prediction block size occurring when the size of a coding block is 16 pixels×16 pixels and a prediction block size type is 2N×2N.

The spatial candidate block group includes five blocks: a block A located to the left of a lower-left pixel of the prediction block; a block B located above an upper-right pixel of the prediction block; a block C located diagonally above to the right of an upper-right pixel of the prediction block; a block E located diagonally below to the left of a lower-left pixel of the prediction block; and a block D located diagonally above to the left of an upper-left pixel of the prediction block.

The temporal candidate block group includes two blocks: a block H and a block I, which are representative blocks in a predetermined area of a ColPic. When the position of the upper-left pixel of the target prediction block is set to be (x, y) and the width and height of the target prediction block are set to be PUW and PUH, respectively, a block on the ColPic that includes a pixel position of ((((x+PUW)>>4)<<4), (((y+PUH)>>4)<<4)) as the position of an upper-left pixel of the block is set to be a temporal candidate block H, where ">>" represents a bit shift in a right direction and "<<" represents a bit shift in a left direction.

Similarly, a block on the ColPic that includes a pixel position of (x+(PUW>>1), y+(PUH>>1)) as the position of an upper-left pixel of the block is set to be a temporal candidate block I.

Note that a positional relationship that is the same as that of a prediction block of a coding block that has a prediction block size type of 2N×2N is applied to a prediction block in a coding block that does not have a prediction block size type of 2N×2N. FIG. 15B shows a spatial candidate block group occurring when the size of a coding block is 8 pixels×8 pixels and a prediction block size type is 2N×N.

In the figure, the block A is a block located to the left of a lower left pixel of the prediction block. However, as long as the block A is in contact with the left side of the prediction block, the position of the block A is not limited to this. Also, the block B is a block located above an upper right pixel of the prediction block. However, as long as the block B is in contact with the upper side of the prediction block, the position of the block B is not limited to this. The temporal candidate block group is set to include two blocks, the block H and the block I. However, as long as the temporal candidate block group includes a block in a same-position prediction block and a block around the same-position prediction block, the temporal candidate block group is not limited to this.

(Detailed Operation of Spatial Merging Motion Information Candidate Derivation Unit 160)

Figure 16:
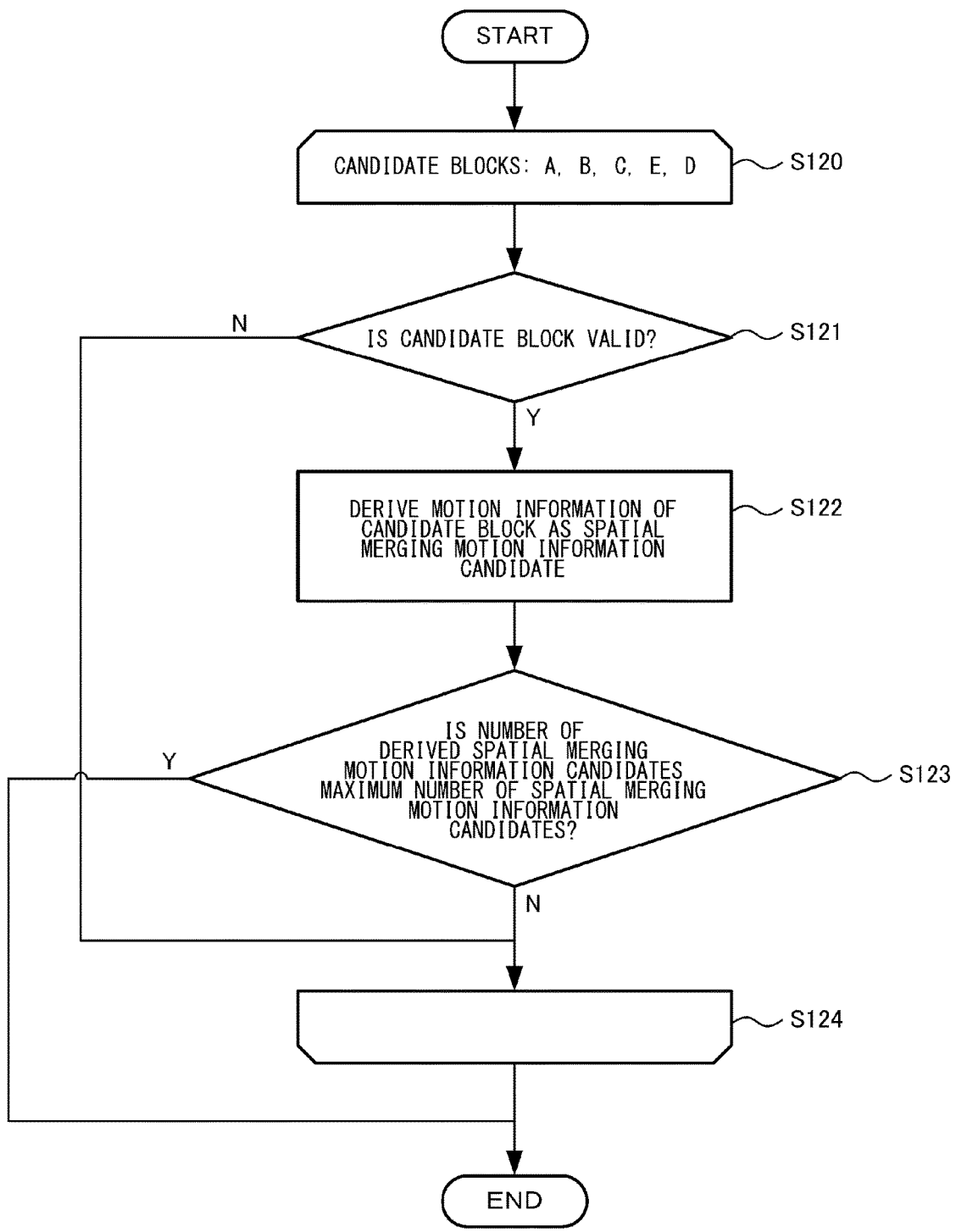
FIG. 16 is a flowchart explaining the operation of a spatial merging motion information candidate derivation unit shown in FIG. 13.

An explanation is now given of the detailed operation of the spatial merging motion information candidate derivation unit 160. FIG. 16 is a flowchart for explaining the operation of the spatial merging motion information candidate derivation unit 160. The spatial merging motion information candidate derivation unit 160 repeats the following processes in order of a block A, a block B, a block C, a block E, and a block D, which are candidate blocks included in a spatial candidate block group of a candidate block group (S120 through S124).

First, the spatial merging motion information candidate derivation unit 160 checks whether a candidate block is valid (S121). A candidate block being valid means that at least one of respective reference indices of L0 prediction and L1 prediction of the candidate block is larger than or equal to 0. If the candidate block is valid (Y in S121), the spatial merging motion information candidate derivation unit 160 derives motion information of the candidate block (S122). If the candidate block is not valid (N in S121), the spatial merging motion information candidate derivation unit 160 checks a subsequent candidate block (S124) and ends the process upon the completion of the checking of all candidate blocks. Subsequently to the step S122, the spatial merging motion information candidate derivation unit 160 checks whether the number of derived spatial merging motion information candidates is the maximum number of spatial merging motion information candidates (S123). If the number of the derived spatial merging motion information candidates is not the maximum number of spatial merging motion information candidates (N in S123), the spatial merging motion information candidate derivation unit 160 checks a subsequent candidate block (S124). If the number of the derived spatial merging motion information candidates is the maximum number of spatial merging motion information candidates (Y in S123), the spatial merging motion information candidate derivation unit 160 ends the process. The maximum number of spatial merging motion information candidates is set to be 4.

(Detailed Operation of Temporal Merging Motion Information Candidate Derivation Unit 161)

Figure 17:
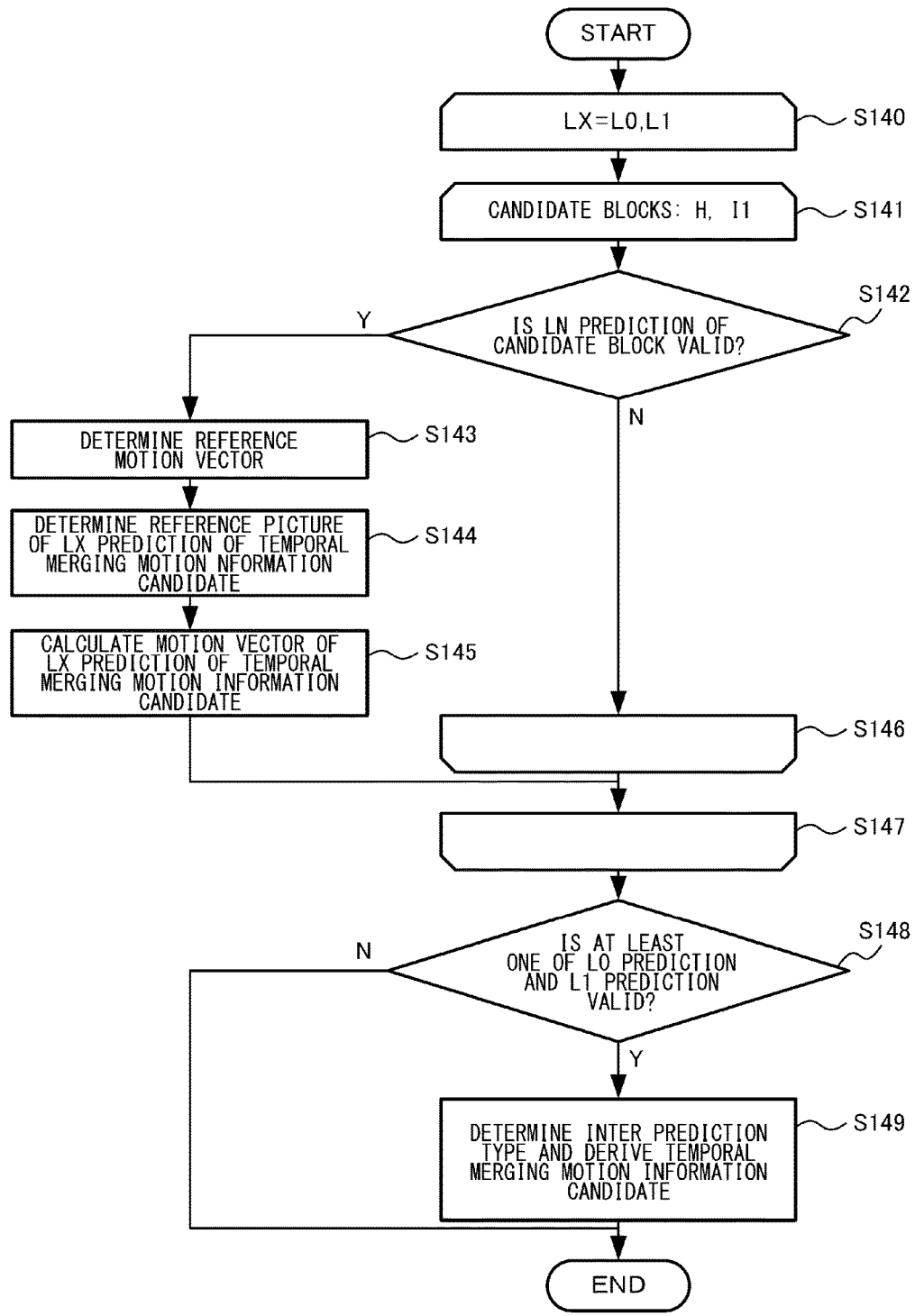
FIG. 17 is a flowchart explaining the operation of a temporal merging motion information candidate derivation unit shown in FIG. 13.

An explanation is now given of the detailed operation of the temporal merging motion information candidate derivation unit 161. FIG. 17 is a flowchart for explaining the operation of the temporal merging motion information candidate derivation unit 161. The temporal merging motion information candidate derivation unit 161 repeats the following processes for each prediction direction LX of L0 prediction and L1 prediction (S140 through S147). X is 0 or 1. The temporal merging motion information candidate derivation unit 161 repeats the following processes in order of a block H and a block I, which are candidate blocks included in a temporal candidate block group of a candidate block group (S141 through S146).

The temporal merging motion information candidate derivation unit 161 checks whether LN prediction of a candidate block is valid (S142). N is 0 or 1. It is assumed that N is the same as X. LN prediction of a candidate block being valid means that a reference index of the LN prediction of the candidate block is larger than or equal to 0. If the LN prediction of the candidate block is valid (Y in S142), the temporal merging motion information candidate derivation unit 161 sets a motion vector of the LN prediction of the candidate block to be a reference motion vector of LX prediction (S143). If the LN prediction of the candidate block is not valid (N in S142), the temporal merging motion information candidate derivation unit 161 skips the steps S143 to S145 and checks a subsequent candidate block (S146). Upon the completion of the checking of all candidate blocks, the temporal merging motion information candidate derivation unit 161 processes the subsequent prediction direction (S147).

Subsequently to the step S143, the temporal merging motion information candidate derivation unit 161 determines a reference picture of the LX prediction of a temporal merging motion information candidate (S144). In this case, the reference picture of the LX prediction of the temporal merging motion information candidate is set to be a reference picture of a reference index 0. Then, by scaling the reference motion vector to match a distance between the target picture and the reference picture of the LX prediction of the temporal merging motion information candidate, the temporal merging motion information candidate derivation unit 161 calculates a motion vector of the LX prediction of the temporal merging motion information candidate (S145) and processes the subsequent prediction direction (S147). A specific method of calculating the motion vector of the LX prediction of the temporal merging motion information candidate will be described later.

Subsequently to the step S147 where the processes are ended for the L0 prediction and the L1 prediction, the temporal merging motion information candidate derivation unit 161 checks whether at least one of the L0 prediction and the L1 prediction of the temporal merging motion information candidate is valid (S148). If at least one of the L0 prediction and the L1 prediction of the temporal merging motion information candidate is valid (Y in S148), the temporal merging motion information candidate derivation unit 161 determines the inter prediction type of the temporal merging motion information candidate and derives the temporal merging motion information candidate (S149).

For the determination of the inter prediction type, the inter prediction type of the temporal merging motion information candidate is set to be Pred_L0 if only the L0 prediction is valid, the inter prediction type of the temporal merging motion information candidate is set to be Pred_L1 if only the L1 prediction is valid, and the inter prediction type of the temporal merging motion information candidate is set to be Pred_BI if both the L0 prediction and the L1 prediction are valid.

Subsequently, an explanation is given of the method of calculating the motion vector of the LX prediction of the temporal merging motion information candidate. If an inter-picture distance between a ColPic having a temporal candidate block and a ColRefLXPic, which is a picture referred to by the temporal candidate block in motion compensation prediction of the LX prediction, an inter-picture distance between a reference image RefLXPic of the LX prediction of the temporal merging motion information candidate and a target picture CurPic, and the reference motion vector of the LX prediction are denoted as td, tb, and mvLX, respectively, a motion vector mvLXCol of the LX prediction of the temporal merging motion information candidate is calculated by Expression 1. It can be understood based on Expression 1 that subtraction, division, and multiplication for calculating tb and td are necessary for calculating the motion vector of the LX prediction of the temporal merging motion information candidate.

$$mvLXCol = tb/td * mvLX \quad \text{Expression 1}$$

In the case of using integer arithmetic for the simplification of floating-point arithmetic, for example, the expression may be used after being expanded as in Expression 2 through Expression 4. Abs(v) is a function for calculating the absolute value of a value v. Clip3(uv,lv,v) is a function that limits the value v to be from a lower limit lv to an upper limit uv. Sign (v) is a function that returns 1 if the value v is larger than or equal to 0 and returns −1 if the value v is smaller than 0, where ">>" represents a bit shift in a right direction and "<<" represents a bit shift in a left direction.

$$tx = (16384 + \text{Abs}(td/2))/td \quad \text{Expression 2}$$

$$\text{DistScaleFactor} = \text{Clip3}(-4096, 4095, (tb*tx+32) >> 6); \quad \text{Expression 3}$$

$$mvLXCol = \text{Sign}(\text{DistScaleFactor} * mvLX) * ((\text{Abs}(\text{DistScaleFactor}*mvLX) + 127) >> 8)) \quad \text{Expression 4}$$

In this case, the maximum number of temporal merging motion information candidates is set to be 1. Therefore, although a process that corresponds to the step S123 shown in FIG. 17, which is a flowchart explaining the operation of the spatial merging motion information candidate derivation unit 160, is omitted in FIG. 17, the process that corresponds to the step S123 can be added after the step S149 if the maximum number of temporal merging motion information candidates is larger than or equal to 2.

In this case, the inter prediction type of the temporal merging motion information candidate varies. Alternatively, for example, a dependence relationship between X and N may be removed so that checking is performed in the order of N being 0 and 1 for X so as to always generate Pred_BI.

(Detailed Operation of First Merging Motion Information Candidate Supplying Unit 164)

Figure 18:
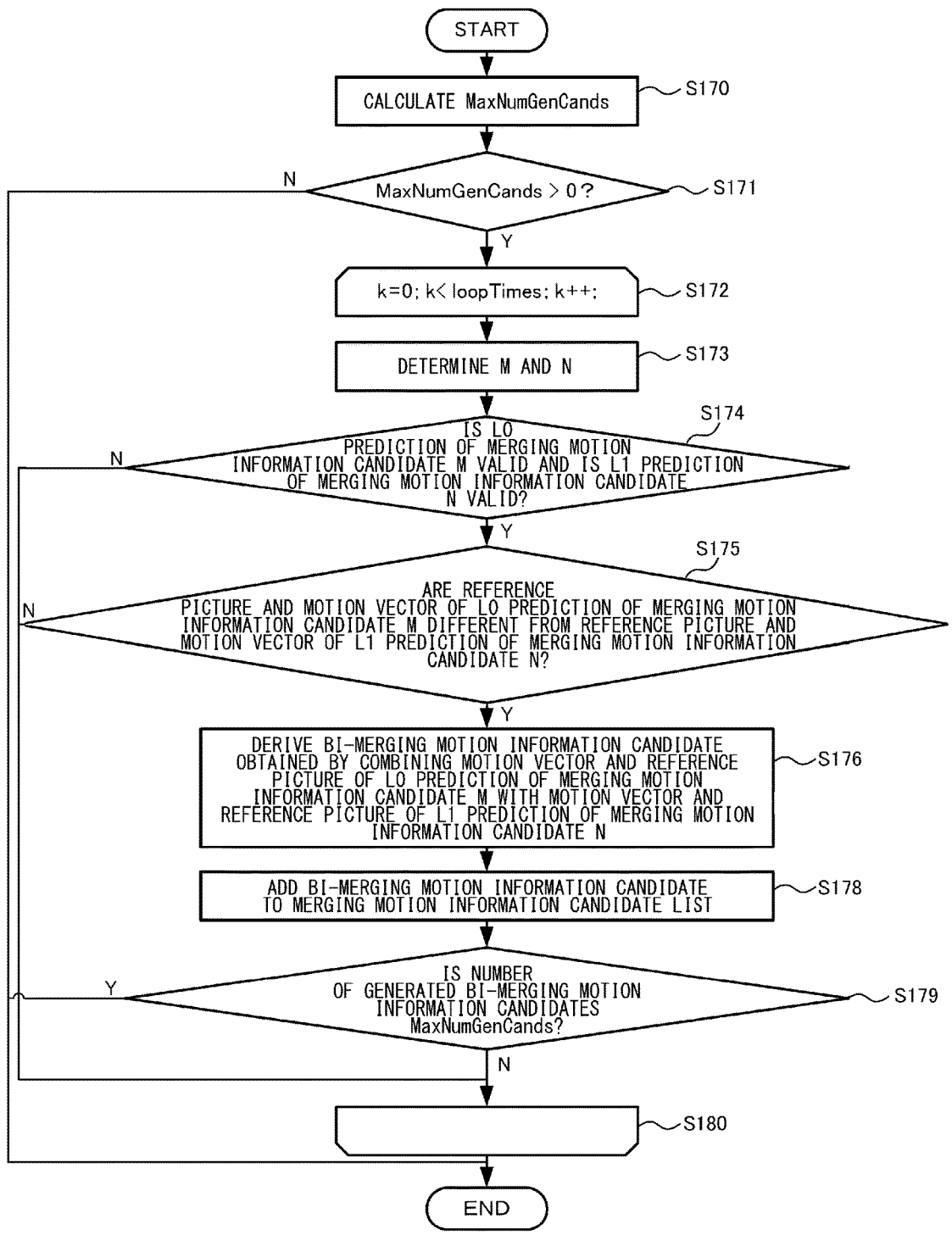
FIG. 18 is a flowchart explaining the operation of a first merging motion information candidate supplying unit shown in FIG. 13.

An explanation is now given of the detailed operation of the first merging motion information candidate supplying unit 164. FIG. 18 is a flowchart for explaining the operation of the first merging motion information candidate supplying unit 164. First, the first merging motion information candidate supplying unit 164 calculates MaxNumGenCand, which is the maximum number for deriving first supplementary merging motion information candidates, by Expression 5 from the number of merging motion information candidates (NumCandList) and the maximum number of merge candidates (MaxNumMergeCand) added to the merging motion information candidate list (S170).

$$\text{MaxNumGenCand} = \text{MaxNumMergeCand} - \text{NumCandList}; (\text{NumCandList} > 1) \text{MaxNumGenCand} = 0; (\text{NumCandList} <= 1) \quad \text{Expression 5}$$

Then, the first merging motion information candidate supplying unit 164 checks whether MaxNumGenCand is larger than 0 (S171). If MaxNumGenCand is not larger than 0 (N in S171), the first merging motion information candidate supplying unit 164 ends the process. If MaxNumGenCand is larger than 0 (Y in S171), the first merging motion information candidate supplying unit 164 performs the following processes. First, the first merging motion information candidate supplying unit 164 determines loopTimes, which is the number of combination checks. loopTimes is set to be NumCandList×NumCandList. If loopTimes exceeds 8, loopTimes is limited to 8 (S172). loopTimes is an integer of 0 to 7. The following processes are repeated only for loopTimes (S172 through S180). The first merging motion information candidate supplying unit 164 determines a combination of a merging motion information candidate M and a merging motion information candidate N (S173). Relationships among the number of combination checks, the merging motion information candidate M, and the merging motion information candidate N. FIG. 19 is a diagram for explaining relationships among the number of combination checks, the merging motion information candidate M, and the merging motion information candidate N. As in FIG. 19, M and N are different values and are set in ascending order of the total value of M and N. The first merging motion information candidate supplying unit 164 checks whether the L0 prediction of the merging motion information candidate M is valid and whether the L1 prediction of the merging motion information candidate N is valid (S174). If the L0 prediction of the merging motion information candidate M is valid and the L1 prediction of the merging motion information candidate N is valid (Y in S174), the first merging motion information candidate supplying unit 164 checks whether a reference picture and a motion vector of the L0 prediction of the merging motion information candidate M are different from a reference picture and a motion vector of the L1 prediction of the merging motion information candidate N (S175). If the L0 prediction of the merging motion information candidate M is valid and the L1 prediction of the merging motion information candidate N is not valid (N in S174), the first merging motion information candidate supplying unit 164 processes a subsequent combination. If the reference picture of the L0 prediction of the merging motion information candidate M is different from the reference picture of the L1 prediction of the merging motion information candidate N is valid (Y in S175), the first merging motion information candidate supplying unit 164 derives a bi-merging motion information candidate having an inter prediction type of Pred_BI by combining the motion vector and the reference picture of L0 prediction of the merging motion information candidate M and the motion vector and the reference picture of L1 prediction of the merging motion information candidate N (S176). In this case, the first merging motion information candidate supplying unit 164 derives, as a first supplementary merging motion information candidate, bi-merging motion information obtained by combining motion information of the L0 prediction of a merging motion information candidate and motion information of the L1 prediction of a different merging motion information candidate. If the reference picture of the L0 prediction of the merging motion information candidate M is the same as the reference picture of the L1 prediction of the merging motion information candidate N (N in S175), the first merging motion information candidate supplying unit 164 processes a subsequent combination. Subsequently to the step S176, the first merging motion information candidate supplying unit 164 adds the bi-merging motion information candidate to the merging motion information candidate list (S178). Subsequently to the step S178, the first merging motion information candidate supplying unit 164 checks whether the number of pieces of derived bi-merging motion information is MaxNumGenCand (S179). If the number of the pieces of derived bi-merging motion information is MaxNumGenCand (Y in S179), the first merging motion information candidate supplying unit 164 ends the process. If the number of the pieces of derived bi-merging motion information is not MaxNumGenCand (N in S179), the first merging motion information candidate supplying unit 164 processes a subsequent combination (S180). The first merging motion information candidate supplying unit 164 ends the process when processing of all combinations is finished.

In this case, the first supplementary merging motion information candidate is set to be a bi-merging motion information candidate, in which the direction of motion compensation prediction is bi-directional, by combining the motion vector and the reference picture of the L0 prediction of a merging motion information candidate added to the merging motion information candidate list and the motion vector and the reference picture of the L1 prediction of another merging motion information candidate. However, the first supplementary merging motion information candidate is not limited to this. In this case, if NumCandList is smaller than or equal to 1, the motion vector and the reference picture of the L0 prediction of a merging motion information candidate added to the merging motion information candidate list cannot be combined with the motion vector and the reference picture of the L1 prediction of another merging motion information candidate. Thus, MaxNumGenCand is set to be 0. For example, the first supplementary merging motion information candidate may be a merging motion information candidate, in which the direction of motion compensation prediction is bi-directional, obtained by adding an offset value of +1 or the like to the motion vector of the L0 prediction and the motion vector of the L1 prediction of a merging motion information candidate added to the merging motion information candidate list or a merging motion information candidate directed to bi-prediction obtained by adding an offset value of +1 or the like to the motion vector of the L0 prediction or the motion vector of the L1 prediction of a merging motion information candidate added to the merging motion information candidate list.

In this case, if there is a slight difference between motion information of a merging motion information candidate added to the merging motion information candidate list and the motion of a target motion information candidate, the coding efficiency can be increased by deriving a new merging motion information candidate, in which the direction of motion compensation prediction is bi-directional, by combining the motion vector and the reference picture of the L0 prediction of a merging motion information candidate added to the merging motion information candidate list and the motion vector and the reference picture of the L1 prediction of another merging motion information candidate.

(Detailed Operation of Second Merging Motion Information Candidate Supplying Unit 165)

Figure 20:
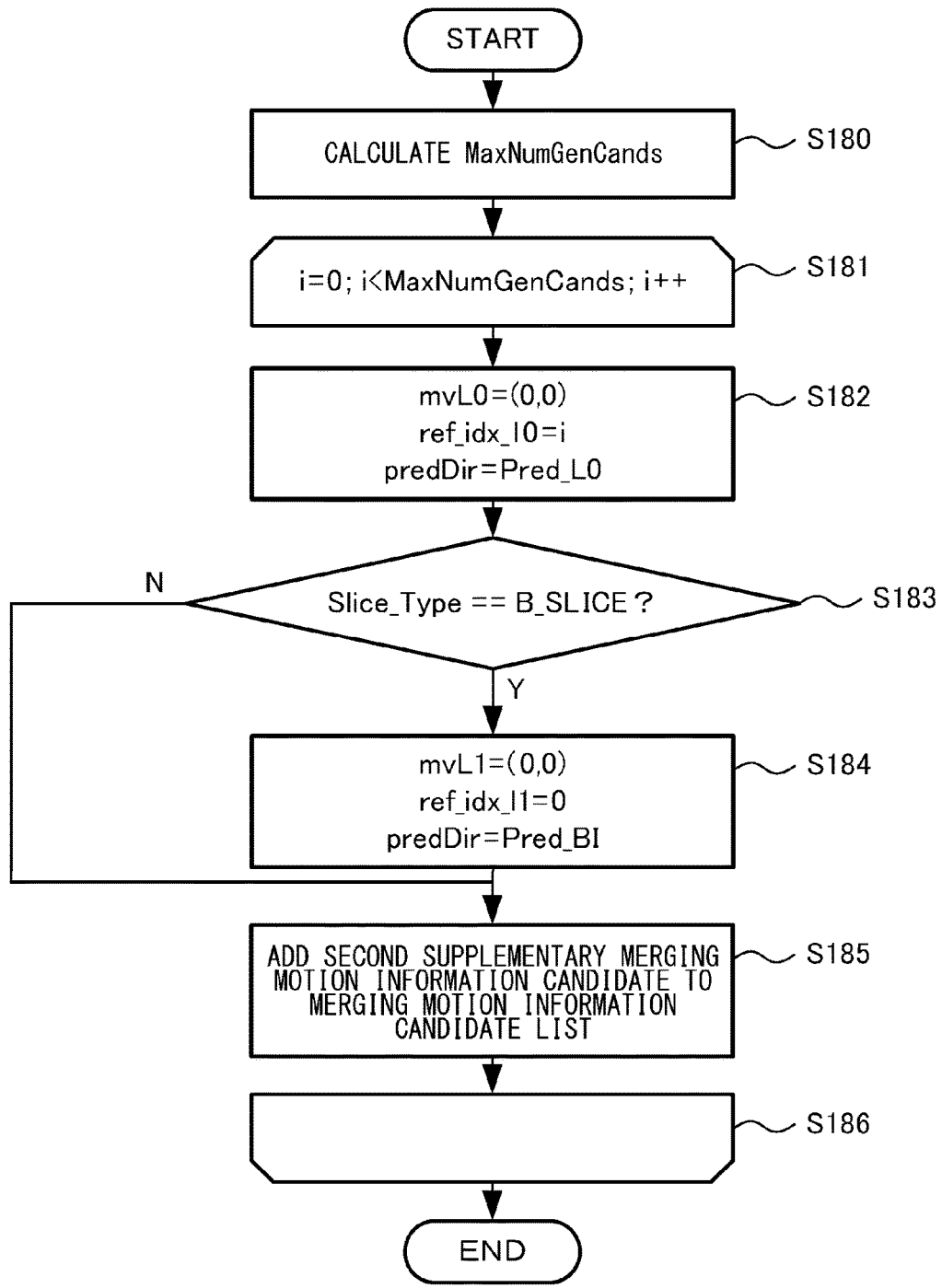
FIG. 20 is a flowchart explaining the operation of a second merging motion information candidate supplying unit shown in FIG. 13.

An explanation is now given of the detailed operation of the second merging motion information candidate supplying unit 165. FIG. 20 is a flowchart for explaining the operation of the second merging motion information candidate supplying unit 165. In this case, an explanation is given on the condition that the number of available reference pictures in the reference picture list L0 is larger or equal to the number of available reference pictures in the reference picture list L1.

First, the second merging motion information candidate supplying unit 165 calculates MaxNumGenCand, which is the maximum number for deriving second supplementary merging motion information candidates, by Expression 6 from the number of merging motion information candidates (NumCandList), the maximum number of merge candidates (MaxNumMergeCand), and the number of available reference pictures in the reference picture list L0 (num_ref_idx_l0_active_minus1+1) added to the merging motion information candidate list supplied by the first merging motion information candidate supplying unit 164

(S180). In the expression, Min(x,y) is a function that returns the respective minimum values of x and y.

MaxNumGenCand=Min(MaxNumMergeCand−NumCandList,num_ref_idx_l0_active_minus1+1)   Expression 6

Then, the second merging motion information candidate supplying unit 165 repeats the following processes for the number of times of MaxNumGenCand for i (S181 through S186), where i is an integer of 0 to (MaxNumGenCand−1). In other words, if the number of merging motion information candidates (NumCandList) added to the merging motion information candidate list supplied by the first merging motion information candidate supplying unit 164 is smaller than the maximum number of merge candidates (MaxNumMergeCand), at least one second supplementary merging motion information candidate is derived and added to the merging motion information candidate list. On the other hand, if NumCandList is larger than or equal to MaxNumMergeCand, a second supplementary merging motion information candidate is not derived, and a second supplementary merging motion information candidate is not added to the merging motion information candidate list. As described, if NumCandList is larger than or equal to MaxNumMergeCand, a memory for a merging motion information candidate list where NumCandList is larger than MaxNumMergeCand becomes unnecessary by not adding a second supplementary merging motion information candidate to the merging motion information candidate list. The second merging motion information candidate supplying unit 165 derives a second supplementary merging motion information candidate that has a motion vector (mvL0) of (0,0) for the L0 prediction, a reference index (ref_idx_l0) of i for the L0 prediction, and an inter prediction type (predDir) of Pred_L0 (S182).

Subsequently, the second merging motion information candidate supplying unit 165 checks whether the slice type is B slice (S183). If the slice type is B slice (Y in S183), the second merging motion information candidate supplying unit 165 derives a second supplementary merging motion information candidate that has a motion vector (mvL1) of (0,0) for the L1 prediction, a reference index (ref_idx_l1) of 0 for the L1 prediction, and an inter prediction type of Pred_BI (S184) and adds the second supplementary merging motion information candidate to the merging motion information candidate list (S185).

If the slice type is not B slice (N in S183), the second merging motion information candidate supplying unit 165 adds the second supplementary merging motion information candidate derived in S182 to the merging motion information candidate list (S185).

Subsequently, the second merging motion information candidate supplying unit 165 processes a subsequent i (S186). The second merging motion information candidate supplying unit 165 ends the process when processing of all i is finished.

In this case, the second supplementary merging motion information candidate is set to be a merging motion information candidate that has a motion vector of (0,0) and a reference index of i for the L0 prediction and an inter prediction type of Pred_L0 in the case of a P slice, and the second supplementary merging motion information candidate is set to be a merging motion information candidate that has a motion vector of (0,0) and a reference index of i for the L0 prediction, a motion vector of (0,0) and a reference index of 0 for the L1 prediction, and an inter prediction type of Pred_BI in the case of a B slice.

This is because, in a commonly-used moving picture in which a part of a picture is stationary, a motion vector of (0,0) is valid and correlation with a target picture becomes higher as a reference picture becomes closer to the target picture since a moving picture is continuous in a temporal direction.

A detailed explanation will be given in the following regarding the second supplementary merging motion information candidate in the case of a B slice.

First, an explanation is given regarding coding without rearrangement between the order of an input picture and the order of coding and regarding coding with rearrangement between the order of an input picture and the order of coding.

Figure 21A:
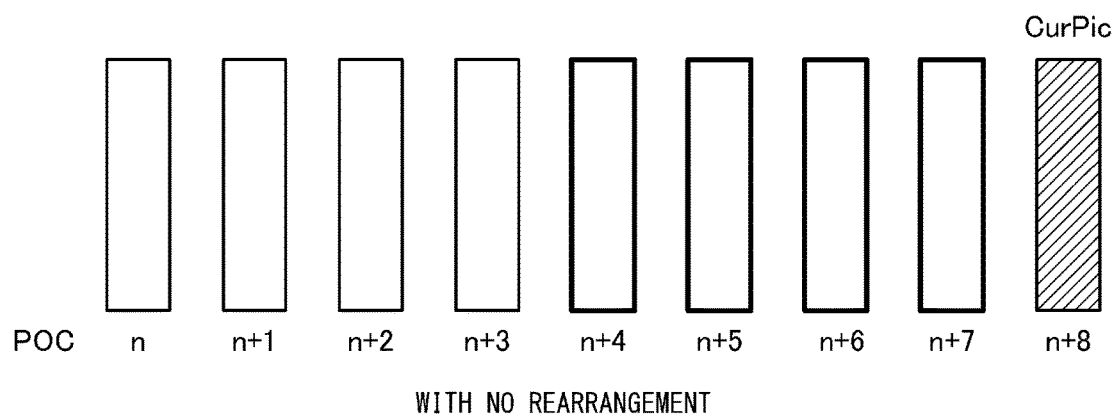
FIGS. 21A and 21B are diagrams explaining a relationship between a target picture and a reference picture.
Figure 21B:
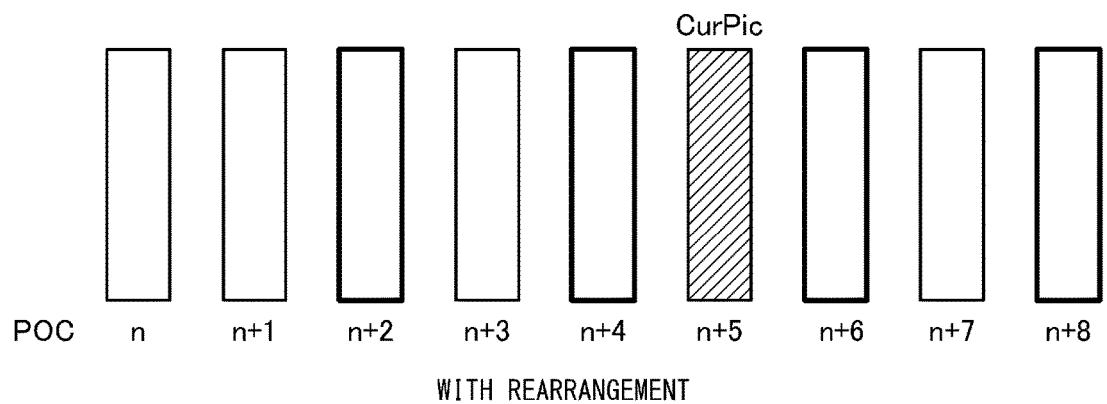

FIGS. 21A and 21B are diagrams explaining a relationship between a target picture and a reference picture. FIG. 21A shows a case where there is no rearrangement between the order of an input picture and the order of coding, and FIG. 21B shows a case where there is rearrangement between the order of an input picture and the order of coding. In FIG. 21A, pictures having a POC of n+4 to n+7 represent reference pictures, and a picture having a POC of n+8 represents a target picture CurPic. In FIG. 21B, pictures having a POC of n+2, n+4, n+6, or n+8 represent reference pictures, and a picture having a POC of n+5 represents a target picture CurPic.

Next, an explanation is given regarding a reference picture list in coding where there is no rearrangement between the order of an input picture and the order of coding and a reference picture list in coding where there is rearrangement between the order of an input picture and the order of coding. A reference picture list is constructed by the reference picture list construction unit 113.

FIGS. 22A and 22B are diagrams explaining an example of a reference picture list. FIGS. 22A and 22B show an example where the number of available reference pictures in a reference picture list L0 and the number of available reference pictures in a reference picture list L1 are both 4. FIG. 22A shows the condition of a reference picture list when there is no rearrangement between the order of an input picture and the order of coding. It is assumed that at least a reference picture having a POC of n+4, a reference picture having a POC of n+5, a reference picture having a POC of n+6, and a reference picture having a POC of n+8 are stored in the frame memory 110. FIG. 22B shows the condition of a reference picture list when there is rearrangement between the order of an input picture and the order of coding. It is assumed that at least a reference picture having a POC of n+2, a reference picture having a POC of n+4, a reference picture having a POC of n+6, and a reference picture having a POC of n+8 are stored in the frame memory 110. In the case where there is no rearrangement between the order of an input picture and the order of coding, a reference picture list L0 and a reference picture list L1 are identical. In the case where there is rearrangement between the order of an input picture and the order of coding, a reference picture list L0 and a reference picture list L1 are not identical.

Next, an explanation is given regarding a second supplementary merging motion information candidate in coding where there is no rearrangement between the order of an input picture and the order of coding and a second supplementary merging motion information candidate in coding where there is no rearrangement between the order of an input picture and the order of coding.

FIGS. 23A and 23B are diagrams explaining an example of a relationship between a reference index of a second supplementary merging motion information candidate and a POC according to the first embodiment. FIGS. 23A and 23B show an example of a second supplementary merging motion information candidate when the number of available reference pictures in a reference picture list L0 and the number of available reference pictures in a reference picture list L1 are both 4. FIG. 23A shows a reference index of a second supplementary merging motion information candidate when there is no rearrangement between the order of an input picture and the order of coding. FIG. 23B shows a reference index of a second supplementary merging motion information candidate when there is rearrangement between the order of an input picture and the order of coding.

An explanation is given regarding the case of FIG. 23A. The reference index of a 0-th (i=0) second supplementary merging motion information candidate for the L0 prediction is 0, and a reference picture having a POC of n+7 is thus used for motion compensation prediction for the L0 prediction. The reference index for the L1 prediction is 0, and a reference picture having a POC of n+7 is thus used for motion compensation prediction for the L1 prediction. The motion vector of the L0 prediction and the motion vector of the L1 prediction are identical being at (0,0), and the respective reference pictures are also identical. Therefore, respective prediction signals of the L0 prediction and the L1 prediction are also identical. Therefore, although the 0-th second supplementary merging motion information candidate has motion information for bi-prediction, the prediction signal obtained is identical with a prediction signal for uni-prediction obtained by performing motion compensation prediction on a reference picture having a POC of n+7 using a motion vector of (0,0).

In a first second supplementary merging motion information candidate, a reference picture having a POC of n+6 is used for motion compensation prediction for the L0 prediction, and a reference picture having a POC of n+7 is used for motion compensation prediction for the L1 prediction. This represents motion compensation prediction of bi-prediction where the nearest (the closest) reference picture and the second closest reference picture are used.

Similarly, in a second second supplementary merging motion information candidate, motion compensation prediction of bi-prediction is performed where the nearest reference picture and the third closest reference picture are used. In a third second supplementary merging motion information candidate, motion compensation prediction of bi-prediction is performed where the nearest reference picture and the fourth closest reference picture are used.

An explanation is given regarding the case of FIG. 23B. The reference index of a 0-th (i=0) second supplementary merging motion information candidate for the L0 prediction is 0, and a reference picture having a POC of n+4 is thus used for motion compensation prediction for the L0 prediction. The reference index for the L1 prediction is 0, and a reference picture having a POC of n+6 is thus used for motion compensation prediction for the L1 prediction. The reference picture having a POC of n+4 and the reference picture having a POC of n+6 are a reference picture immediately before the target picture and a reference picture immediately after the target picture in order of display, respectively. Thus, motion compensation prediction of bi-prediction is performed that is considered to have the highest selectivity relatively among second supplementary merging motion information candidates.

In a first second supplementary merging motion information candidate, a reference picture having a POC of n+2 is used for motion compensation prediction for the L0 prediction, and a reference picture having a POC of n+6 is used for motion compensation prediction for the L1 prediction. This represents motion compensation prediction of bi-prediction where a second reference picture before the target picture and a reference picture immediately after the target picture in order of display are used.

Although the second second supplementary merging motion information candidate has motion information for bi-prediction, the prediction signal obtained is identical with a prediction signal for uni-prediction obtained by performing motion compensation prediction on a reference picture having a POC of n+6 using a motion vector of (0,0).

In a third second supplementary merging motion information candidate, a reference picture having a POC of n+8 is used for motion compensation prediction for the L0 prediction, and a reference picture having a POC of n+6 is used for motion compensation prediction for the L1 prediction. This represents motion compensation prediction of bi-prediction where a second reference picture after the target picture and a reference picture immediately after the target picture in order of display are used.

As described above, all the second supplementary merging motion information candidates can be directed to bi-prediction where the nearest reference picture is used by setting the motion vector of the L0 prediction of a second supplementary merging motion information candidate of a B slice to be (0,0), setting a motion vector of the L1 prediction to be (0,0) incrementing the reference index of the L0 prediction by one at a time, and setting the reference index of the L1 prediction to be 0 where the nearest reference picture in the reference picture list of L1 prediction is added.

Also, if there is no reference picture for the L1 prediction, by allowing a second supplementary merging motion information candidate to be directed to uni-prediction from the L0 prediction, selections of a second supplementary merging motion information candidate can be increased, and the prediction efficiency of a motion information prediction process can thus be improved.

Also, since all the second supplementary merging motion information candidates represent different prediction signals, the coding efficiency can be improved by expanding the range of choices for a merge mode.

Also, second supplementary merging motion information candidates as many as the number of available reference pictures in the reference picture list L0 can be derived without depending on the number of available reference pictures in the reference picture list L1.

For example, in a moving picture in which a part of a picture is stationary with mixing of random noise, by using a prediction signal of bi-prediction where the nearest reference picture and another reference picture are used, a prediction signal may be able to be obtained whose accuracy is higher than that of a prediction signal of uni-prediction where only the nearest reference picture is used in respect of the sharpness of each reference picture by a filtering effect and a quantization width.

Setting a merging motion information candidate that does not depend on a merging motion information candidate added in the merging motion information candidate list as the second supplementary merging motion information candidate allows the use of a merge mode when the number of merging motion information candidates added in the merging motion information candidate list is zero, and the coding efficiency can be improved. Also, when motion information of a merging motion information candidate added to the merging motion information candidate list is different from the motion of a target motion information candidate, the coding efficiency can be improved by increasing choices by deriving a new merging motion information candidate.

Also, by allowing all the second supplementary merging motion information candidates to be directed to bi-prediction, the probability of a first supplementary merging motion information candidate in a neighboring block to be derived can be increased, and the coding efficiency can thus be improved. A detailed explanation is given regarding effects thereof in the following.

First, an explanation is given regarding a problem that occurs when a second supplementary merging motion information candidate directed to uni-prediction of the L0 prediction is added to the merging motion information candidate list. If a first supplementary merging motion information candidate is derived by combining a second supplementary merging motion information candidate of uni-prediction of the L0 prediction and a predetermined merging motion information candidate in the merging motion information candidate list, a new second supplementary merging motion information candidate is not derived if the predetermined merging motion information candidate is directed to uni-prediction of the L0 prediction. Even when the predetermined merging motion information candidate is directed to bi-prediction, since a motion vector and a reference picture of the L1 prediction that are to be combined with those of the L0 prediction of the predetermined merging motion information candidate do not exist in the second supplementary merging motion information candidate, a first supplementary merging motion information candidate that uses the L0 prediction of the predetermined merging motion information candidate is not derived.

In this case, by allowing all the second supplementary merging motion information candidates to be directed to bi-prediction, the derivation of more first supplementary merging motion information candidates can be possible when combined with a predetermined merging motion information candidate in the merging motion information candidate list, and the coding efficiency can thus be improved.

In this case, the spatial candidate block group is set to have five blocks, the temporal candidate block group is set to have two blocks, the upper limit of the maximum number of merge candidates is set to be 5, the maximum number of spatial merging motion information candidates is set to be 4, and the maximum number of temporal merging motion information candidates is set to be 1. However, the respective numbers are not limited to these.

In this case, the respective motion vectors of the L0 prediction and the L1 prediction are set to be (0,0). However, the motion vectors are not limited to this, as long as the motion vectors do not depend on motion information of a merging motion information candidate added to the merging motion information candidate list and have a statistically high frequency of use. For example, a motion vector of the second supplementary merging motion information candidate can be set to be a motion vector having a high frequency of occurrence of a coded picture or a portion of a coded picture so as to be coded into a bitstream and then transmitted. The reference index of the L1 prediction is set to be 0. However, if there is the nearest reference picture that is other than 0, the reference index may be fixed to a reference index of other than 0.

Also, since the number of available reference pictures in the reference picture list L0 often becomes larger than or equal to the number of available reference pictures in the reference picture list L1 generally, the number of available reference pictures in the reference picture list L0 is used for the calculation of the maximum number of second supplementary merging motion information candidates to be derived, and the reference index of the L1 prediction is fixed while changing the reference index of the L0 prediction in this case. However, when the number of available reference pictures in the reference picture list L1 is larger than the number of available reference pictures in the reference picture list L0, the number of available reference pictures in the reference picture list L1 can be used for the calculation of the maximum number of second supplementary merging motion information candidates to be derived, and the reference index of the L0 prediction can be fixed while changing the reference index of the L1 prediction.

(Configuration of Vector Predictor Mode Determination Unit 120)

Figure 24:
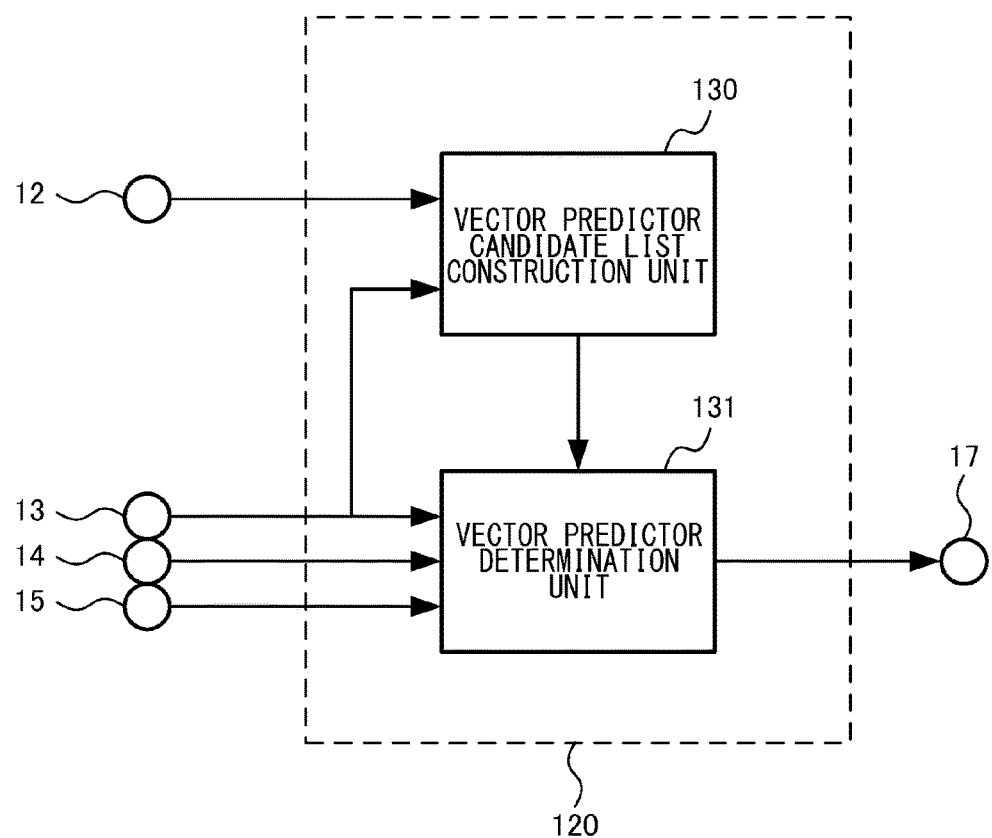
FIG. 24 is a diagram showing the configuration of a vector predictor mode determination unit.

Subsequently, an explanation is given regarding the detailed configuration of the vector predictor mode determination unit 120. FIG. 24 is a diagram that shows the configuration of the vector predictor mode determination unit 120. The vector predictor mode determination unit 120 includes a vector predictor candidate list construction unit 130 and a vector predictor determination unit 131. A terminal 17 is connected to the prediction coding mode determination unit 122.

The vector predictor candidate list construction unit 130 is also provided in the same way in the motion vector reproduction unit 211 inside the moving picture decoding device 200 that decodes a bitstream generated by a moving picture coding device 100 according to the first embodiment, and an identical vector predictor candidate list is constructed each in the moving picture coding device 100 and the moving picture decoding device 200.

(Operation of Vector Predictor Mode Determination Unit 120)

Figure 25:
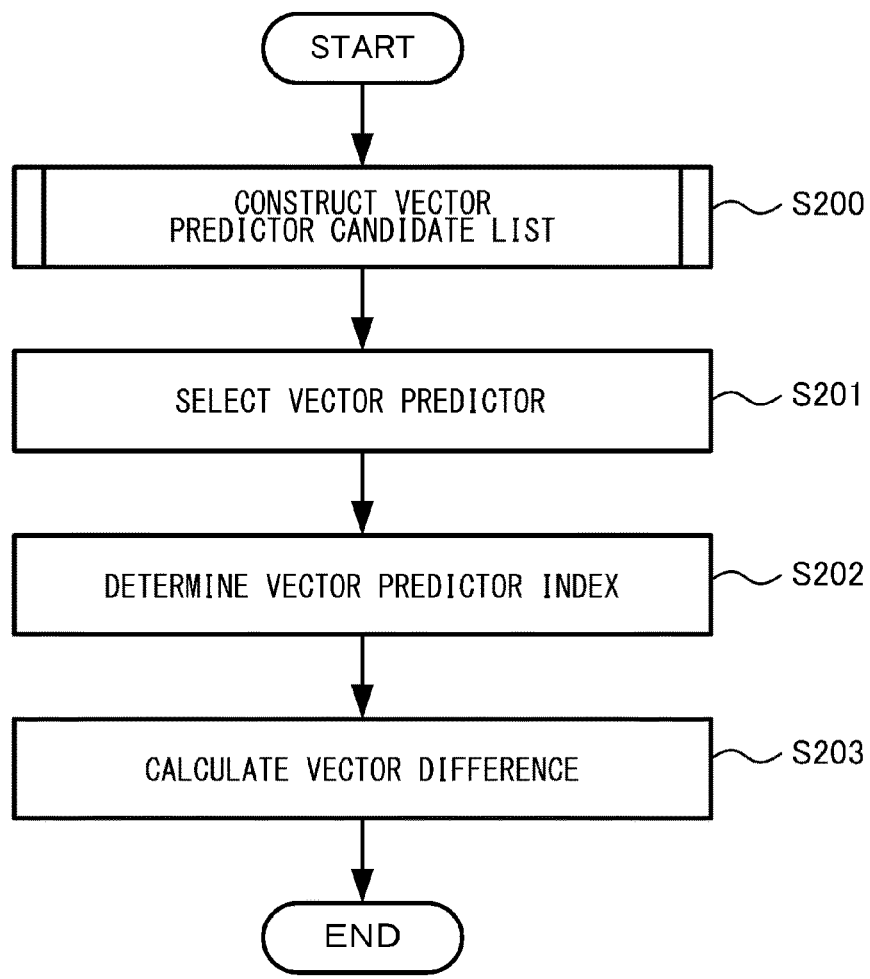
FIG. 25 is a flowchart showing the operation of the vector predictor mode determination unit.

An explanation is given in the following regarding the operation of the vector predictor mode determination unit 120. FIG. 25 is a flowchart showing the operation of the vector predictor mode determination unit 120.

First, the following processes are performed for the L0 prediction. In the following, x represents 0. The vector predictor candidate list construction unit 130 derives a reference index of LX prediction supplied by the terminal 13. The vector predictor candidate list construction unit 130 constructs a vector predictor candidate list of the LX prediction including vector predictor candidates of the maximum number of vector predictor candidates from the candidate block group supplied by the terminal 12 and the reference index of the LX prediction (S200). The vector predictor candidate list construction unit 130 supplies the vector predictor candidate list of the LX prediction to the vector predictor determination unit 131.

The vector predictor determination unit 131 selects one vector predictor candidate from the vector predictor candidate list of the LX prediction supplied by the vector predictor candidate list construction unit 130 (S201) and determines a vector predictor index of the LX prediction (S202).

The vector predictor determination unit 131 calculates a vector difference of the LX prediction by subtracting the vector predictor of the LX prediction from the motion vector of the LX prediction supplied by the terminal 13 (S203) and outputs the vector difference of the LX prediction and the vector predictor index of the LX prediction.

The vector predictor determination unit 131 calculates a prediction error amount from the picture signal supplied by the terminal 15 and from a prediction signal of the LX prediction obtained by performing motion compensation prediction on the reference picture supplied by the terminal 14 based on the motion vector of the LX prediction and the reference index of the LX prediction supplied by the terminal 13, and calculates a rate distortion evaluation value of Pred_LX from the prediction error amount and from the coding amount of the vector difference of the LX prediction, the reference index of the LX prediction, and the vector predictor index of the LX prediction.

Then, a process that is the same as that for the L0 prediction is performed for the L1 prediction while setting X to be 1.

Subsequently, the vector predictor determination unit 131 calculates a prediction error amount from the picture signal supplied by the terminal 15 and from a prediction signal of the BI prediction obtained by averaging the prediction signal of the L0 prediction and the prediction signal of the L1 prediction, and calculates a rate distortion evaluation value of Pred_BI from the prediction error amount and from the coding amount of the respective vector differences of the L0 prediction and the L1 prediction, the respective reference indices of the L0 prediction and the L1 prediction, and the vector predictor indices of the L0 prediction and the L1 prediction.

The vector predictor determination unit 131 compares the rate distortion evaluation value of Pred_L0, the rate distortion evaluation value of Pred_L1, and the rate distortion evaluation value of Pred_BI and selects one prediction coding mode with the smallest rate distortion evaluation value. The vector predictor determination unit 131 then supplies motion information, the vector differences, the vector predictor indices, and the rate distortion evaluation value based on the prediction coding mode to the prediction coding mode determination unit 122. If the prediction coding mode is Pred_L0, the motion vector of the L1 prediction is set to be (0,0), and the reference index of the L1 prediction is set to be "−1". If the prediction coding mode is Pred_L1, the motion vector of the L0 prediction is set to be (0,0), and the reference index of the L0 prediction is set to be "−1".

(Configuration of Vector Predictor Candidate List Construction Unit 130)

Figure 26:
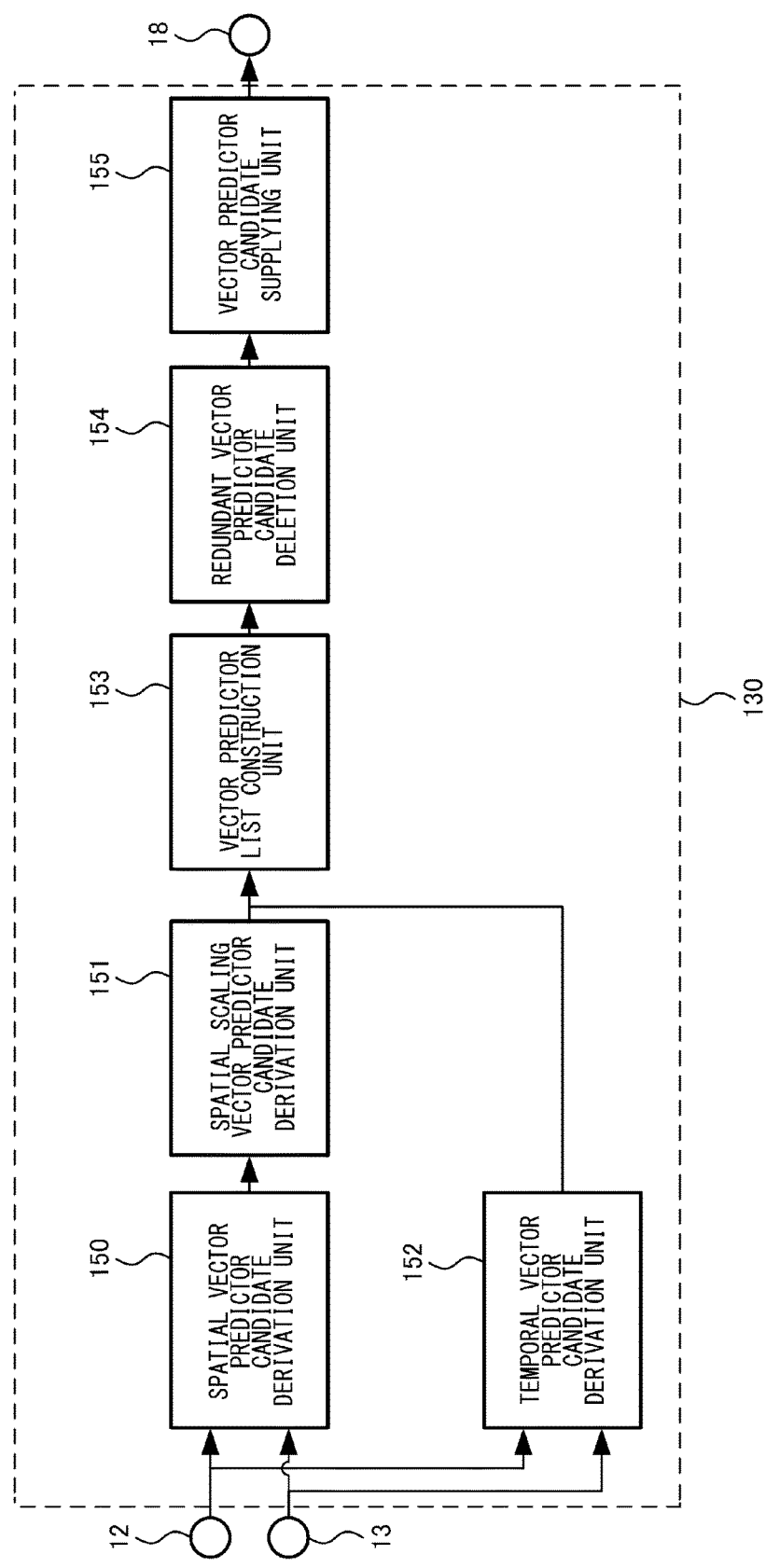
FIG. 26 is a diagram explaining the configuration of a vector predictor candidate list construction unit.

An explanation is then given of the detailed configuration of the vector predictor candidate list construction unit 130. FIG. 26 is a diagram for explaining the configuration of the vector predictor candidate list construction unit 130. A terminal 18 is connected to the vector predictor determination unit 131. The vector predictor candidate list construction unit 130 includes a spatial vector predictor candidate derivation unit 150, a spatial scaling vector predictor candidate derivation unit 151, a temporal vector predictor candidate derivation unit 152, a vector predictor list construction unit 153, a redundant vector predictor candidate deletion unit 154, and a vector predictor candidate supplying unit 155.

(Operation of Vector Predictor Candidate List Construction Unit 130)

Figure 27:
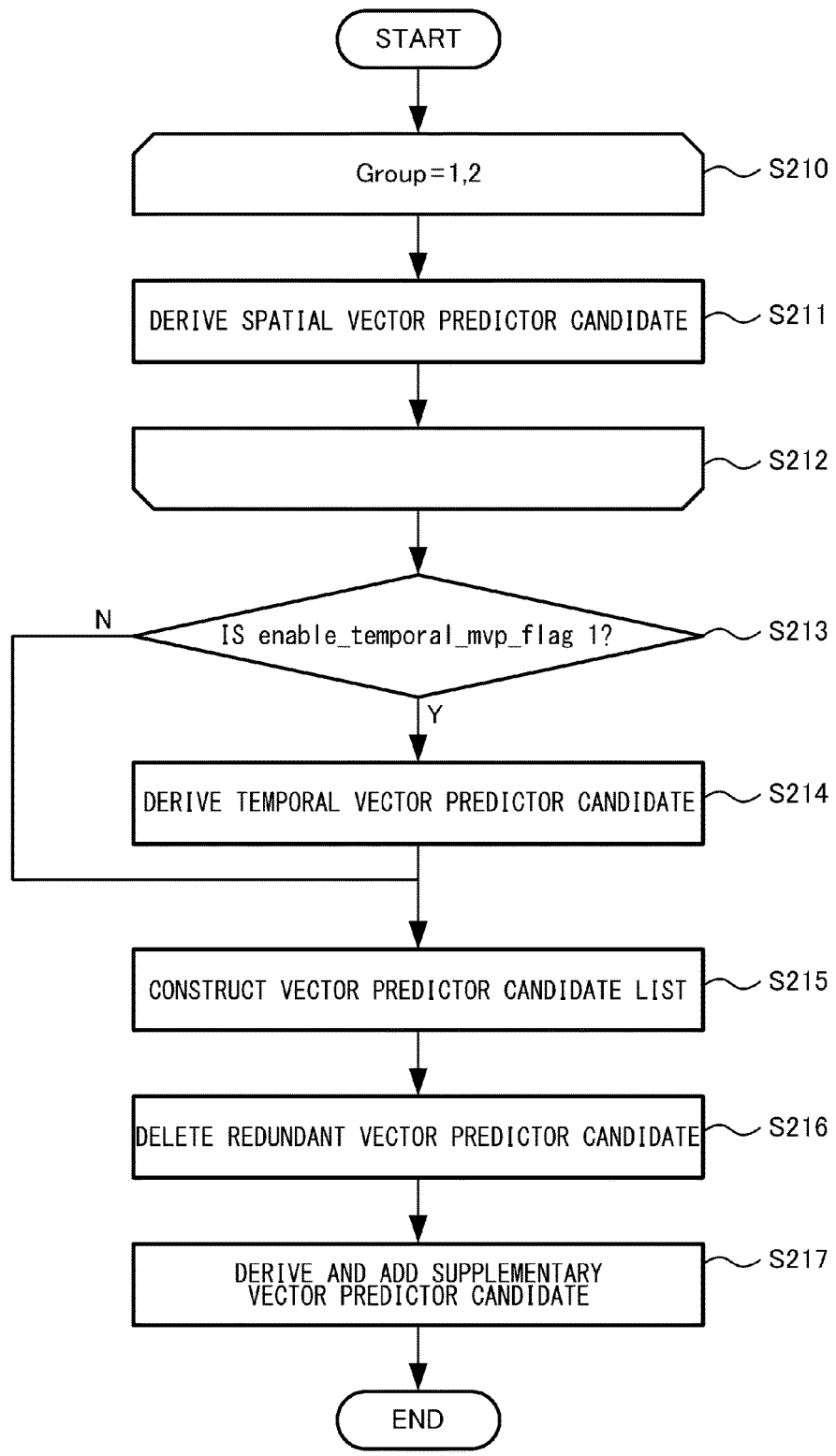
FIG. 27 is a flowchart explaining the operation of the vector predictor candidate list construction unit.

An explanation is given in the following regarding the function and operation of each component. FIG. 27 is a flowchart for explaining the operation of the vector predictor candidate list construction unit 130.

The vector predictor candidate list construction unit 130 separates candidate blocks included in the spatial candidate block group supplied by the terminal 12 into two groups: a block E and a block A forming a first group; and a block C, a block B, and a block D forming a second group, and repeats the following processes in order of the first group and the second group (S210 through S212).

The candidate block group supplied by the terminal 12 is a candidate block group that is the same as that in the case of the merge mode.

The spatial vector predictor candidate derivation unit 150 derives zero or one spatial vector predictor candidate of the LX prediction from the spatial candidate block group of an i-th group (i is 1 or 2) and the reference index of the LX prediction supplied by the terminal 13 (S211) and supplies the spatial vector predictor candidate of the LX prediction to the vector predictor list construction unit 153. The detailed operation of the spatial vector predictor candidate derivation unit 150 will be described later. A relationship between the spatial vector predictor candidate derivation unit 150 and the spatial scaling vector predictor candidate derivation unit 151 will be also described later.

When the processes for the first group and the second group are finished, the vector predictor candidate list construction unit 130 checks whether the temporal candidate utilization permission flag (enable_temporal_mvp_flag) is 1 (S213).

If the temporal candidate utilization permission flag is 1 (Y in S213), the temporal vector predictor candidate derivation unit 152 derives zero or one temporal vector predictor candidate of the LX prediction from the temporal candidate block group supplied by the terminal 12 and the reference index of the LX prediction supplied by the terminal 13 (S214) and supplies the temporal vector predictor candidate of the LX prediction to the vector predictor list construction unit 153. The detailed operation of the temporal vector predictor candidate derivation unit 152 will be described later.

If the temporal candidate utilization permission flag is 0 (N in S213), the step S214 is skipped.

Subsequently, the vector predictor list construction unit 153 constructs a vector predictor candidate list of the LX prediction from zero to two spatial vector predictor candidates of the LX prediction and zero to one temporal vector predictor candidate of the LX prediction (S215) and supplies the vector predictor candidate list of the LX prediction to the redundant vector predictor candidate deletion unit 154. In this case, up to three vector predictor candidates are added to the vector predictor candidate list of the LX prediction from the spatial vector predictor candidates to the temporal vector predictor candidate, in order.

Subsequently, the redundant vector predictor candidate deletion unit 154 checks vector predictor candidates added to the vector predictor candidate list of the LX prediction, leaves, when there are a plurality of vector predictor candidates having an identical vector, one vector predictor candidate, and deletes the rest of the vector predictor candidates. Then, the redundant vector predictor candidate deletion unit 154 deletes, when the number of the vector predictor candidates added to the vector predictor candidate list of the LX prediction exceeds the maximum number of vector predictor candidates, vector predictor candidates in the last part of the vector predictor candidate list of the LX prediction such that the number of the vector predictor candidates added to the vector predictor candidate list of the LX prediction becomes smaller than or equal to the maximum number of vector predictor candidates (S216) and supplies the vector predictor candidate list of the LX prediction to the vector predictor candidate supplying unit 155. Therefore, vector predictor candidates added to the vector predictor candidate list of the LX prediction output by the redundant vector predictor candidate deletion unit 154 are all different vector predictor candidates. Also, when two spatial vector predictor candidates of the LX prediction are left, a temporal vector predictor candidate of the LX prediction is not added to the vector predictor candidate list, consequently.

Subsequently, the vector predictor candidate supplying unit 155 generates vector predictor supplying candidates, adds the vector predictor supplying candidates to the vector predictor candidate list of the LX prediction such that the number of the vector predictor candidates added to the vector predictor candidate list of the LX prediction becomes the maximum number of vector predictor candidates (S217), and supplies the vector predictor supplying candidates to the terminal 18.

It is assumed that the vector predictor supplying candidates have a motion vector (0,0) in this case. In this case, the vector predictor supplying candidates are set to have a motion vector (0,0). However, the vector predictor supplying candidates may have a predetermined value such as (1,1), may be transmitted in a bitstream, or may have a motion vector where a horizontal component or a vertical component of a spatial vector predictor candidate is set to be +1 or −1.

(Detailed Operation of Spatial Vector Predictor Candidate Derivation Unit 150)

Figure 28:
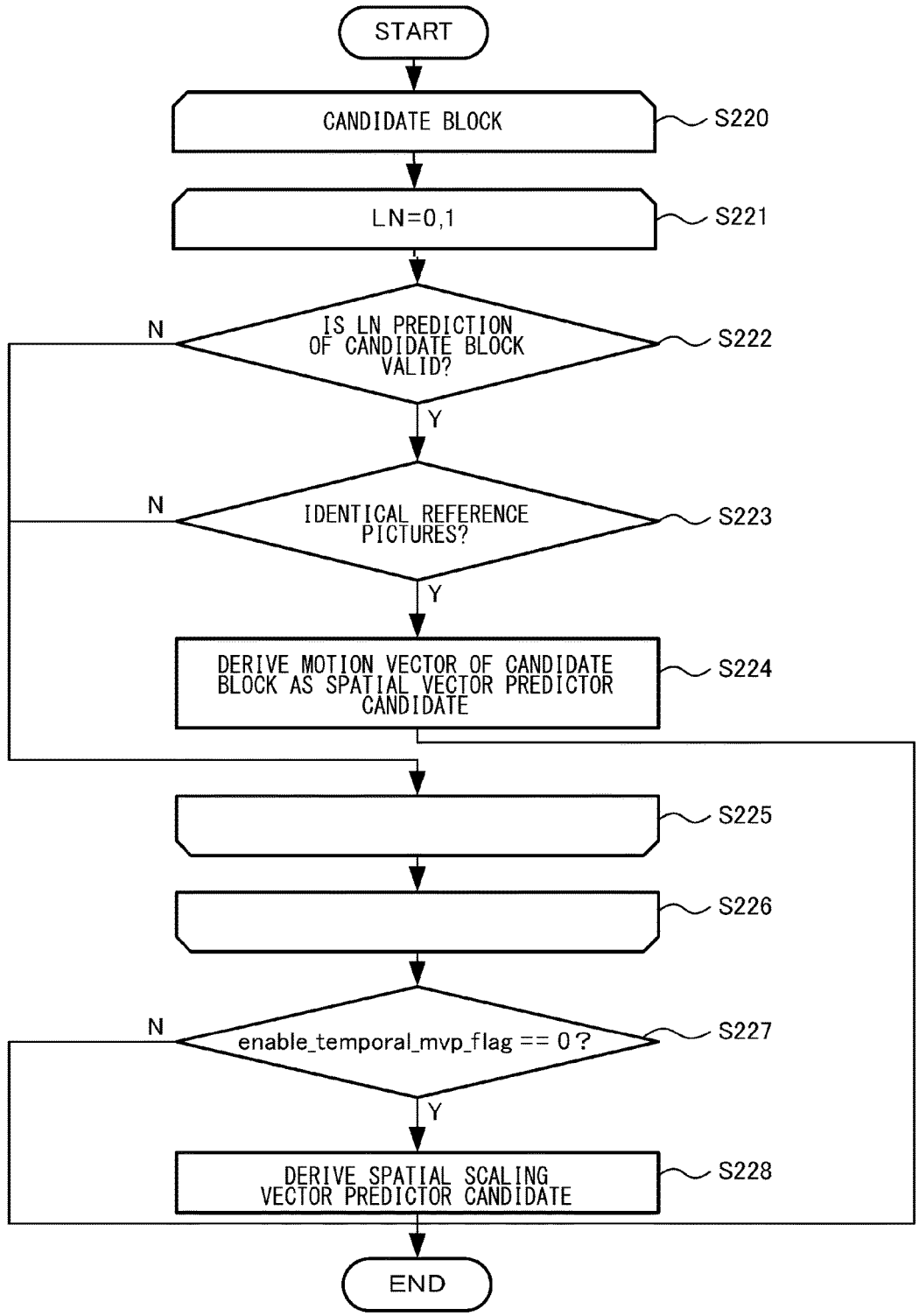
FIG. 28 is a flowchart explaining the operation of a spatial vector predictor candidate derivation unit.

An explanation is now given of the detailed operation of the spatial vector predictor candidate derivation unit 150. FIG. 28 is a flowchart explaining the operation of the spatial vector predictor candidate derivation unit 150. An explanation is given regarding the derivation of a spatial vector predictor candidate of the LX prediction.

The spatial vector predictor candidate derivation unit 150 repeats the following processes for a candidate block in the i-th group (i is 1 or 2) (S220 through S226). The first group is checked from the block E to the block A in order, and the second group is checked from the block C to the block B to the block D in order.

The following processes are repeated for each candidate block in order of the L0 prediction and the L1 prediction (S221 through S225). Hereinafter, an explanation is given while specifying the L0 prediction and the L1 prediction as LN prediction. The spatial vector predictor candidate derivation unit 150 checks whether LN prediction of the candidate block is valid (S222). LN prediction of a candidate block being valid means that a reference index of the LN prediction of the candidate block is larger than or equal to 0.

If the LN prediction of the candidate block is valid (Y in S222), the spatial vector predictor candidate derivation unit 150 checks whether a reference picture indicated by the reference index of LN prediction of the candidate block is the same as a reference picture indicated by the reference index of the LX prediction (S223).

If the reference pictures are the same (Y in S223), the spatial vector predictor candidate derivation unit 150 sets a motion vector of the LN prediction of the candidate block to be a spatial vector predictor candidate of the LX prediction (S224) and ends the process.

If the LN prediction of the candidate block is not valid (N in S222), or if the reference pictures are not the same (N in S223), the spatial vector predictor candidate derivation unit 150 checks the L1 prediction if the LN prediction is the L0 prediction and checks a subsequent candidate block if the LN prediction is the L1 prediction (S225).

Upon the completion of checking of all candidate blocks (S226), the spatial vector predictor candidate derivation unit 150 checks whether the temporal candidate utilization permission flag (enable_temporal_mvp_flag) is 0 (S227).

If the temporal candidate utilization permission flag is 0 (Y in S227), the spatial scaling vector predictor candidate derivation unit 151 derives zero or one spatial vector predictor candidate of the LX prediction (S228) and ends the process. The detailed operation of the spatial scaling vector predictor candidate derivation unit 151 will be described later.

If the temporal candidate utilization permission flag is 1 (N in S227), the spatial scaling vector predictor candidate derivation unit 151 skips the step S228 and ends the process.

As described above, zero or one spatial vector predictor candidate is derived from each of the groups, and zero to two spatial vector predictor candidates are derived for the LX prediction.

(Detailed Operation of Spatial Scaling Vector Predictor Candidate Derivation Unit 151)

Figure 29:
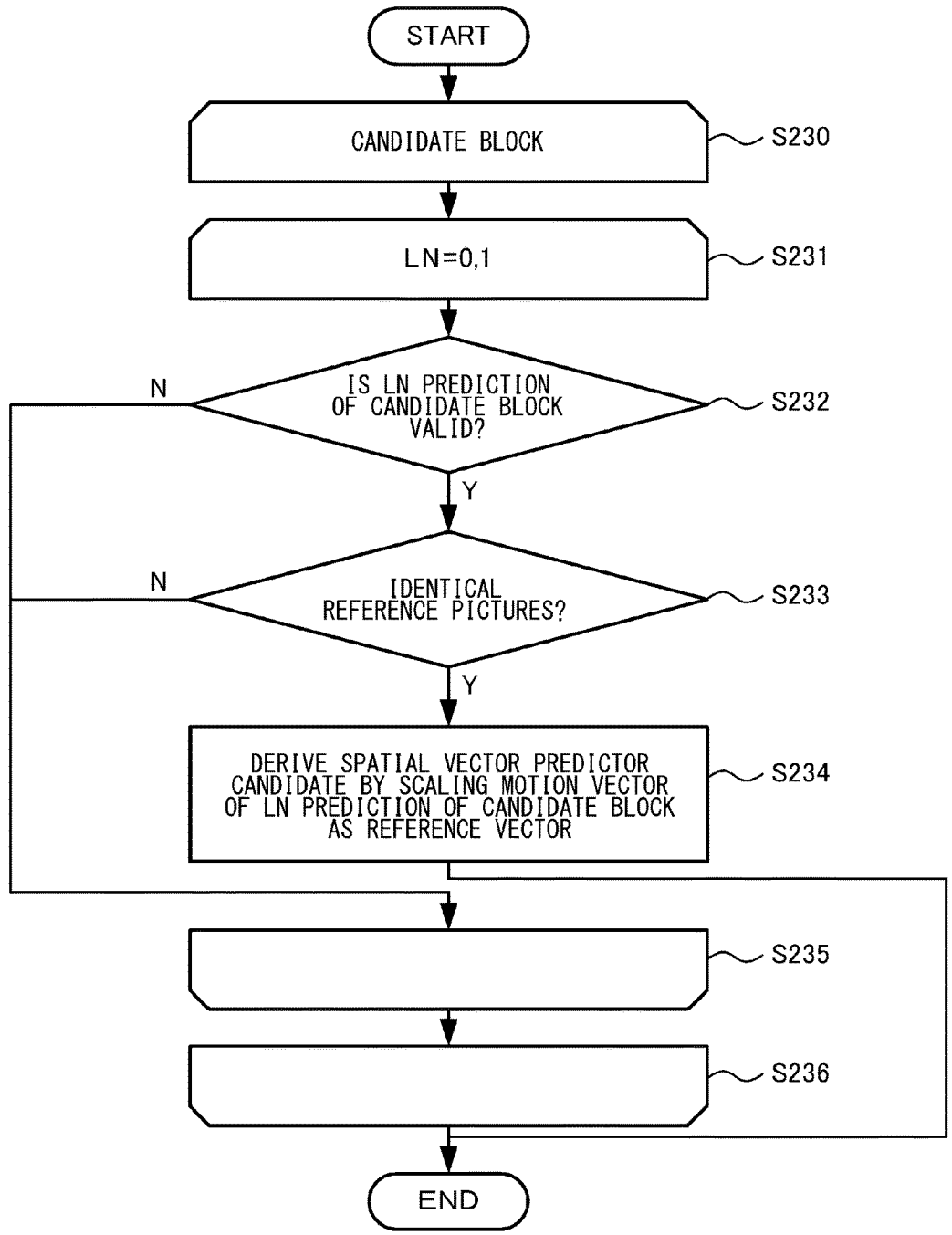
FIG. 29 is a flowchart explaining the operation of a spatial scaling vector predictor candidate derivation unit.

An explanation is now given of the detailed operation of the spatial scaling vector predictor candidate derivation unit 151. FIG. 29 is a flowchart explaining the operation of the spatial scaling vector predictor candidate derivation unit 151. An explanation is given regarding the derivation of a spatial vector predictor candidate of the LX prediction.

The spatial scaling vector predictor candidate derivation unit 151 repeats the following processes for a candidate block in the i-th group (i is 1 or 2) (S230 through S236). The first group is checked from the block E to the block A in order, and the second group is checked from the block C to the block B to the block D in order.

The following processes are repeated for each candidate block in order of the L0 prediction and the L1 prediction (S231 through S235). Hereinafter, an explanation is given while specifying the L0 prediction and the L1 prediction as LN prediction.

Subsequently, the spatial scaling vector predictor candidate derivation unit 151 checks whether LN prediction of the candidate block is valid (S232). LN prediction of a candidate block being valid means that a reference index of the LN prediction of the candidate block is larger than or equal to 0.

If the LN prediction of the candidate block is valid (Y in S232), the spatial scaling vector predictor candidate derivation unit 151 checks whether a reference picture indicated by the reference index of LN prediction of the candidate block is not the same as a reference picture indicated by the reference index of the LX prediction (S233).

If the reference pictures are not the same (Y in S233), the spatial scaling vector predictor candidate derivation unit 151 derives a spatial vector predictor candidate while using a motion vector of the LN prediction of the candidate block as a reference vector of the LX prediction (S234) and ends the process. The detailed method of deriving a spatial vector predictor candidate by the spatial scaling vector predictor candidate derivation unit 151 will be described later.

If the LN prediction of the candidate block is not valid (N in S232), or if the reference pictures are the same (N in S233), the spatial scaling vector predictor candidate derivation unit 151 checks the L1 prediction if the LN prediction is the L0 prediction and checks a subsequent candidate block if the LN prediction is the L1 prediction (S235).

The spatial scaling vector predictor candidate derivation unit 151 ends the process when checking is finished for all candidate blocks (S236).

An explanation is now given regarding the detailed method of deriving a spatial vector predictor candidate by the spatial scaling vector predictor candidate derivation unit 151. Using an inter-picture distance between a reference picture NeiRefLXPic referred to by the reference vector of the LX prediction and a target picture CurPic, an inter-picture distance between a reference image RefLXPic indicated by the reference index of the LX prediction and the target picture CurPic, and the reference motion vector of the LX prediction as td, tb, and mvLX, respectively, a spatial vector predictor candidate mvScLX is calculated by Expression 1 or Expression 2 through Expression 4 described above.

(Detailed Operation of Temporal Vector Predictor Candidate Derivation Unit 152)

Figure 30:
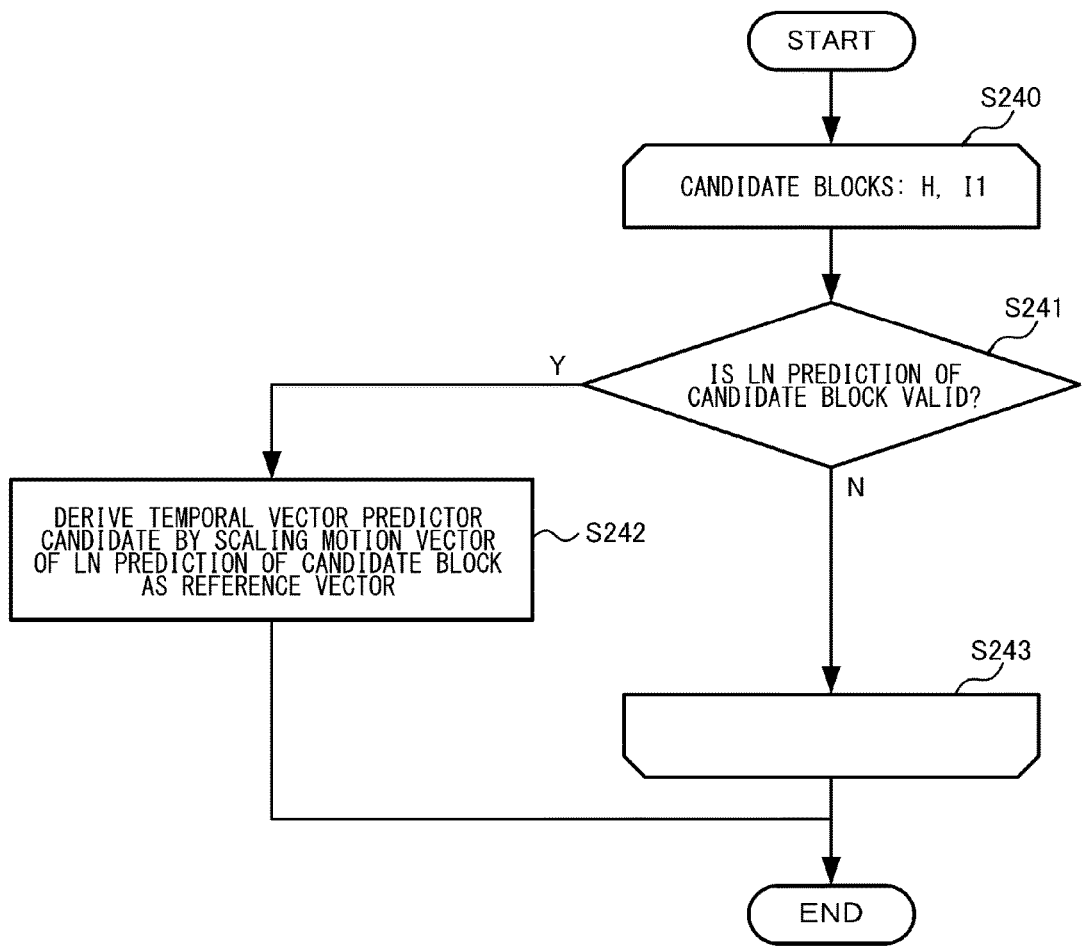
FIG. 30 is a flowchart explaining the operation of a temporal vector predictor candidate derivation unit.

An explanation is now given of the detailed operation of the temporal vector predictor candidate derivation unit 152. FIG. 30 is a flowchart explaining the operation of the temporal vector predictor candidate derivation unit 152. An explanation is given regarding the derivation of a temporal vector predictor candidate of the LX prediction.

The following processes are repeated for the temporal candidate blocks (S240 through S243). The temporal candidate blocks are checked in order from the block H to the block I.

First, the temporal vector predictor candidate derivation unit 152 checks whether LN prediction of the candidate block is valid (S241). In this case, it is assumed that the LN prediction is the same as the LX prediction. However, the LN prediction does not need to be the same as the LX prediction. LN prediction of a candidate block being valid means that a reference index of the LN prediction of the candidate block is larger than or equal to 0.

If the LN prediction of the candidate block is valid (Y in S241), the temporal vector predictor candidate derivation unit 152 derives a temporal vector predictor candidate while using a motion vector of the LN prediction of the candidate block as a reference vector of the LX prediction (S242) and ends the process. A description of a detailed method of deriving a temporal vector predictor candidate will be described later.

If the LN prediction of the candidate block is not valid (N in S241), the temporal vector predictor candidate derivation unit 152 checks a subsequent candidate block (S243).

The temporal vector predictor candidate derivation unit 152 ends the process when checking is finished for all the candidate blocks (S243).

An explanation is now given regarding a detailed method of deriving a temporal vector predictor candidate. Using an inter-picture distance between a ColPic having a temporal candidate block and a ColRefLXPic, which is a picture referred to by the temporal candidate block in motion compensation prediction of the LN prediction, an inter-picture distance between a reference image RefLXPic indicated by the reference index of the LX prediction and a target picture CurPic, and the reference motion vector of the LX prediction as td, tb, and mvLX, respectively, a temporal vector predictor candidate mvLXCol is calculated by Expression 1 or Expression 2 through Expression 4 described above.

(Configuration of Moving Picture Decoding Device 200)

Figure 31:
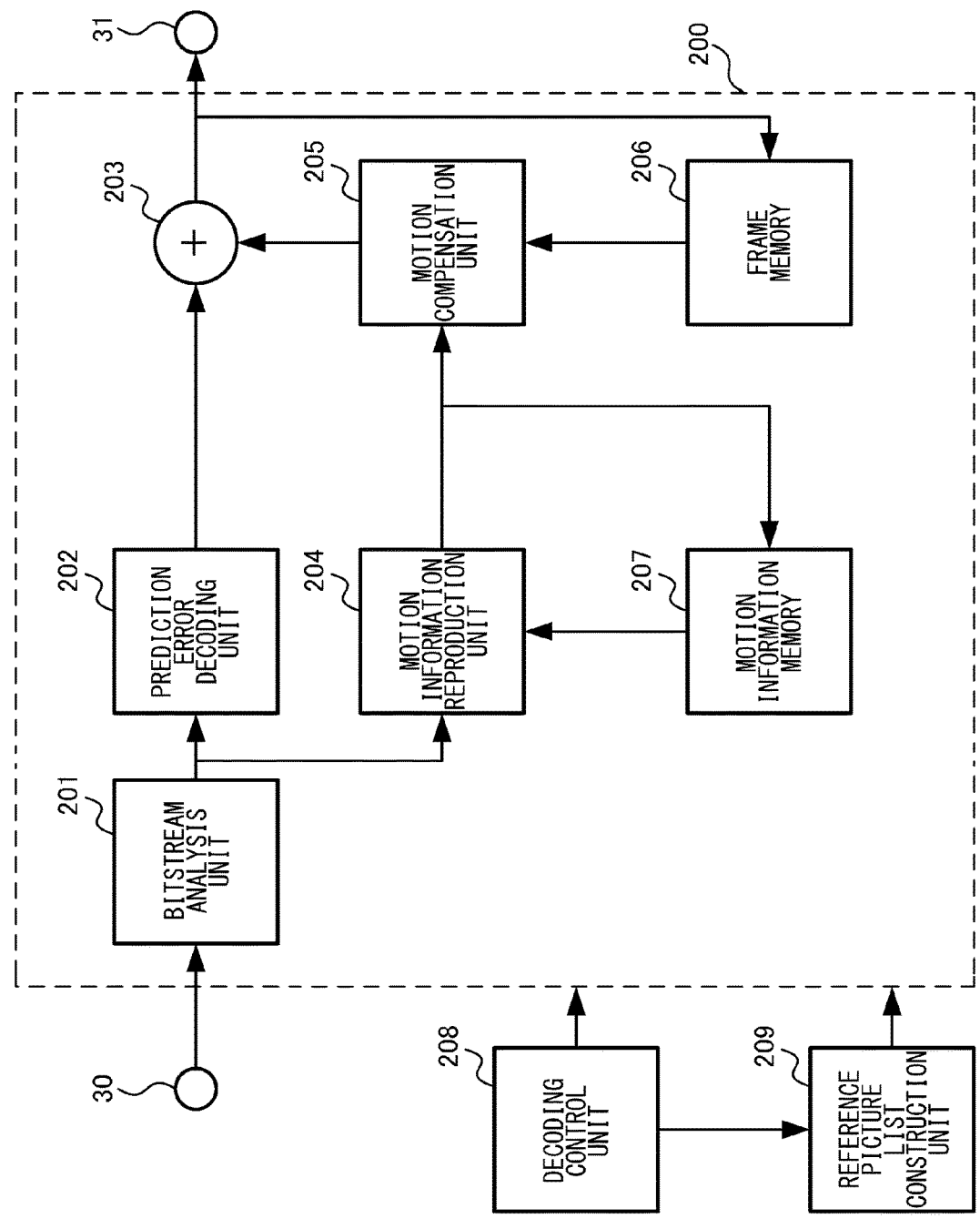
FIG. 31 is a diagram showing the configuration of a moving picture decoding device according to the first embodiment.

An explanation is now given of a moving picture decoding device according to the first embodiment. FIG. 31 is a diagram showing the configuration of the moving picture decoding device 200 according to the first embodiment. The moving picture decoding device 200 is a device that generates a reproduction picture by decoding a bitstream coded by the moving picture coding device 100. The determination of a slice type, the maximum value of a reference index that can be used in a slice, the partition of a coding block, the determination of a skip mode, the determination of a prediction block size type, the determination of a prediction block size and a position in a coding block of a prediction block (position information of a prediction block), and the determination of whether a prediction coding mode is intra are determined by a decoding control unit 208 outside the moving picture decoding device 200 and supplied to the moving picture decoding device 200. A reference picture list is constructed by a reference picture list construction unit 209 outside the moving picture decoding device 200 and supplied to the moving picture decoding device 200. An explanation is given regarding a case where a prediction coding mode is not intra. An explanation is given regarding a B picture (B slice), which corresponds to bi-prediction, in the first embodiment unless otherwise noted. For a P picture (P slice), which does not correspond to bi-prediction, L1 prediction needs to be omitted.

The moving picture decoding device 200 is achieved by hardware such as an information processing device or the like provided with a CPU (Central Processing Unit), a frame memory, a hard disk, and the like. By the operation of the above constituting elements, the moving picture decoding device 200 achieves functional constituting elements explained in the following. The slice type, the reference picture list, the maximum value of the reference index that can be used in the slice, and the position information and the prediction block size of a prediction block subject to decoding are assumed to be shared in the moving picture decoding device 200 and are thus not shown.

The moving picture decoding device 200 according to the first embodiment includes a bitstream analysis unit 201, a prediction error decoding unit 202, an addition unit 203, a motion information reproduction unit 204, a motion compensation unit 205, a frame memory 206, and a motion information memory 207.

(Operation of Moving Picture Decoding Device 200)

An explanation is given in the following regarding the function and operation of each component. The bitstream analysis unit 201 analyzes a bitstream supplied by the terminal 30 so as to subject prediction error coding data, a merge flag, a merge index, a prediction direction (inter prediction type) of motion compensation prediction, a reference index, a vector difference, and a vector predictor index to entropy decoding according to syntax. The entropy decoding is performed by a method including variable-length coding such as arithmetic coding, Huffman coding, or the like. The bitstream analysis unit 201 supplies the prediction error coding data to the prediction error decoding unit 202 and supplies the merge flag, the merge index, the inter prediction type, the reference index, the vector difference, and the vector predictor index to the motion information reproduction unit 204.

The bitstream analysis unit 201 decodes the partition information for the coding block, the prediction block size type, the position in the coding block of the prediction block, and the prediction coding mode used in the moving picture decoding device 200 from the bitstream along with an SPS (Sequence Parameter Set) defining a parameter group for determining the properties of the bitstream, a PPS (Picture Parameter Set) defining a parameter group for determining the properties of the picture, a slice header defining a parameter group for determining the properties of the slice, and the like.

The motion information reproduction unit 204 reproduces motion information from the merge flag, the merge index, the inter prediction type, the reference index, the vector difference, and the vector predictor index supplied by the bitstream analysis unit 201 and the candidate block group supplied by the motion information memory 207 and supplies the motion information to the motion compensation unit 205 and the motion information memory 207. The detailed configuration of the motion information reproduction unit 204 will be described later.

The motion compensation unit 205 performs motion compensation on a reference picture that is indicated by a reference index in the frame memory 206 based on the motion information supplied by the motion information reproduction unit 204 so as to generate a prediction signal. If the prediction direction is bi-prediction, the motion compensation unit 205 generates the average of respective prediction signals for the L0 prediction and the L1 prediction as the prediction signal and supplies the prediction signal to the addition unit 203.

The prediction error decoding unit 202 generates a prediction error signal by performing a process such as inverse quantization, inverse orthogonal transformation, or the like on the prediction error coding data supplied by the bitstream analysis unit 201 and supplies the prediction error signal to the addition unit 203.

The addition unit 203 adds the prediction error signal supplied by the prediction error decoding unit 202 and the prediction signal supplied by the motion compensation unit 205 so as to generate a decoding picture signal and supplies the decoding picture signal to the frame memory 206 and the terminal 31.

The frame memory 206 and the motion information memory 207 have the same respective functions of the frame memory 110 and the motion information memory 111 of the moving picture coding device 100, respectively. The frame memory 206 stores the decoding picture signal supplied by the addition unit 203. The motion information memory 207 stores the motion information supplied by the motion information reproduction unit 204 in units of the minimum prediction block sizes. The reference picture list construction unit 209 constructs a reference picture list according to the slice type supplied from the decoding control unit 208. If the slice type is a P slice or a B slice, the reference picture list construction unit 209 constructs a reference picture list L0. If the slice type is a B slice, the reference picture list construction unit 209 constructs a reference picture list L1. A specific method of constructing the reference picture list L0 and the reference picture list L1 is the same as the method by the reference picture list construction unit 113 of the moving picture coding device 100.

(Detailed Configuration of Motion Information Reproduction Unit 204)

Figure 32:
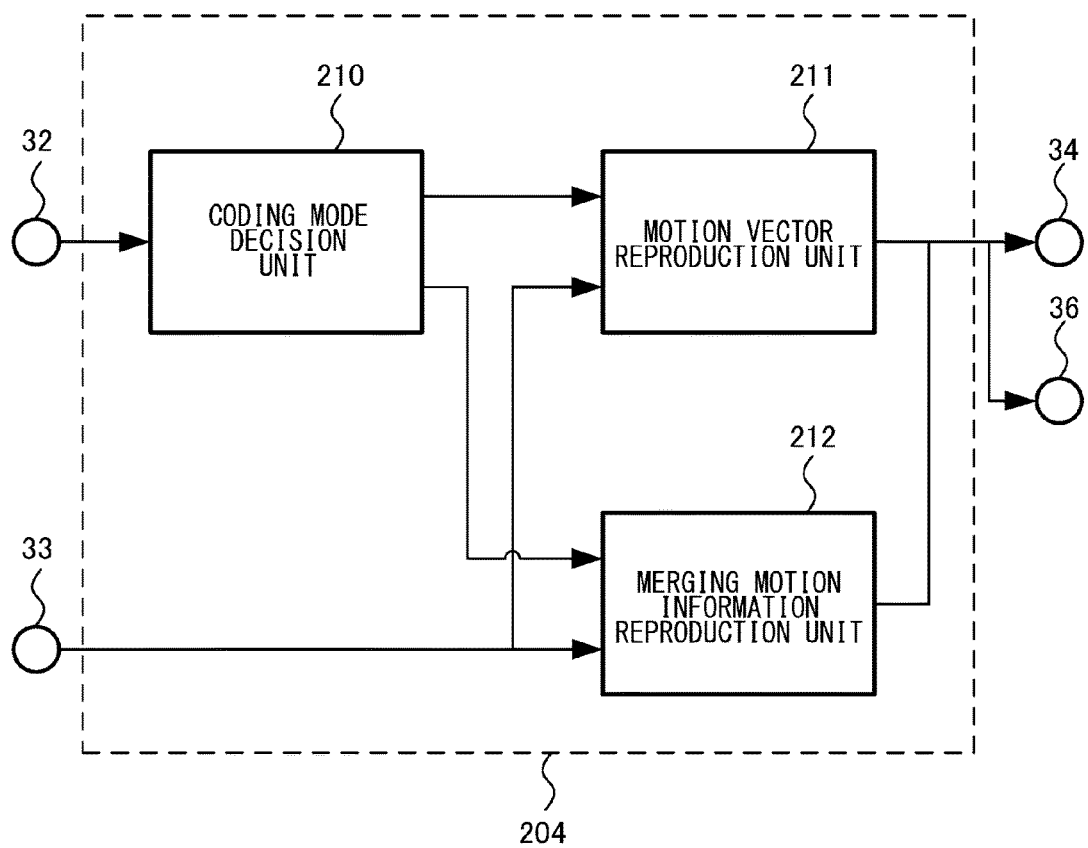
FIG. 32 is a diagram showing the configuration of a motion information reproduction unit shown in FIG. 31.

An explanation is now given regarding the detailed configuration of the motion information reproduction unit 204. FIG. 32 shows the configuration of the motion information reproduction unit 204. The motion information reproduction unit 204 includes a coding mode decision unit 210, a motion vector reproduction unit 211, and a merging motion information reproduction unit 212. A terminal 32, a terminal 33, a terminal 34, and a terminal 36 are connected to the bitstream analysis unit 201, the motion information memory 207, the motion compensation unit 205, and the motion information memory 207, respectively.

(Detailed Operation of Motion Information Reproduction Unit 204)

An explanation is given in the following regarding the function and operation of each component. The coding mode decision unit 210 determines whether the merge flag supplied by the bitstream analysis unit 201 is "0" or "1". If the merge flag is "0", the coding mode decision unit 210 supplies the inter prediction type, the reference index, the vector difference, and the vector predictor index supplied by the bitstream analysis unit 201 to the motion vector reproduction unit 211. If the merge flag is "1", the coding mode decision unit 210 supplies the merge index supplied by the bitstream analysis unit 201 to the merging motion information reproduction unit 212. In the case of the skip mode, the coding mode decision unit 210 also supplies the merge index supplied by the bitstream analysis unit 201 to the merging motion information reproduction unit 212.

The motion vector reproduction unit 211 reproduces a motion vector from the inter prediction type, the reference index, the vector difference, and the vector predictor index supplied by the coding mode decision unit 210 and the candidate block group supplied by the terminal 22 so as to generate motion information and supplies the motion information to the terminal 34 and the terminal 36.

The merging motion information reproduction unit 212 constructs a merging motion information candidate list from the candidate block group supplied by the terminal 33, selects motion information of a merging motion information candidate indicated by the merge index supplied by the coding mode decision unit 210 from the merging motion information candidate list, and supplies the motion information to the terminal 34 and the terminal 36.

(Detailed Configuration of Merging Motion Information Reproduction Unit 212)

Figure 33:
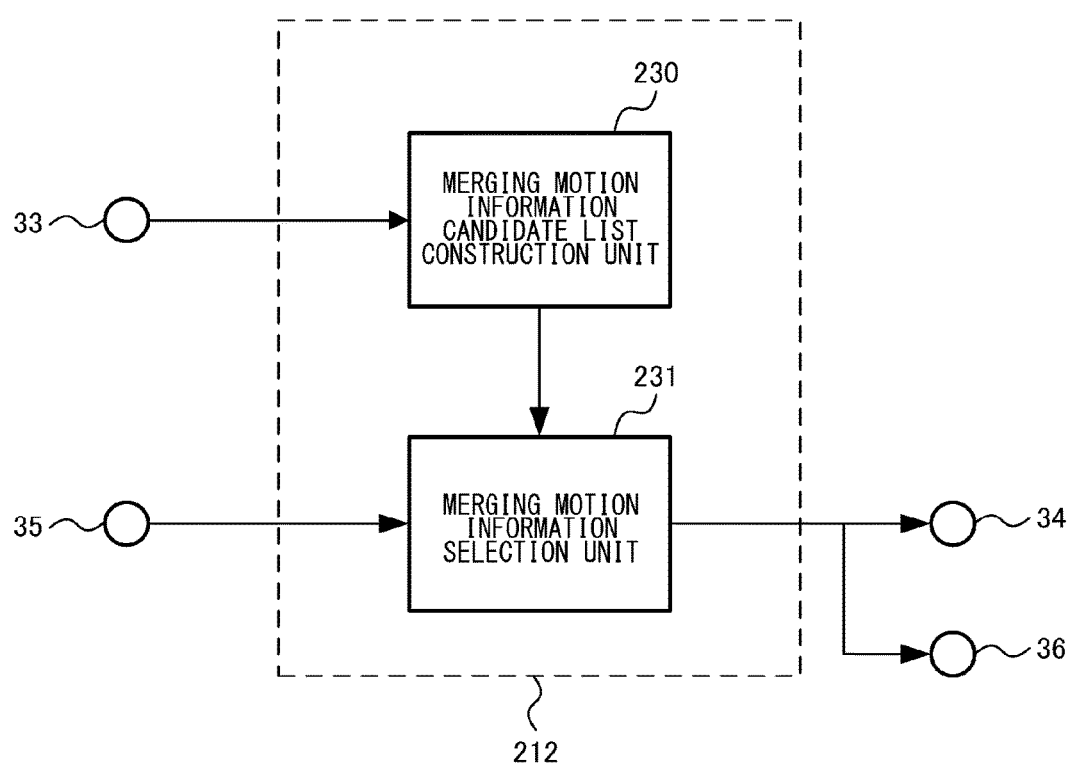
FIG. 33 is a diagram showing the configuration of a merging motion information reproduction unit shown in FIG. 32.

An explanation is now given regarding the detailed configuration of the merging motion information reproduction unit 212. FIG. 33 shows the configuration of the merging motion information reproduction unit 212. The merging motion information reproduction unit 212 includes a merging motion information candidate list construction unit 230 and a merging motion information selection unit 231. A terminal 35 is connected to the coding mode decision unit 210.

(Detailed Operation of Merging Motion Information Reproduction Unit 212)

Figure 34:
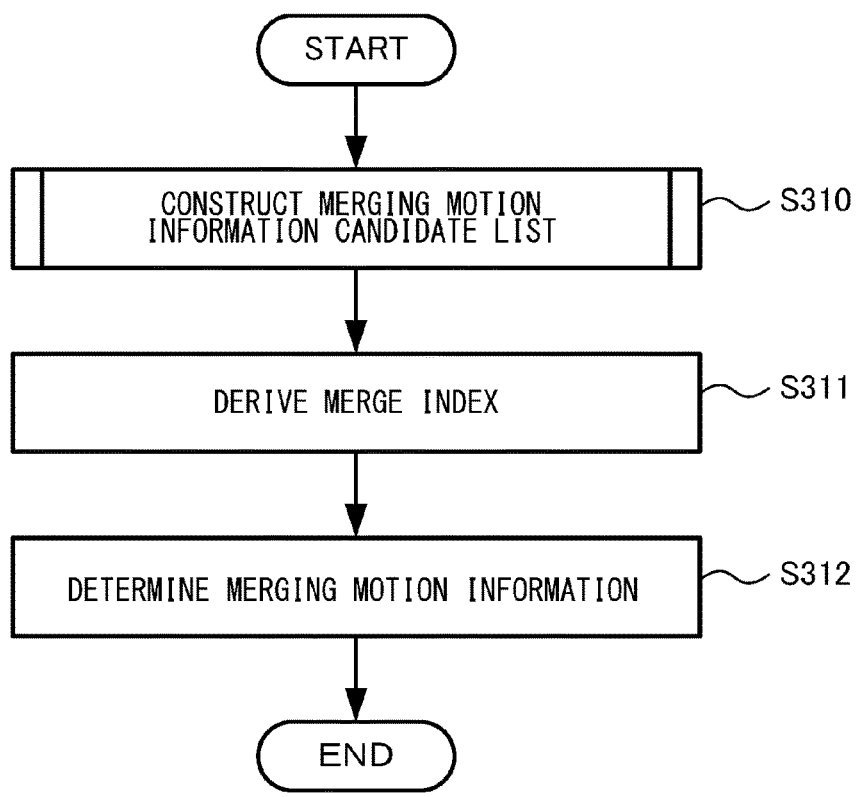
FIG. 34 is a diagram explaining the operation of a merging motion information reproduction unit.

An explanation is given in the following regarding the function and operation of each component. FIG. 34 is a diagram explaining the operation of the merging motion information reproduction unit 212. The merging motion information candidate list construction unit 230 constructs a merging motion information candidate list from the candidate block group supplied by the terminal 33 (S310) and supplies the merging motion information candidate list to the merging motion information selection unit 231.

The merging motion information selection unit 231 derives a merge index supplied by the terminal 35 (S311), selects a merging motion information candidate indicated by the merge index from the merging motion information candidate list supplied by the merging motion information candidate list construction unit 230 so as to determine merging motion information (S312), and supplies motion information of the merging motion information to the terminals 34 and 36.

(Detailed Configuration of Motion Vector Reproduction Unit 211)

Figure 35:
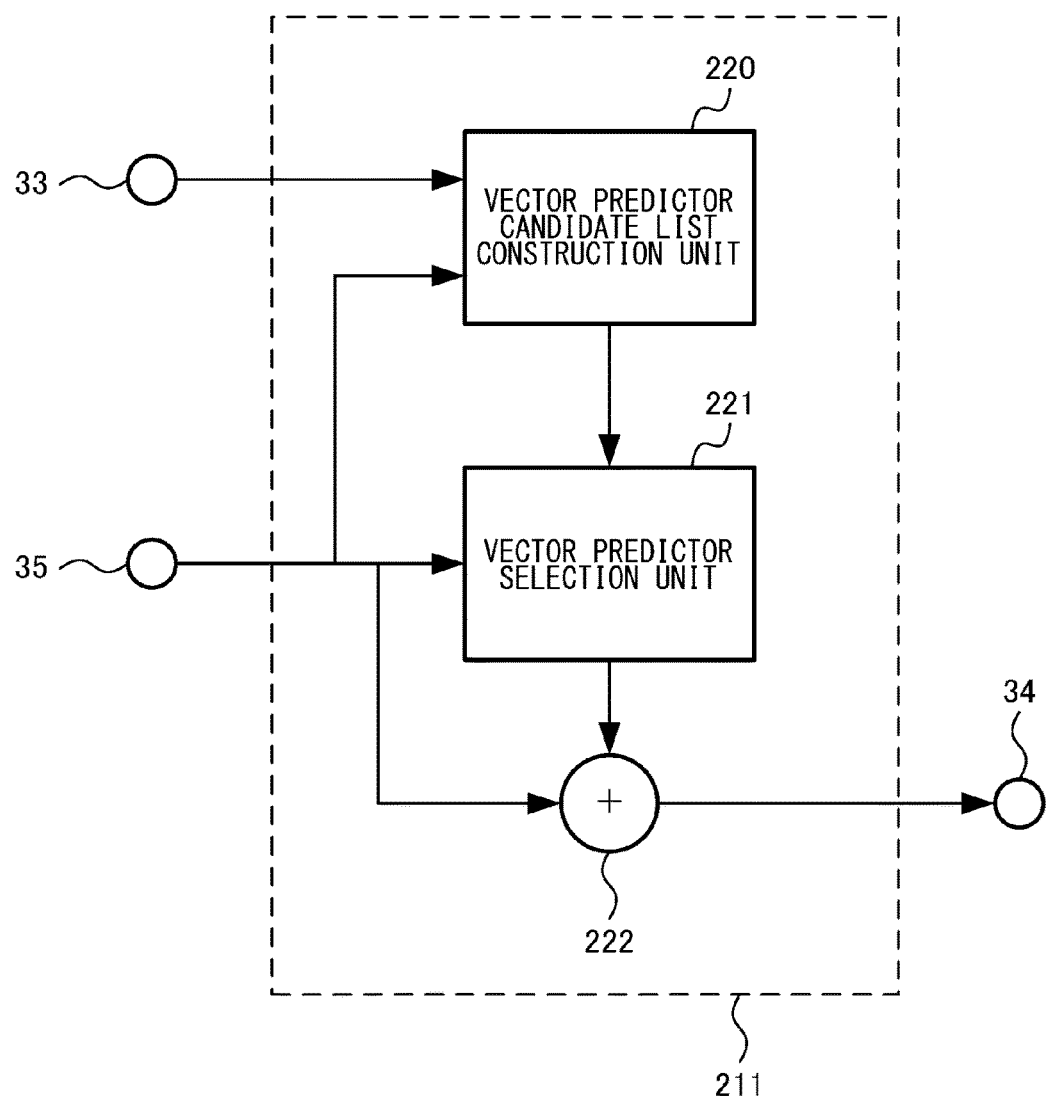
FIG. 35 is a diagram explaining the configuration of a motion vector reproduction unit.

Subsequently, an explanation is given regarding the detailed configuration of the motion vector reproduction unit 211. FIG. 35 is a diagram explaining the configuration of the motion vector reproduction unit 211. The motion vector reproduction unit 211 includes a vector predictor candidate list construction unit 220, a vector predictor selection unit 221, and an addition unit 222. The terminal 35 is connected to the coding mode decision unit 210.

(Detailed Operation of Motion Vector Reproduction Unit 211)

Figure 36:
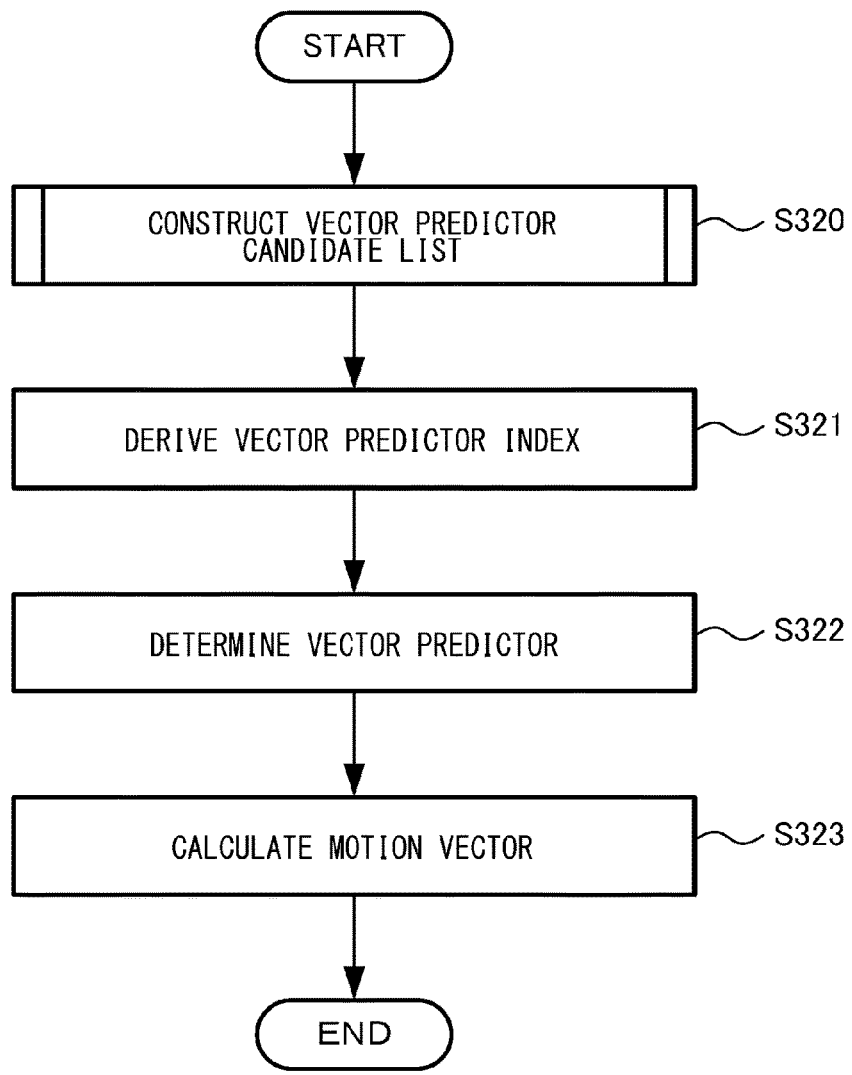
FIG. 36 is a diagram explaining the operation of the motion vector reproduction unit.

An explanation is given in the following regarding the function and operation of each component. FIG. 36 is a diagram explaining the operation of the motion vector reproduction unit 211. The motion vector reproduction unit 211 calculates a motion vector for L0 prediction if the inter prediction type supplied by the terminal 35 is L0 prediction, calculates a motion vector for L1 prediction if the inter prediction type is L1 prediction, and calculates a motion vector for L0 prediction and for L1 prediction if the inter prediction type is BI prediction. The calculation of a motion vector for each LX prediction is as shown in the following.

The vector predictor candidate list construction unit 220 constructs a vector predictor candidate list of the LX prediction from a reference index of the LX prediction supplied by the terminal 35 and a candidate block group supplied by the terminal 33 (S320) and supplies the vector predictor candidate list of the LX prediction to the vector predictor selection unit 221.

The vector predictor selection unit 221 derives a vector predictor index of the LX prediction supplied by the terminal 35 (S321), selects a vector predictor candidate indicated by the vector predictor index of the LX prediction from the vector predictor list of the LX prediction supplied by the vector predictor candidate list construction unit 220 so as to determine the vector predictor candidate as a vector predictor of the LX prediction (S322), and adds the vector predictor of the LX prediction and a vector difference of the LX prediction supplied by the terminal 35 so as to calculate a motion vector of the LX prediction (S323).

Motion information is generated by combining the motion vector of the LX prediction and an inter prediction type, and the motion information is supplied to the terminal 34 and the terminal 36.

As described above, the moving picture decoding device 200 is capable of generating a reproduction picture by decoding a bitstream coded by the moving picture coding device 100.

Second Embodiment

Figure 37:
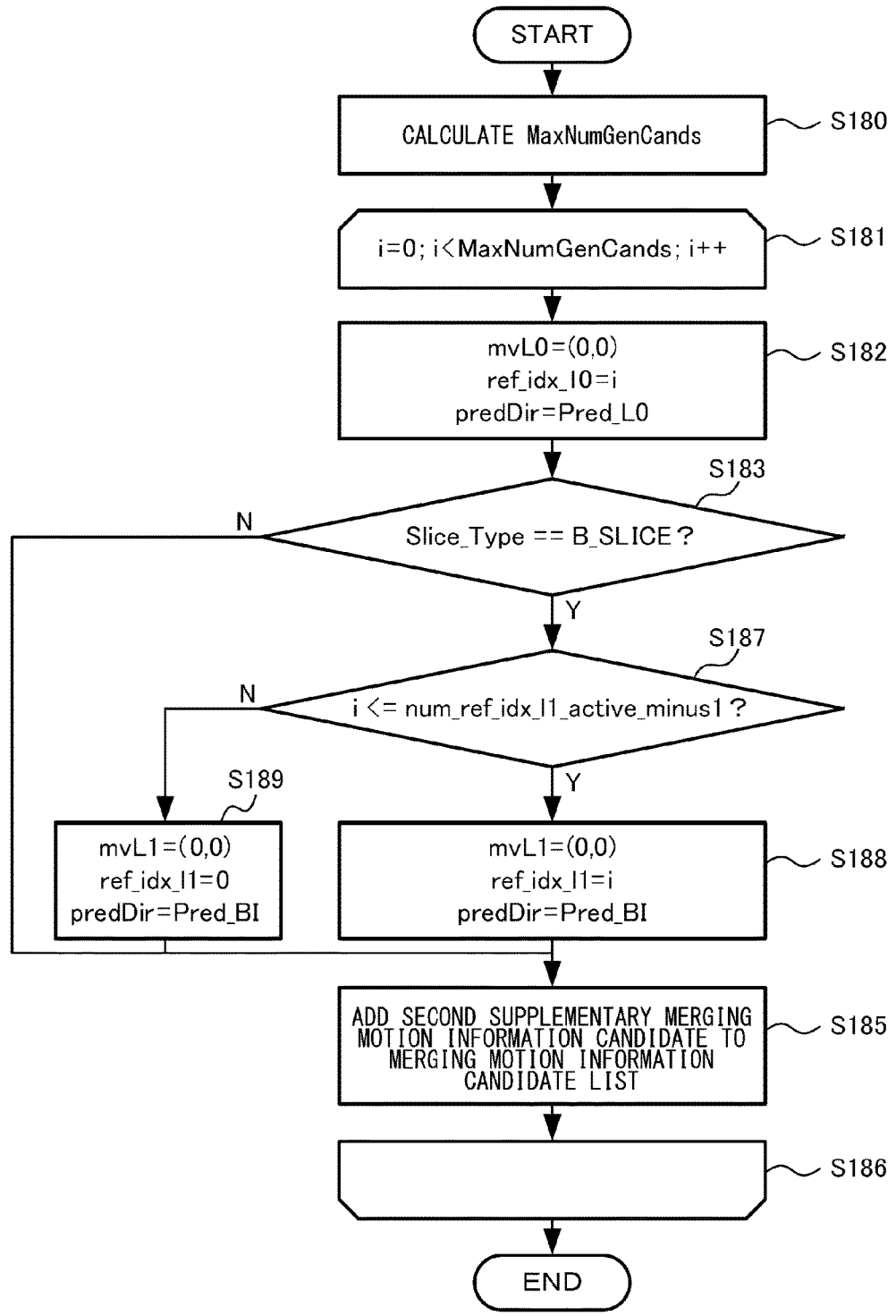
FIG. 37 is a flowchart explaining the operation of a second merging motion information candidate supplying unit according to a second embodiment.

An explanation is given in the following regarding a second embodiment. The operation of the second merging motion information candidate supplying unit 165 is different from that in the first embodiment. An explanation is given in the following regarding differences from the first embodiment. FIG. 37 is a flowchart explaining the operation of the second merging motion information candidate supplying unit 165 according to the second embodiment. Addition of step S187 through step S189 in place of step S184 is different from the second merging motion information candidate supplying unit 165 according to the first embodiment. An explanation is given in the following regarding the step S187 through the step S189. In this case, an explanation is given on the condition that the number of available reference pictures in the reference picture list L0 is larger or equal to the number of available reference pictures in the reference picture list L1.

The second merging motion information candidate supplying unit 165 checks whether i is smaller than or equal to the maximum value of the reference index of L1 prediction (num_ref_idx_l1_active_minus1) (S187). If i is smaller than or equal to the maximum value of the reference index of L1 prediction (num_ref_idx_l1_active_minus1) (Y in S187), the second merging motion information candidate supplying unit 165 derives a second supplementary merging motion information candidate that has a motion vector (mvL1) of (0,0) for the L1 prediction, a reference index (ref_idx_l1) of i for the L1 prediction, and an inter prediction type of Pred_BI (S188) and adds the second supplementary merging motion information candidate to the merging motion information candidate list (S185). If i is not smaller than or equal to the maximum value of the reference index of L1 prediction (num_ref_idx_l1_active_minus1) (N in S187), the second merging motion information candidate supplying unit 165 derives a second supplementary merging motion information candidate that has a motion vector (mvL1) of (0,0) for the L1 prediction, a reference index (ref_idx_l1) of 0 for the L1 prediction, and an inter prediction type of Pred_BI (S189) and adds the second supplementary merging motion information candidate to the merging motion information candidate list (S185).

FIGS. 38A and 38B are diagrams explaining an example of a relationship between a reference index of a second supplementary merging motion information candidate and a POC according to the second embodiment. FIGS. 38A and 38B show an example where the number of available reference pictures in the reference picture list L0 is 4 and where the number of available reference pictures in the reference picture list L1 is 2. FIG. 38A shows a reference index of a second supplementary merging motion information candidate when there is no rearrangement between the order of an input picture and the order of coding. FIG. 38B shows a reference index of a second supplementary merging motion information candidate when there is rearrangement between the order of an input picture and the order of coding.

An explanation is given regarding FIG. 38A. A reference index of the L0 prediction and a reference index of the L1 prediction of the 0-th second supplementary merging motion information candidate are both 0, and a reference picture of the L0 prediction and a reference picture of the L1 prediction are identical both being reference pictures having a POC of n+7. Therefore, while the 0-th second supplementary merging motion information candidate has motion information for bi-prediction, the 0-th second supplementary merging motion information candidate represents a prediction signal that is identical with a prediction signal for uni-prediction obtained by performing motion compensation prediction on a reference picture having a POC of n+7 using a motion vector of (0,0).

A reference index of the L0 prediction and a reference index of the L1 prediction of the first second supplementary merging motion information candidate are both 1, and a reference picture of the L0 prediction and a reference picture of the L1 prediction are identical both being reference pictures having a POC of n+6. Therefore, while the first second supplementary merging motion information candidate has motion information for bi-prediction, the first second supplementary merging motion information candidate represents a prediction signal that is identical with a prediction signal for uni-prediction obtained by performing motion compensation prediction on a reference picture having a POC of n+6 using a motion vector of (0,0).

In the second second supplementary merging motion information candidate, the reference index of the L0 prediction and the reference index of the L1 prediction are 2 and 0, respectively, and the reference picture of the L0 prediction and the reference picture of the L1 prediction are a reference picture having a POC of n+5 and a reference picture having a POC of n+7, respectively.

In the third second supplementary merging motion information candidate, the reference index of the L0 prediction and the reference index of the L1 prediction are 3 and 0, respectively, and the reference picture of the L0 prediction and the reference picture of the L1 prediction are a reference picture having a POC of n+4 and a reference picture having a POC of n+7, respectively.

As described above, by setting the i-th second supplementary merging motion information candidate to represent motion information with a motion vector of (0,0) for the L0 prediction and for the L1 prediction, a reference index of i for the L0 prediction and for the L1 prediction, and an inter prediction type of Pred_BI if a reference picture in the reference picture list L1 is present and by setting the i-th second supplementary merging motion information candidate to represent motion information with a motion vector of (0,0) for the L0 prediction, a reference index of i for the L0 prediction, and a reference index of 0 for the L1 prediction, and an inter prediction type of Pred_BI if a reference picture in the reference picture list L1 is not present, second supplementary merging motion information candidates up to the number of available reference pictures in the reference picture list L1 are derived having motion information being directed to bi-prediction and representing prediction signals being identical with those for uni-prediction. This allows for motion compensation prediction where only a reference picture close to a target picture, which has high correlation with the target picture in general, is used. This also allows for bi-prediction to be performed where the nearest reference picture is used in a case where second supplementary merging motion information candidates more than the number of the available reference pictures in the reference picture list L1 are derived.

In this case, for example, in a case where a reference picture having a POC of n+7 is not identical with a target picture since there is a shielding object in the reference picture in a part of a moving picture and where a reference picture having a POC of n+6 is identical with the target picture since there is no shielding object in the reference picture having a POC of n+6, a highly accurate prediction signal can be obtained by using the first second supplementary merging motion information candidate.

An explanation is given regarding FIG. 38B. A reference index of the L0 prediction and a reference index of the L1 prediction of the 0-th second supplementary merging motion information candidate are both 0, and a reference picture of the L0 prediction and a reference picture of the L1 prediction are a reference picture having a POC of n+4 and a reference picture having a POC of n+6, respectively.

A reference index of the L0 prediction and a reference index of the L1 prediction of the first second supplementary merging motion information candidate are both 1, and a reference picture of the L0 prediction and a reference picture of the L1 prediction are a reference picture having a POC of n+2 and a reference picture having a POC of n+8, respectively.

A reference index of the L0 prediction and a reference index of the L1 prediction of the second second supplementary merging motion information candidate are 2 and 0, respectively, and a reference picture of the L0 prediction and a reference picture of the L1 prediction are identical both being reference pictures having a POC of n+6. Therefore, while the second second supplementary merging motion information candidate has motion information for bi-prediction, the second second supplementary merging motion information candidate represents a prediction signal that is identical with a prediction signal for uni-prediction obtained by performing motion compensation prediction on a reference picture having a POC of n+6 using a motion vector of (0,0).

A reference index of the L0 prediction and a reference index of the L1 prediction of the third second supplementary merging motion information candidate are 3 and 0, respectively, and a reference picture of the L0 prediction and a reference picture of the L1 prediction are a reference picture having a POC of n+8 and a reference picture having a POC of n+6, respectively.

As described above, all the respective reference pictures of the L0 prediction and the L1 prediction can be assigned to reference pictures of the second supplementary merging motion information candidates by setting the i-th second supplementary merging motion information candidate to have a motion vector of (0,0) for the L0 prediction and for the L1 prediction, a reference index of i for the L0 prediction and for the L1 prediction, and an inter prediction type of Pred_BI. In this case, if a first supplementary merging motion information candidate is be derived by combining a second supplementary merging motion information candidate and a predetermined merging motion information candidate in the merging motion information candidate list, a new second supplementary merging motion information candidate is not derived if the predetermined merging motion information candidate is directed to uni-prediction of the L0 prediction. Also, even when the predetermined merging motion information candidate is directed to bi-prediction, since there is no motion vector or reference picture for the L1 prediction to be combined with the L0 prediction of the predetermined merging motion information candidate, a first supplementary merging motion information candidate using the L0 prediction of the predetermined merging motion information candidate is not derived.

In this case, by allowing all the second supplementary merging motion information candidates to be directed to bi-prediction, the derivation of more first supplementary merging motion information candidates can be possible when combined with a predetermined merging motion information candidate in the merging motion information candidate list, and the coding efficiency can thus be improved. Also, even when second supplementary merging motion information candidates are combined with each other, the probability of a first supplementary merging motion information candidate to be derived can be increased.

Third Embodiment

Figure 39:
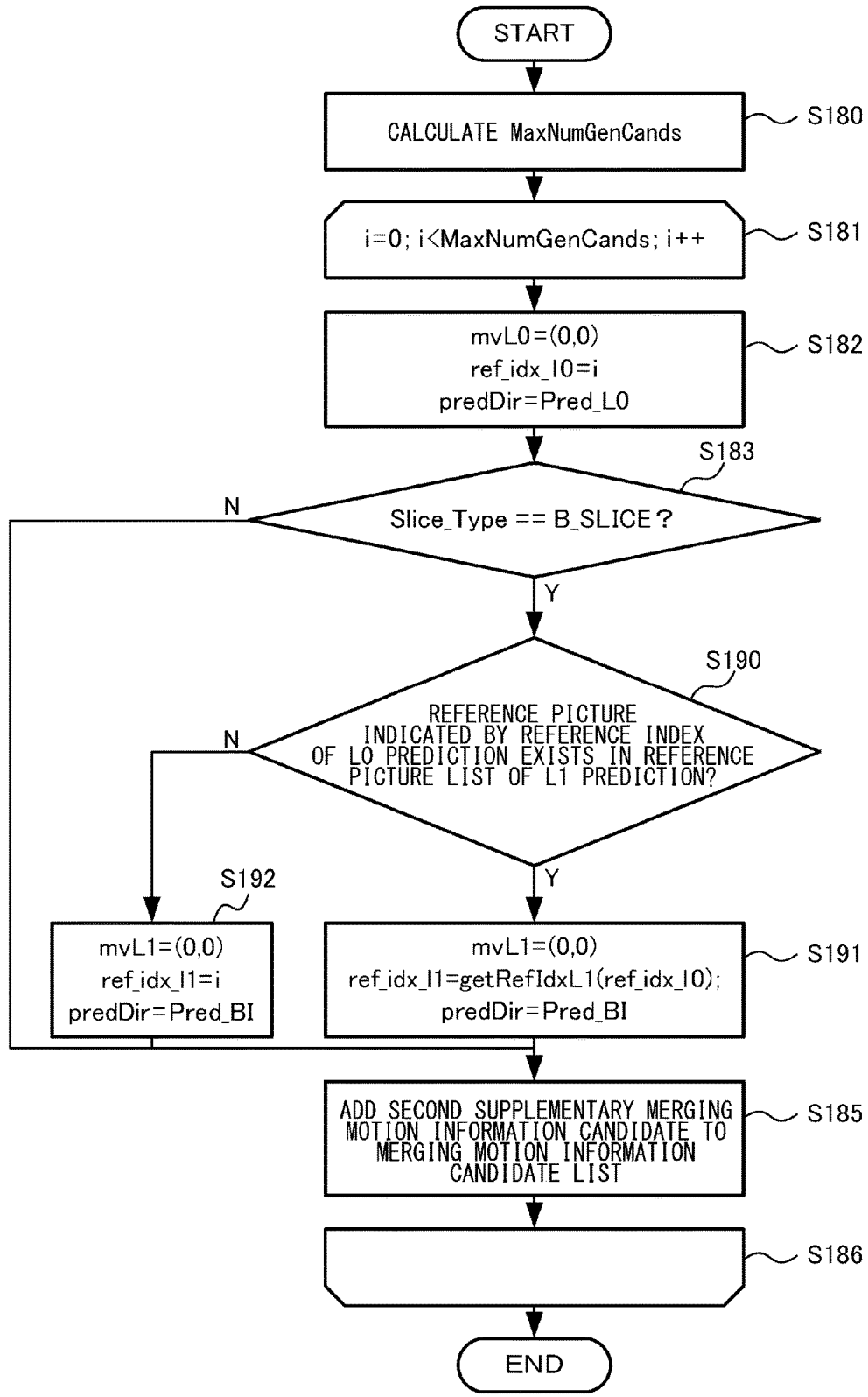
FIG. 39 is a flowchart explaining the operation of a second merging motion information candidate supplying unit according to a third embodiment.

An explanation is given in the following regarding a third embodiment. The operation of the second merging motion information candidate supplying unit 165 is different from that in the first embodiment. An explanation is given in the following regarding differences from the first embodiment. FIG. 39 is a flowchart explaining the operation of the second merging motion information candidate supplying unit 165 according to the second embodiment. Addition of step S190 through step S192 in place of step S184 is different from the second merging motion information candidate supplying unit 165 according to the first embodiment. Also, an expression for calculating MaxNumGenCand, which is the maximum number for deriving second supplementary merging motion information candidates, is different. An explanation is given in the following regarding S190 through the step S192.

First, the second merging motion information candidate supplying unit 165 calculates MaxNumGenCand, which is the maximum number for deriving second supplementary merging motion information candidates, by Expression 7 (S180).

MaxNumGenCand=Min(MaxNumMergeCand−Num-CandList,Min(num_ref_idx_*l*0_active_minus1+ 1, num_ref_idx_*l*1_active_minus1+1))  Expression 7

The second merging motion information candidate supplying unit 165 checks whether there is a reference picture indicated by a reference index of the L0 prediction in a reference picture list of the L1 prediction (S190).

If there is the reference picture indicated by the reference index of the L0 prediction in the reference picture list of the L1 prediction, the second merging motion information candidate supplying unit 165 derives a second supplementary merging motion information candidate that has a motion vector (mvL1) of (0,0) for the L1 prediction, a reference index of the L1 prediction that indicates a reference picture identical with the reference picture indicated by the reference index of the L0 prediction, and an inter prediction type of Pred_BI (S191) and adds the second supplementary merging motion information candidate to the merging motion information candidate list (S185). In this case, it is assumed that getRefIdxL1 (ref_idx_l0) is a function for obtaining the reference index of the L1 prediction that indicates the reference picture identical with the reference picture indicated by the reference index of the L0 prediction.

If there is no reference picture indicated by the reference index of the L0 prediction in the reference picture list of the L1 prediction, the second merging motion information candidate supplying unit 165 derives a second supplementary merging motion information candidate that has a motion vector (mvL1) of (0,0) for the L1 prediction, a reference index of i for the L1 prediction, and an inter prediction type of Pred_BI (S192) and adds the second supplementary merging motion information candidate to the merging motion information candidate list (S185).

In the case where there is no rearrangement between the order of an input picture and the order of coding and where the reference picture list of the L0 prediction is known to be identical with that of the L1 prediction, the step S190 and the step S191 can be also set not to be performed.

FIGS. 40A and 40B are diagrams explaining an example of a relationship between a reference index of a second supplementary merging motion information candidate and a POC according to the third embodiment. FIGS. 40A and 40B show an example where the number of available reference pictures in the reference picture list L0 is 4 and where the number of available reference pictures in the reference picture list L1 is 4. FIG. 40A shows a reference index of a second supplementary merging motion information candidate when there is no rearrangement between the order of an input picture and the order of coding. FIG. 40B shows a reference index of a second supplementary merging motion information candidate when there is rearrangement between the order of an input picture and the order of coding.

An explanation is given regarding FIG. 40A. A reference index of the L0 prediction and a reference index of the L1 prediction of the 0-th second supplementary merging motion information candidate are both 0, and a reference picture of the L0 prediction and a reference picture of the L1 prediction are identical both being reference pictures having a POC of n+7. Therefore, while the 0-th second supplementary merging motion information candidate has motion information for bi-prediction, a prediction picture that is obtained is identical with a prediction signal for uni-prediction obtained by performing motion compensation prediction on a reference picture having a POC of n+7 using a motion vector of (0,0).

A reference index of the L0 prediction and a reference index of the L1 prediction of the first second supplementary merging motion information candidate are both 1, and a reference picture of the L0 prediction and a reference picture of the L1 prediction are identical both being reference pictures having a POC of n+6. Therefore, while the first second supplementary merging motion information candidate has motion information for bi-prediction, a prediction picture that is obtained is identical with a prediction signal for uni-prediction obtained by performing motion compensation prediction on a reference picture having a POC of n+6 using a motion vector of (0,0).

A reference index of the L0 prediction and a reference index of the L1 prediction of the second second supplementary merging motion information candidate are both 2, and a reference picture of the L0 prediction and a reference picture of the L1 prediction are identical both being reference pictures having a POC of n+5. Therefore, while the second second supplementary merging motion information candidate has motion information for bi-prediction, a prediction picture that is obtained is identical with a prediction signal for uni-prediction obtained by performing motion compensation prediction on a reference picture having a POC of n+5 using a motion vector of (0,0).

A reference index of the L0 prediction and a reference index of the L1 prediction of the third second supplementary merging motion information candidate are both 3, and a reference picture of the L0 prediction and a reference picture of the L1 prediction are identical both being reference pictures having a POC of n+4. Therefore, while the third second supplementary merging motion information candidate has motion information for bi-prediction, a prediction picture that is obtained is identical with a prediction signal for uni-prediction obtained by performing motion compensation prediction on a reference picture having a POC of n+4 using a motion vector of (0,0).

An explanation is given regarding FIG. 40B. A reference index of the L0 prediction and a reference index of the L1 prediction of the 0-th second supplementary merging motion information candidate are 0 and 2, respectively, and a reference picture of the L0 prediction and a reference picture of the L1 prediction are identical both being reference pictures having a POC of n+4. Therefore, while the 0-th second supplementary merging motion information candidate has motion information for bi-prediction, a prediction picture that is obtained is identical with a prediction signal for uni-prediction obtained by performing motion compensation prediction on a reference picture having a POC of n+4 using a motion vector of (0,0).

A reference index of the L0 prediction and a reference index of the L1 prediction of the first second supplementary merging motion information candidate are 1 and 3, respectively, and a reference picture of the L0 prediction and a reference picture of the L1 prediction are identical both being reference pictures having a POC of n+2. Therefore, while the first second supplementary merging motion information candidate has motion information for bi-prediction, a prediction picture that is obtained is identical with a prediction signal for uni-prediction obtained by performing motion compensation prediction on a reference picture having a POC of n+2 using a motion vector of (0,0).

A reference index of the L0 prediction and a reference index of the L1 prediction of the second second supplementary merging motion information candidate are 2 and 0, respectively, and a reference picture of the L0 prediction and a reference picture of the L1 prediction are identical both being reference pictures having a POC of n+6. Therefore, while the second second supplementary merging motion information candidate has motion information for bi-prediction, a prediction picture that is obtained is identical with a prediction signal for uni-prediction obtained by performing motion compensation prediction on a reference picture having a POC of n+6 using a motion vector of (0,0).

A reference index of the L0 prediction and a reference index of the L1 prediction of the third second supplementary merging motion information candidate are 3 and 1, respectively, and a reference picture of the L0 prediction and a reference picture of the L1 prediction are identical both being reference pictures having a POC of n+8. Therefore, while the third second supplementary merging motion information candidate has motion information for bi-prediction, a prediction picture that is obtained is identical with a prediction signal for uni-prediction obtained by performing motion compensation prediction on a reference picture having a POC of n+8 using a motion vector of (0,0).

As described above, if there is a reference picture indicated by a reference index of the L0 prediction in the reference picture list of the L1 prediction, the second merging motion information candidate supplying unit 165 can derive a second supplementary merging motion information candidate that has motion information directed to bi-prediction while representing a prediction signal identical with a prediction signal for uni-prediction by setting the reference index of the L1 prediction to indicate a reference picture that is identical with a reference picture indicated by the reference index of the L0 prediction.

In this case, for example, in a case where a picture located at the same position as a target block in the nearest reference picture is not identical with a picture of the target block since there is a shielding object at the same position as the target block in the nearest reference picture and where a picture located at the same position as the target block in a reference picture that is distant in time to some extent is identical with the picture of the target block since there is no longer the shielding object, a highly accurate prediction signal can be obtained by using a second supplementary merging motion information candidate that refers to the reference picture without the shielding object. More specifically, in FIG. 40A, in a case where a picture located at the same position as a target block in a reference picture having a POC of n+7 is not identical with a picture of the target block since there is a shielding object in the reference picture having a POC of n+7 and where a picture located at the same position as the target block in a reference picture having a POC of n+6 is identical with the picture of the target block since there is no longer the shielding object in the reference picture having a POC of n+6, a highly accurate prediction signal can be obtained by selecting the first second supplementary merging motion information candidate.

Also, for example, in moving pictures where pictures before a target picture are stationary and where pictures after the target picture have a motion, a highly accurate prediction signal can be obtained by using a reference picture that is temporally before the target picture. More specifically, in FIG. 40B, in moving pictures where pictures before a target picture are stationary and where a reference picture having a POC of n+6 and subsequent pictures thereof have a motion, a highly accurate prediction signal can be obtained by using a 0-th second supplementary merging motion information candidate that refers to a reference picture having a POC of n+4, which is temporally before the target picture.

Also, assigning all reference pictures of the L0 prediction and the L1 prediction to reference pictures of second supplementary merging motion information candidates, all prediction signals of the second supplementary merging motion information candidates can be made to be different.

Further, since the step S175 is provided for the first merging motion information candidate supplying unit 164, a first supplementary merging motion information candidate that is identical with a second supplementary merging motion information candidate is not added in the first merging motion information candidate supplying unit 164, and by increasing the probability of a merging motion information candidate having different motion information to be present in a merging motion information candidate list, the coding efficiency can be improved.

The bit stream of moving pictures output from the moving picture coding device according to any of the embodiments described above has a specific data format so that it can be decoded in accordance with the coding method used in the embodiments. The moving picture decoding device compatible with the moving picture coding device is capable of decoding the bitstream of the specific data format.

If a wired or wireless network is used to exchange bitstreams between the moving picture coding device and the moving picture decoding device, the bitstream may be converted into a data format suited to the mode of transmission over a communication channel and be transmitted accordingly. In this case, there is provided a moving picture transmitting device for converting the bit streams output from the moving picture coding device into coded data of a data format suited to the mode of transmission over the communication channel and for transmitting the bitstreams over the network, and a moving picture receiving device for receiving the coded data over the network to recover the bitstreams and supplying the recovered bitstreams to the moving picture decoding device.

The moving picture transmitting device includes a memory for buffering bitstreams output from the moving picture coding device, a packet processing unit for packetizing the bit streams, and a transmitting unit for transmitting the packetized coding data over the network. The moving picture receiving device includes a receiving unit for receiving the packetized coded data over the network, a memory for buffering the received coded data, and a packet processing unit for subjecting the coding data to a depacketizing process so as to generate bitstreams and providing the generated bitstreams to the moving picture decoding device.

The above-described processes related to coding and decoding can of course be implemented by hardware-based apparatus for transmission, storage, or reception. Alternatively, the processes can be implemented by firmware stored in a read-only memory (ROM), a flash memory, etc., or by software on a computer, etc. The firmware program or the software program may be made available on, for example, a computer readable recording medium. Alternatively, the programs may be made available from a server via a wired or wireless network. Still alternatively, the programs may be made available in the form of data transmission over terrestrial or satellite digital broadcast systems.

Described above is an explanation of the present invention based on the embodiments. The embodiment is intended to be illustrative only, and it will be obvious to those skilled in the art that various modifications to constituting elements and processes could be developed and that such modifications are also within the scope of the present invention.

[Item 1] A moving picture coding device adapted to derive motion information including a reference index and a motion vector in units of prediction blocks, comprising:

a spatial merging motion information candidate derivation unit configured to derive a spatial merging motion information candidate from motion information of a plurality of coded prediction blocks neighboring a prediction block subject to coding;

a temporal merging motion information candidate derivation unit configured to derive a temporal merging motion information candidate from motion information of a prediction block in a coded picture different from a picture in which the prediction block subject to coding is located;

a merging motion information candidate list construction unit configured to generate a merging motion information candidate list, which is a list of merging motion information candidates, using the spatial merging motion information candidate and the temporal merging motion information candidate;

a merging motion information candidate supplying unit configured to generate a new merging motion information candidate including, if the reference index indicates an available reference picture, the reference index and, if the reference index does not indicate an available reference picture, a predetermined reference index along with a motion vector having a size and a direction that are preset and to add the new merging motion information candidate to the merging motion information candidate list;

a merging motion information selection unit configured to select one merging motion information candidate from the merging motion information candidate list to which the new merging motion information candidate has been added and to derive the selected merging motion information candidate as the motion information of the prediction block subject to coding; and a coding unit configured to code a specification index for specifying the selected merging motion information candidate.

[Item 2] The moving picture coding device according to Item 1, wherein the merging motion information candidate supplying unit generates, if the number of motion information candidates included in the merging motion information candidate list generated by the merging motion information candidate list construction unit is smaller than the maximum value of the specification index, the new merging motion information candidate and adds the new merging motion information candidate to the merging motion information candidate list.

[Item 3] A moving picture coding device adapted to derive motion information including a reference index and a motion vector in units of prediction blocks, comprising:

a spatial merging motion information candidate derivation unit configured to derive a spatial merging motion information candidate from motion information of a plurality of coded prediction blocks neighboring a prediction block subject to coding;

a temporal merging motion information candidate derivation unit configured to derive a temporal merging motion information candidate from motion information of a prediction block in a coded picture different from a picture in which the prediction block subject to coding is located;

a merging motion information candidate list construction unit configured to generate a merging motion information candidate list, which is a list of motion information candidates, using the spatial merging motion information candidate and the temporal merging motion information candidate;

a first merging motion information candidate supplying unit configured to combine a motion vector and a reference index of a merging motion information candidate for first prediction and a motion vector and a reference index of a merging motion information candidate for second prediction from the merging motion information candidate list, to derive a first supplementary merging motion information candidate in which a prediction signal of the first prediction and a prediction signal of the second prediction are not identical with each other, and to add the first supplementary merging motion information candidate to the merging motion information candidate list;

a second merging motion information candidate supplying unit configured to derive a second supplementary merging motion information candidate having a motion vector and a reference index that allow the prediction signal of the first prediction and the prediction signal of the second prediction to be identical with each other and to add the second supplementary merging motion information candidate to the merging motion information candidate list;

a merging motion information selection unit configured to select one merging motion information candidate from the merging motion information candidate list to which the first supplementary merging motion information candidate and the second supplementary merging motion information candidate have been added and to derive the selected merging motion information candidate as the motion information of the prediction block subject to coding; and a coding unit configured to code a specification index for specifying the selected merging motion information candidate.

[Item 4] A moving picture coding device adapted to partition a picture into a plurality of prediction blocks and perform motion compensation, comprising:

a spatial merging motion information candidate derivation unit configured to derive a spatial merging motion information candidate from motion information of a plurality of coded neighboring blocks neighboring a prediction block subject to coding;

a temporal merging motion information candidate derivation unit configured to derive a temporal merging motion information candidate from motion information of a block in a coded picture different from a picture subject to coding in which the prediction block subject to coding is located;

a merging motion information candidate list construction unit configured to generate a merging motion information candidate list using the spatial merging motion information candidate and the temporal merging motion information candidate;

a merging motion information candidate supplying unit configured to generate a merging motion information candidate for bi-prediction where a motion vector value is the same for first prediction and second prediction and where a reference index of the first prediction or the second prediction is set to be a fixed value and to add the merging motion information candidate to the merging motion information candidate list;

a merging motion information selection unit configured to select one merging motion information candidate from the merging motion information candidate list and to set the selected merging motion information candidate to be motion information of the prediction block subject to coding; and a coding unit configured to code information for specifying the selected merging motion information candidate in the merging motion information candidate list.

[Item 5] A moving picture coding method adapted to derive motion information including a reference index and a motion vector in units of prediction blocks, comprising:

deriving a spatial merging motion information candidate from motion information of a plurality of coded prediction blocks neighboring a prediction block subject to coding;

deriving a temporal merging motion information candidate from motion information of a prediction block in a coded picture different from a picture in which the prediction block subject to coding is located;

generating a merging motion information candidate list, which is a list of merging motion information candidates, using the spatial merging motion information candidate and the temporal merging motion information candidate;

generating a new merging motion information candidate including, if the reference index indicates an available reference picture, the reference index and, if the reference index does not indicate an available reference picture, a predetermined reference index along with a motion vector having a size and a direction that are preset and adding the new merging motion information candidate to the merging motion information candidate list;

selecting one merging motion information candidate from the merging motion information candidate list to which the new merging motion information candidate has been added and deriving the selected merging motion information candidate as the motion information of the prediction block subject to coding; and coding a specification index for specifying the selected merging motion information candidate.

[Item 6] The moving picture coding method according to Item 5, wherein, in the generation of a new merging motion information candidate and the addition of the new merging motion information candidate to the merging motion information candidate list, if the number of motion information candidates included in the merging motion information candidate list generated in the generation of a merging motion information candidate list is smaller than the maximum value of the specification index, the new merging motion information candidate is generated, and the new merging motion information candidate is added to the merging motion information candidate list.

[Item 7] A moving picture coding method adapted to derive motion information including a reference index and a motion vector in units of prediction blocks, comprising:

deriving a spatial merging motion information candidate from motion information of a plurality of coded prediction blocks neighboring a prediction block subject to coding;

deriving a temporal merging motion information candidate from motion information of a prediction block in a coded picture different from a picture in which the prediction block subject to coding is located;

generating a merging motion information candidate list, which is a list of motion information candidates, using the spatial merging motion information candidate and the temporal merging motion information candidate;

combining a motion vector and a reference index of a merging motion information candidate for first prediction and a motion vector and a reference index of a merging motion information candidate for second prediction from the merging motion information candidate list, deriving a first supplementary merging motion information candidate in which a prediction signal of the first prediction and a prediction signal of the second prediction are not identical with each other, and adding the first supplementary merging motion information candidate to the merging motion information candidate list;

deriving a second supplementary merging motion information candidate having a motion vector and a reference index that allow the prediction signal of the first prediction and the prediction signal of the second prediction to be identical with each other and adding the second supplementary merging motion information candidate to the merging motion information candidate list;

selecting one merging motion information candidate from the merging motion information candidate list to which the first supplementary merging motion information candidate and the second supplementary merging motion information candidate have been added and deriving the selected merging motion information candidate as the motion information of the prediction block subject to coding; and coding a specification index for specifying the selected merging motion information candidate.

[Item 8] A moving picture coding program embedded on a non-transitory computer-readable recording medium and adapted to derive motion information including a reference index and a motion vector in units of prediction blocks, the program comprising:

deriving a spatial merging motion information candidate from motion information of a plurality of coded prediction blocks neighboring a prediction block subject to coding;

deriving a temporal merging motion information candidate from motion information of a prediction block in a coded picture different from a picture in which the prediction block subject to coding is located;

generating a merging motion information candidate list, which is a list of merging motion information candidates, using the spatial merging motion information candidate and the temporal merging motion information candidate;

generating a new merging motion information candidate including, if the reference index indicates an available reference picture, the reference index and, if the reference index does not indicate an available reference picture, a predetermined reference index along with a motion vector having a size and a direction that are preset and adding the new merging motion information candidate to the merging motion information candidate list;

selecting one merging motion information candidate from the merging motion information candidate list to which the new merging motion information candidate has been added and deriving the selected merging motion information candidate as the motion information of the prediction block subject to coding; and coding a specification index for specifying the selected merging motion information candidate.

[Item 9] The moving picture coding program according to Item 8, wherein, in the generation of a new merging motion information candidate and the addition of the new merging motion information candidate to the merging motion information candidate list, if the number of motion information candidates included in the merging motion information candidate list generated in the generation of a merging motion information candidate list is smaller than the maximum value of the specification index, the new merging motion information candidate is generated, and the new merging motion information candidate is added to the merging motion information candidate list.

[Item 10] A moving picture coding program embedded on a non-transitory computer-readable recording medium and adapted to derive motion information including a reference index and a motion vector in units of prediction blocks, the program comprising:

deriving a spatial merging motion information candidate from motion information of a plurality of coded prediction blocks neighboring a prediction block subject to coding;

deriving a temporal merging motion information candidate from motion information of a prediction block in a coded picture different from a picture in which the prediction block subject to coding is located;

generating a merging motion information candidate list, which is a list of motion information candidates, using the spatial merging motion information candidate and the temporal merging motion information candidate;

combining a motion vector and a reference index of a merging motion information candidate for first prediction and a motion vector and a reference index of a merging motion information candidate for second prediction from the merging motion information candidate list, deriving a first supplementary merging motion information candidate in which a prediction signal of the first prediction and a prediction signal of the second prediction are not identical with each other, and adding the first supplementary merging motion information candidate to the merging motion information candidate list;

deriving a second supplementary merging motion information candidate having a motion vector and a reference index that allow the prediction signal of the first prediction and the prediction signal of the second prediction to be identical with each other and adding the second supplementary merging motion information candidate to the merging motion information candidate list;

selecting one merging motion information candidate from the merging motion information candidate list to which the first supplementary merging motion information candidate and the second supplementary merging motion information candidate have been added and deriving the selected merging motion information candidate as the motion information of the prediction block subject to coding; and coding a specification index for specifying the selected merging motion information candidate.

[Item 11] A moving picture decoding device adapted to derive motion information including a reference index and a motion vector in units of prediction blocks, comprising:

a decoding unit configured to decode, from a bitstream, a specification index for specifying a merging motion information candidate used for a prediction block subject to decoding;

a spatial merging motion information candidate derivation unit configured to derive a spatial merging motion information candidate from motion information of a plurality of decoded prediction blocks neighboring the prediction block subject to decoding;

a temporal merging motion information candidate derivation unit configured to derive a temporal merging motion information candidate from motion information of a prediction block in a decoded picture different from a picture in which the prediction block subject to decoding is located;

a merging motion information candidate list construction unit configured to generate a merging motion information candidate list, which is a list of merging motion information candidates, using the spatial merging motion information candidate and the temporal merging motion information candidate;

a merging motion information candidate supplying unit configured to generate a new merging motion information candidate including, if the reference index indicates an available reference picture, the reference index and, if the reference index does not indicate an available reference picture, a predetermined reference index along with a motion vector having a size and a direction that are preset and to add the new merging motion information candidate to the merging motion information candidate list; and a merging motion information selection unit configured to select one merging motion information candidate from the merging motion information candidate list to which the new merging motion information candidate has been added and to derive the selected merging motion information candidate as the motion information of the prediction block subject to decoding, based on the specification index that has been decoded.

[Item 12] The moving picture decoding device according to Item 11, wherein the merging motion information candidate supplying unit generates, if the number of motion information candidates included in the merging motion information candidate list generated by the merging motion information candidate list construction unit is smaller than the maximum value of the specification index, the new merging motion information candidate and adds the new merging motion information candidate to the merging motion information candidate list.

[Item 13] A moving picture decoding device adapted to derive motion information including a reference index and a motion vector in units of prediction blocks, comprising:

a decoding unit configured to decode, from a bitstream, a specification index for specifying a merging motion information candidate used for a prediction block subject to decoding;

a spatial merging motion information candidate derivation unit configured to derive a spatial merging motion information candidate from motion information of a plurality of decoded prediction blocks neighboring the prediction block subject to decoding;

a temporal merging motion information candidate derivation unit configured to derive a temporal merging motion information candidate from motion information of a prediction block in a decoded picture different from a picture in which the prediction block subject to decoding is located;

a merging motion information candidate list construction unit configured to generate a merging motion information candidate list, which is a list of motion information candidates, using the spatial merging motion information candidate and the temporal merging motion information candidate;

a first merging motion information candidate supplying unit configured to combine a motion vector and a reference index of a merging motion information candidate for first prediction and a motion vector and a reference index of a merging motion information candidate for second prediction from the merging motion information candidate list, to derive a first supplementary merging motion information candidate in which a prediction signal of the first prediction and a prediction signal of the second prediction are not identical with each other, and to add the first supplementary merging motion information candidate to the merging motion information candidate list;

a second merging motion information candidate supplying unit configured to derive a second supplementary merging motion information candidate having a motion vector and a reference index that allow the prediction signal of the first prediction and the prediction signal of the second prediction to be identical with each other and to add the second supplementary merging motion information candidate to the merging motion information candidate list; and a merging motion information selection unit configured to select one merging motion information candidate from the merging motion information candidate list to which the first supplementary merging motion information candidate and the second supplementary merging motion information candidate have been added and to derive the selected merging motion information candidate as the motion information of the prediction block subject to decoding, based on the specification index that has been decoded.

[Item 14] A moving picture decoding device adapted to partition a picture into a plurality of prediction blocks and perform motion compensation, comprising:

a decoding unit configured to decode, from a bitstream in which an index for specifying a merging motion information candidate used in a prediction block subject to decoding is coded, the index;

a spatial merging motion information candidate derivation unit configured to derive a spatial merging motion information candidate from motion information of a plurality of decoded neighboring blocks neighboring the prediction block subject to decoding;

a temporal merging motion information candidate derivation unit configured to derive a temporal merging motion information candidate from motion information of a block in a decoded picture different from a picture subject to decoding in which the prediction block subject to decoding is located;

a merging motion information candidate list construction unit configured to generate a merging motion information candidate list using the spatial merging motion information candidate and the temporal merging motion information candidate;

a merging motion information candidate supplying unit configured to generate a merging motion information candidate for bi-prediction where a motion vector value is the same for first prediction and second prediction and where a reference index of the first prediction or the second prediction is set to be a fixed value and to add the merging motion information candidate to the merging motion information candidate list; and a merging motion information selection unit configured to select one merging motion information candidate from the merging motion information candidate list based on the index that has been decoded and to set the selected merging motion information candidate to be motion information of the prediction block subject to decoding.

[Item 15] A moving picture decoding method adapted to derive motion information including a reference index and a motion vector in units of prediction blocks, comprising:

decoding, from a bitstream, a specification index for specifying a merging motion information candidate used for a prediction block subject to decoding;

deriving a spatial merging motion information candidate from motion information of a plurality of decoded prediction blocks neighboring the prediction block subject to decoding;

deriving a temporal merging motion information candidate from motion information of a prediction block in a decoded picture different from a picture in which the prediction block subject to decoding is located;

generating a merging motion information candidate list, which is a list of merging motion information candidates, using the spatial merging motion information candidate and the temporal merging motion information candidate;

generating a new merging motion information candidate including, if the reference index indicates an available reference picture, the reference index and, if the reference index does not indicate an available reference picture, a predetermined reference index along with a motion vector having a size and a direction that are preset and adding the new merging motion information candidate to the merging motion information candidate list; and selecting one merging motion information candidate from the merging motion information candidate list to which the new merging motion information candidate has been added and deriving the selected merging motion information candidate as the motion information of the prediction block subject to decoding, based on the specification index that has been decoded.

[Item 16] The moving picture decoding method according to Item 15, wherein, in the generation of a new merging motion information candidate and the addition of the new merging motion information candidate to the merging motion information candidate list, if the number of motion information candidates included in the merging motion information candidate list generated in the generation of a merging motion information candidate list is smaller than the maximum value of the specification index, the new merging motion information candidate is generated, and the new merging motion information candidate is added to the merging motion information candidate list.

[Item 17] A moving picture decoding method adapted to derive motion information including a reference index and a motion vector in units of prediction blocks, comprising:

decoding, from a bitstream, a specification index for specifying a merging motion information candidate used for a prediction block subject to decoding;

deriving a spatial merging motion information candidate from motion information of a plurality of decoded prediction blocks neighboring the prediction block subject to decoding;

deriving a temporal merging motion information candidate from motion information of a prediction block in a decoded picture different from a picture in which the prediction block subject to decoding is located;

generating a merging motion information candidate list, which is a list of motion information candidates, using the spatial merging motion information candidate and the temporal merging motion information candidate;

combining a motion vector and a reference index of a merging motion information candidate for first prediction and a motion vector and a reference index of a merging motion information candidate for second prediction from the merging motion information candidate list, deriving a first supplementary merging motion information candidate in which a prediction signal of the first prediction and a prediction signal of the second prediction are not identical with each other, and adding the first supplementary merging motion information candidate to the merging motion information candidate list;

deriving a second supplementary merging motion information candidate having a motion vector and a reference index that allow the prediction signal of the first prediction and the prediction signal of the second prediction to be identical with each other and adding the second supplementary merging motion information candidate to the merging motion information candidate list; and selecting one merging motion information candidate from the merging motion information candidate list to which the first supplementary merging motion information candidate and the second supplementary merging motion information candidate have been added and deriving the selected merging motion information candidate as the motion information of the prediction block subject to decoding, based on the specification index that has been decoded.

[Item 18] A moving picture decoding program embedded on a non-transitory computer-readable recording medium and adapted to derive motion information including a reference index and a motion vector in units of prediction blocks, the program comprising:

decoding, from a bitstream, a specification index for specifying a merging motion information candidate used for a prediction block subject to decoding;

deriving a spatial merging motion information candidate from motion information of a plurality of decoded prediction blocks neighboring the prediction block subject to decoding;

deriving a temporal merging motion information candidate from motion information of a prediction block in a decoded picture different from a picture in which the prediction block subject to decoding is located;

generating a merging motion information candidate list, which is a list of merging motion information candidates, using the spatial merging motion information candidate and the temporal merging motion information candidate;

generating a new merging motion information candidate including, if the reference index indicates an available reference picture, the reference index and, if the reference index does not indicate an available reference picture, a predetermined reference index along with a motion vector having a size and a direction that are preset and adding the new merging motion information candidate to the merging motion information candidate list; and selecting one merging motion information candidate from the merging motion information candidate list to which the new merging motion information candidate has been added and deriving the selected merging motion information candidate as the motion information of the prediction block subject to decoding, based on the specification index that has been decoded.

[Item 19] The moving picture decoding program according to Item 18, wherein, in the generation of a new merging motion information candidate and the addition of the new merging motion information candidate to the merging motion information candidate list, if the number of motion information candidates included in the merging motion information candidate list generated in the generation of a merging motion information candidate list is smaller than the maximum value of the specification index, the new merging motion information candidate is generated, and the new merging motion information candidate is added to the merging motion information candidate list.

[Item 20] A moving picture decoding program embedded on a non-transitory computer-readable recording medium and adapted to derive motion information including a reference index and a motion vector in units of prediction blocks, the program comprising:

decoding, from a bitstream, a specification index for specifying a merging motion information candidate used for a prediction block subject to decoding;

deriving a spatial merging motion information candidate from motion information of a plurality of decoded prediction blocks neighboring the prediction block subject to decoding;

deriving a temporal merging motion information candidate from motion information of a prediction block in a decoded picture different from a picture in which the prediction block subject to decoding is located;

generating a merging motion information candidate list, which is a list of motion information candidates, using the spatial merging motion information candidate and the temporal merging motion information candidate;

combining a motion vector and a reference index of a merging motion information candidate for first prediction and a motion vector and a reference index of a merging motion information candidate for second prediction from the merging motion information candidate list, deriving a first supplementary merging motion information candidate in which a prediction signal of the first prediction and a prediction signal of the second prediction are not identical with each other, and adding the first supplementary merging motion information candidate to the merging motion information candidate list;

deriving a second supplementary merging motion information candidate having a motion vector and a reference index that allow the prediction signal of the first prediction and the prediction signal of the second prediction to be identical with each other and adding the second supplementary merging motion information candidate to the merging motion information candidate list; and selecting one merging motion information candidate from the merging motion information candidate list to which the first supplementary merging motion information candidate and the second supplementary merging motion information candidate have been added and deriving the selected merging motion information candidate as the motion information of the prediction block subject to decoding, based on the specification index that has been decoded.

What is claimed is:

1. A moving picture decoding device adapted to derive motion information including a reference index and a motion vector in units of prediction blocks, comprising:

a decoding unit configured to decode, from a bitstream, a specification index for specifying a merging motion information candidate used for a prediction block subject to decoding;

a spatial merging motion information candidate derivation unit configured to derive a spatial merging motion information candidate from motion information of a plurality of decoded prediction blocks neighboring the prediction block subject to decoding;

a temporal merging motion information candidate derivation unit configured to derive a temporal merging motion information candidate from motion information of a prediction block in a decoded picture different from a picture in which the prediction block subject to decoding is located;

a merging motion information candidate list construction unit configured to generate a merging motion information candidate list, which is a list of merging motion information candidates, using the spatial merging motion information candidate and the temporal merging motion information candidate;

a merging motion information candidate supplying unit configured to generate a new merging motion information candidate including, if the reference index indicates an available reference picture, the reference index along with a motion vector having a size and a direction that are preset and to add the new merging motion information candidate to the merging motion information candidate list, if the reference index does not indicate an available reference picture, a predetermined reference index along with a motion vector having a size and a direction that are preset and to add the new merging motion information candidate to the merging motion information candidate list; and a merging motion information selection unit configured to select one merging motion information candidate from the merging motion information candidate list to which the new merging motion information candidate has been added and to derive the selected merging motion information candidate as the motion information of the prediction block subject to decoding, based on the specification index that has been decoded, wherein:

the merging motion information candidate supplying unit sequentially generates the new merging motion information candidate including a value incremented by one starting from zero as the reference index and assigns the predetermined reference index if the incremented value is greater than the maximum value of the available reference index; and the motion vector having the size and the direction is (0,0).

2. A moving picture decoding method adapted to derive motion information including a reference index and a motion vector in units of prediction blocks, comprising:

decoding, from a bitstream, a specification index for specifying a merging motion information candidate used for a prediction block subject to decoding;

deriving a spatial merging motion information candidate from motion information of a plurality of decoded prediction blocks neighboring the prediction block subject to decoding;

deriving a temporal merging motion information candidate from motion information of a prediction block in a decoded picture different from a picture in which the prediction block subject to decoding is located;

generating a merging motion information candidate list, which is a list of merging motion information candidates, using the spatial merging motion information candidate and the temporal merging motion information candidate;

generating a new merging motion information candidate including, if the reference index indicates an available reference picture, the reference index along with a motion vector having a size and a direction that are preset and to add the new merging motion information candidate to the merging motion information candidate list, if the reference index does not indicate an available reference picture, a predetermined reference index along with a motion vector having a size and a direction that are preset and adding the new merging motion information candidate to the merging motion information candidate list; and selecting one merging motion information candidate from the merging motion information candidate list to which the new merging motion information candidate has been added and deriving the selected merging motion information candidate as the motion information of the prediction block subject to decoding, based on the specification index that has been decoded, wherein:

the generating the new merging motion information candidate sequentially generates the new merging motion information candidate including a value incremented by one starting from zero as the reference index and assigns the predetermined reference index if the incremented value is greater than the maximum value of the available reference index; and the motion vector having the size and the direction is (0,0).

3. A non-transitory computer-readable recording medium having embodied thereon a moving picture decoding program adapted to derive motion information including a reference index and a motion vector in units of prediction blocks, the moving picture decoding program comprising:

decoding, from a bitstream, a specification index for specifying a merging motion information candidate used for a prediction block subject to decoding;

deriving a spatial merging motion information candidate from motion information of a plurality of decoded prediction blocks neighboring the prediction block subject to decoding;

deriving a temporal merging motion information candidate from motion information of a prediction block in a decoded picture different from a picture in which the prediction block subject to decoding is located;

generating a merging motion information candidate list, which is a list of merging motion information candidates, using the spatial merging motion information candidate and the temporal merging motion information candidate;

generating a new merging motion information candidate including, if the reference index indicates an available reference picture, the reference index along with a motion vector having a size and a direction that are preset and to add the new merging motion information candidate to the merging motion information candidate list, if the reference index does not indicate an available reference picture, a predetermined reference index along with a motion vector having a size and a direction that are preset and adding the new merging motion information candidate to the merging motion information candidate list; and selecting one merging motion information candidate from the merging motion information candidate list to which the new merging motion information candidate has been added and deriving the selected merging motion information candidate as the motion information of the prediction block subject to decoding, based on the specification index that has been decoded, wherein:

the generating the new merging motion information candidate sequentially generates the new merging motion information candidate including a value incremented by one starting from zero as the reference index and assigns the predetermined reference index if the incremented value is greater than the maximum value of the available reference index; and the motion vector having the size and the direction is (0,0).

* * * * *